United States Patent [19]
Hamada et al.

[11] Patent Number: 5,483,318
[45] Date of Patent: Jan. 9, 1996

[54] FOCUS DETECTING PHOTOELECTRIC CONVERTING APPARATUS FOR A CAMERA

[75] Inventors: Masataka Hamada, Osakahayama; Kazuhiko Yukawa, Wakayama; Tokuji Ishida, Daito; Toshio Norita, Yokohama; Hiroshi Ueda, Habikino, all of Japan

[73] Assignee: Minolta Camera Kabushiki Kaisha, Osaka, Japan

[21] Appl. No.: 253,598

[22] Filed: Jun. 3, 1994

Related U.S. Application Data

[63] Continuation of Ser. No. 956,461, Oct. 2, 1992, abandoned, which is a continuation of Ser. No. 581,886, Sep. 13, 1990, abandoned.

[30] Foreign Application Priority Data

Sep. 13, 1989 [JP] Japan ..................... 1-237768

[51] Int. Cl.⁶ .................................................. G03B 13/36
[52] U.S. Cl. ............................. 354/402; 354/408
[58] Field of Search .................... 354/402, 406, 354/407, 408; 257/234, 223, 229

[56] References Cited

U.S. PATENT DOCUMENTS

| | | |
|---|---|---|
| 4,334,150 | 6/1982 | Herbst et al. . |
| 4,410,258 | 10/1983 | Aoki et al. . |
| 4,563,708 | 1/1986 | Ishibashi . |
| 4,636,624 | 1/1987 | Ishida et al. . |
| 4,766,302 | 8/1988 | Ishida et al. . |
| 4,903,065 | 2/1990 | Taniguchi et al. ............. 354/402 |
| 4,905,032 | 2/1990 | Ishida et al. ................. 354/402 |
| 4,952,963 | 8/1990 | Asashi . |
| 4,979,045 | 12/1990 | Taniguchi et al. . |
| 5,003,336 | 3/1991 | Karasaki et al. ............. 354/402 |
| 5,005,040 | 4/1991 | Norita et al. ................ 354/402 |

*Primary Examiner*—Russell E. Adams
*Attorney, Agent, or Firm*—Burns, Doane, Swecker & Mathis

[57] ABSTRACT

A camera includes a CCD line sensor divided into a plurality of blocks and a plurality of monitors provided near each of the divided blocks and sensing the amount of received light corresponding to each block. The storage of charge in each block of the CCD is controlled based on the amount of the light received by the monitor. Each block corresponds to each part of an object in a finder of the camera.

29 Claims, 46 Drawing Sheets

FRONT FOCUS
(LONG DISTANCE SIDE)

REAR FOCUS
(SHORT DISTANCE SIDE)

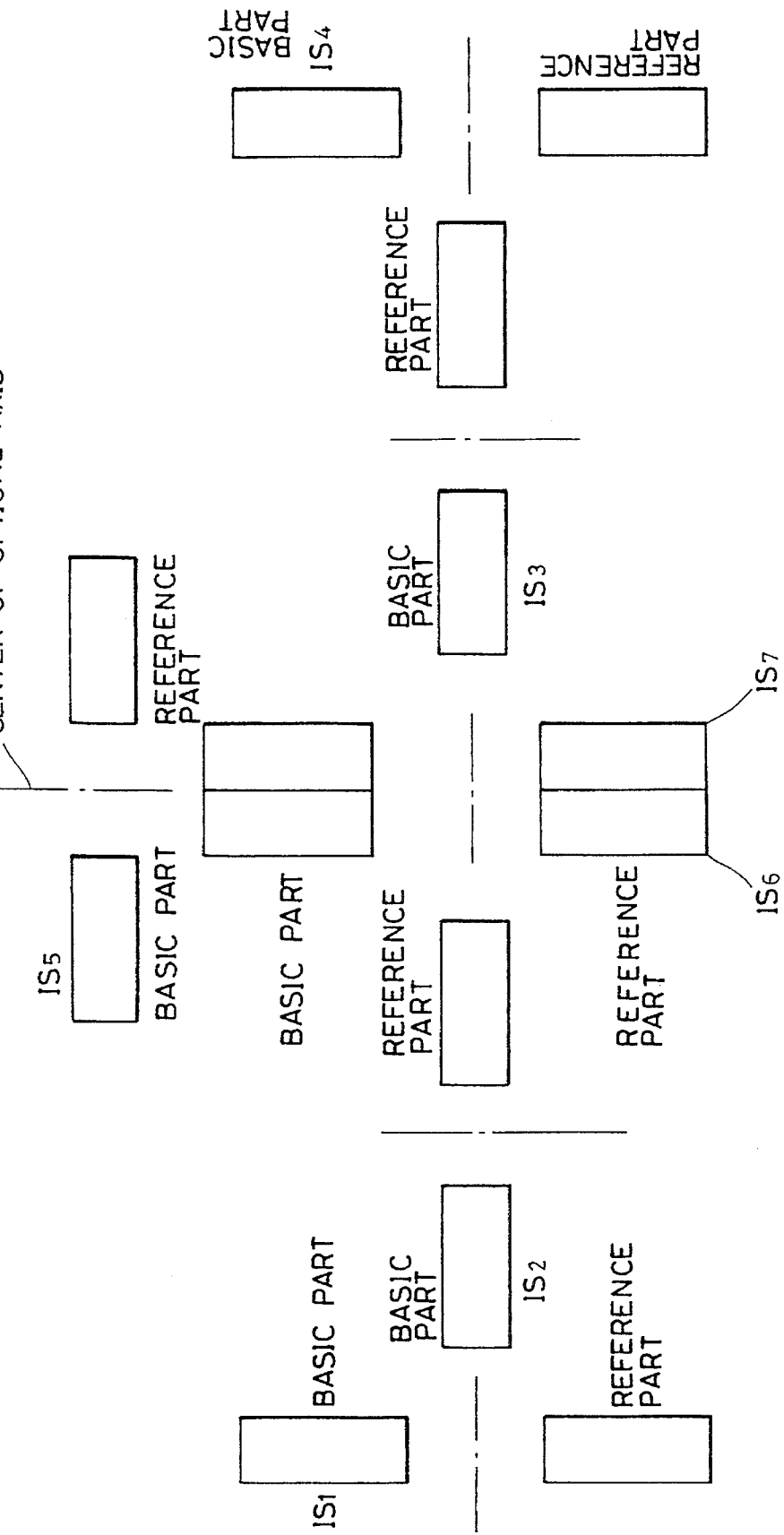

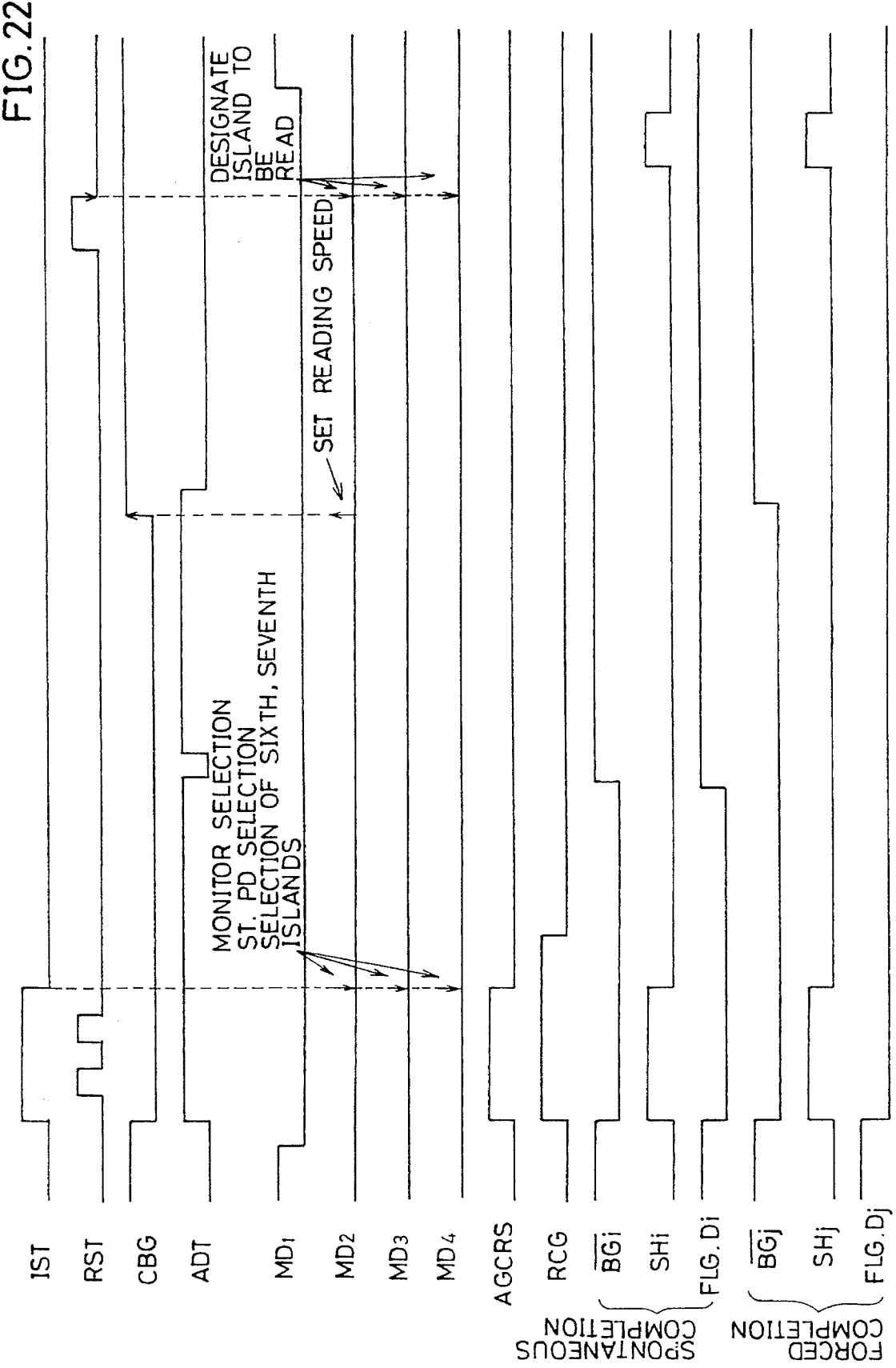

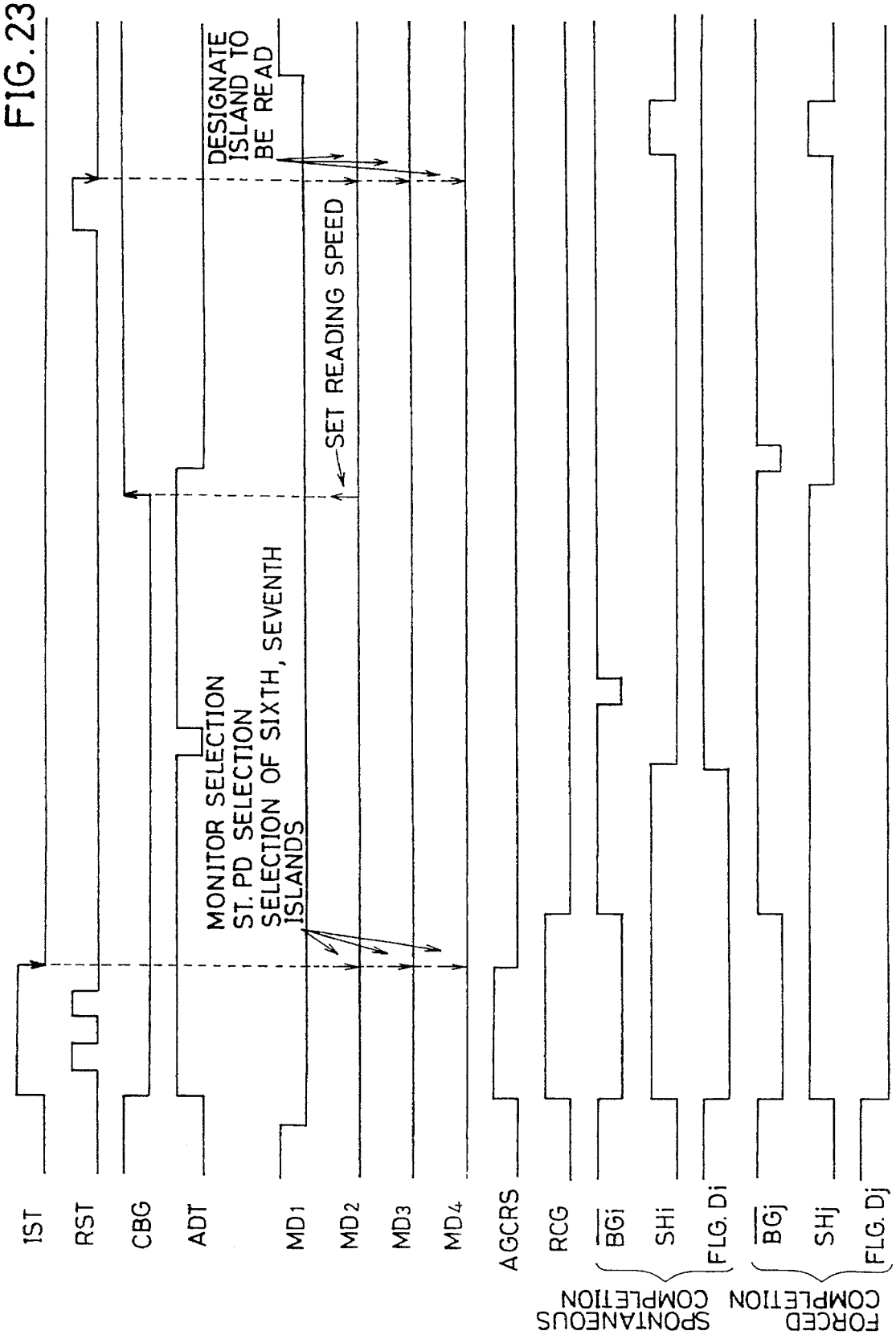

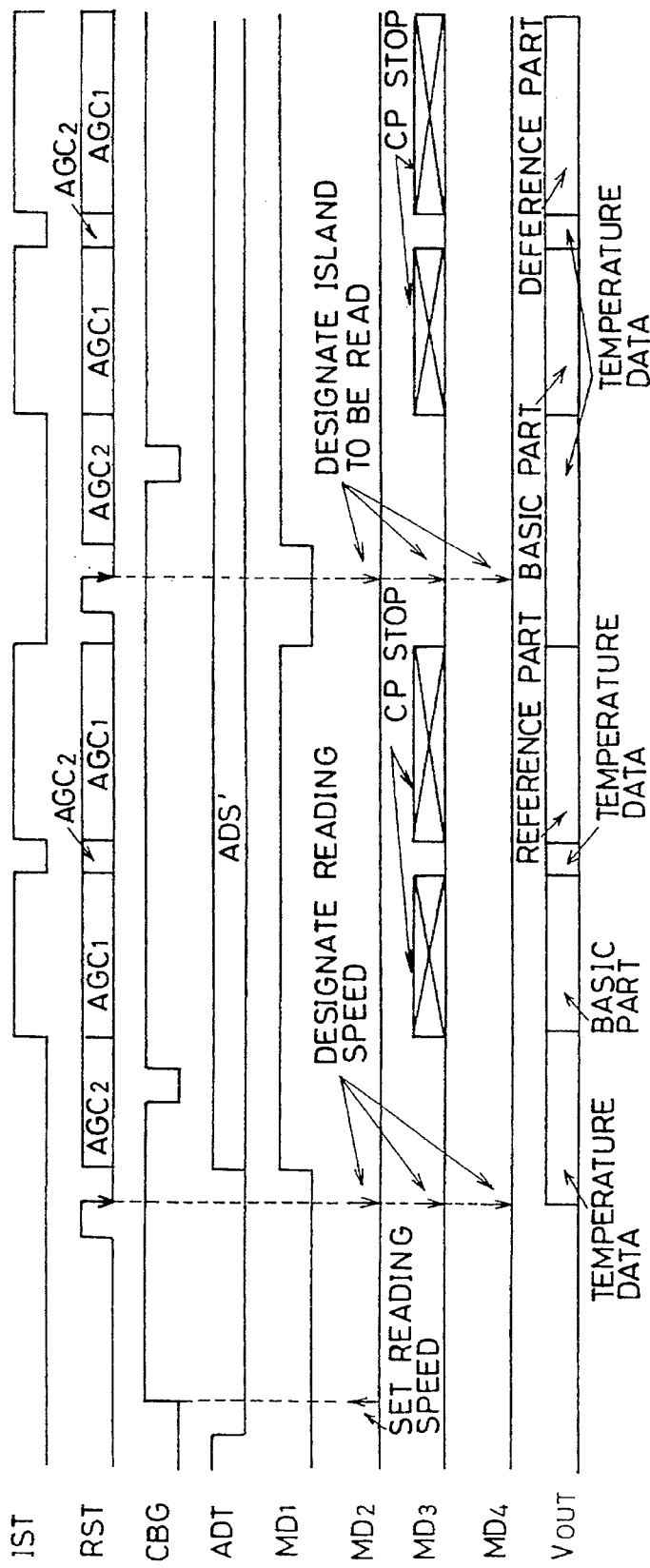

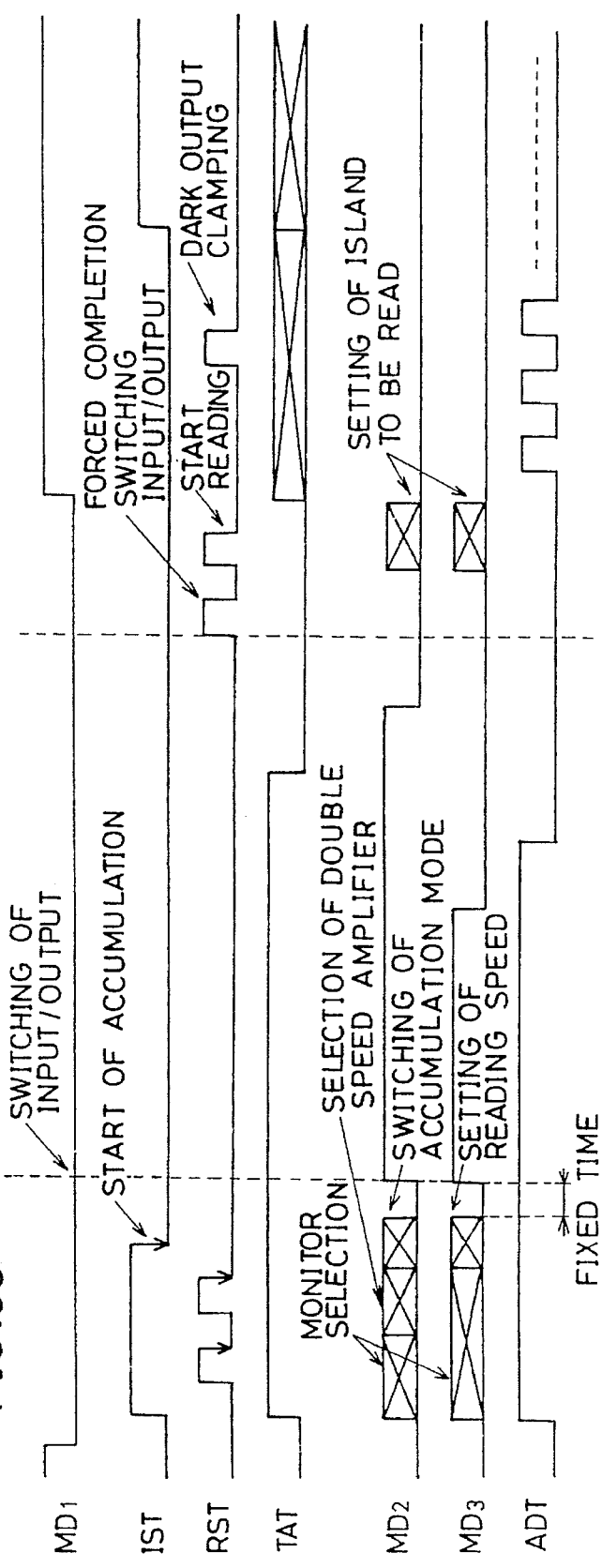
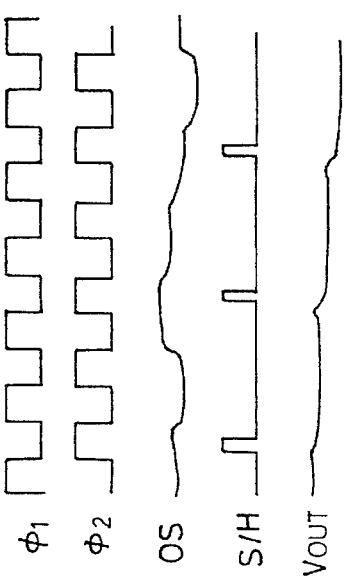
FIG. 40
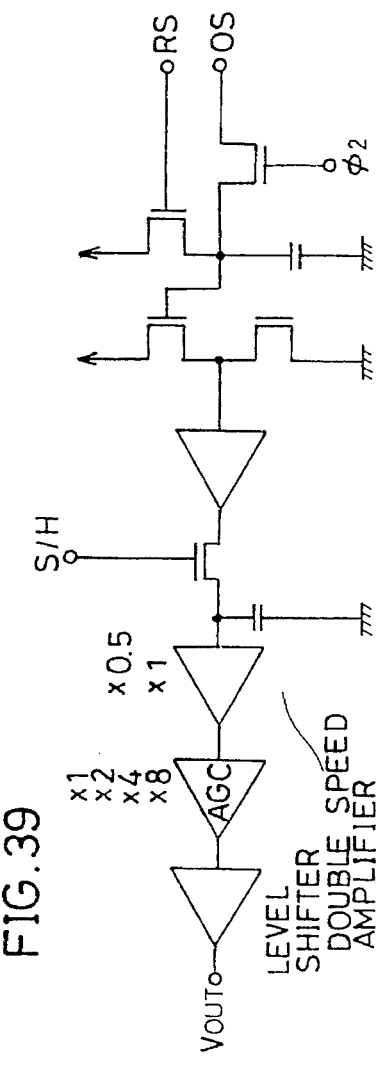
FIG. 38
FIG. 39

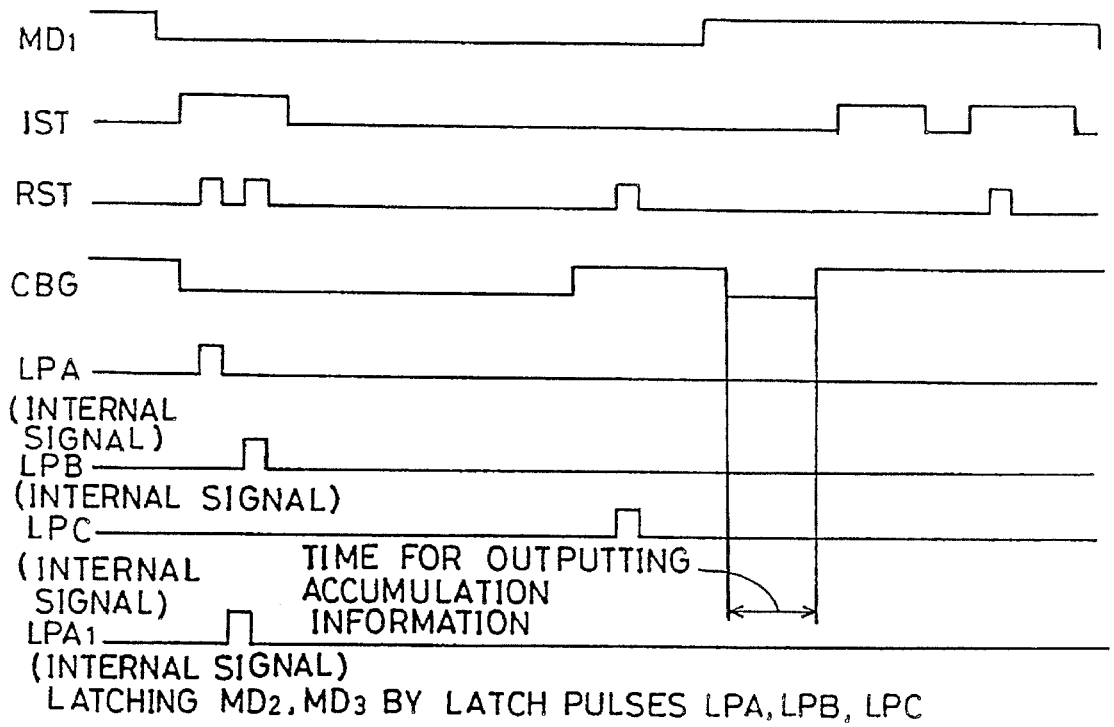

FIG. 48C

| TERMINAL | | ACCUMULATION INFORMATION OUTPUT |
|---|---|---|
| MD3 | MD2 | |
| L | L | D1 |
| L | H | D4 |
| H | L | D2 |
| H | H | D3 |

| Rir / b | LEVEL AT WHICH SKIN COLOR CAN BE DETECTED | | LIGHT SOURCE TO BE DETERMINED |
|---|---|---|---|
| | Rg / b | Rr / b | |
| 0.2 OR LESS | 2.2 ~ 3.0 | 4.0 ~ 5.0 | FLUORESCENT LIGHT |
| 0.2 ~ 0.65 | 1.6 ~ 1.8 | 3.4 ~ 4.0 | NATURAL LIGHT |
| 0.65 OR MORE | 1.9 ~ 2.1 | 5.0 ~ 5.3 | ELECTRIC-LIGHT BULB |

5,483,318

FOCUS DETECTING PHOTOELECTRIC CONVERTING APPARATUS FOR A CAMERA

This application is a continuation of application Ser. No. 07/956,461, filed Oct. 2, 1992, now abandoned which is a continuation of application Ser. No. 07/581,886, filed Sep. 13, 1990, now abandoned.

BACKGROUND OF THE INVENTION

1. Field of the Invention

The present invention relates to a focus detecting photoelectric converting apparatus for a camera, and more specifically, to a focus detecting photoelectric converting apparatus for a camera having a plurality of monitor sensors.

2. Description of the Related Art

A focus detecting photoelectric converting apparatus for use in a conventional camera includes photoelectric converting elements outputting signals corresponding to the amount of light from an object to be focus detected and a monitor sensor provided to cover the entire area of the photoelectric converting elements or detecting the storage amount of charge of the photoelectric converting elements. When the camera is directed to the object and the monitor sensor determines that the photoelectric converting elements receive a prescribed amount of light, the photoelectric converting elements terminate the charge accumulation, so that calculation of detection of focusing condition for focus adjustment is carried out based on the data thereof.

The focus detecting photoelectric converting apparatus for use in a conventional camera is structured as described above. Since one monitor sensor covers the entire area of photoelectric converting elements, when a main object to be focus adjusted is in a back-lit scene, for example, output of the monitor sensor is susceptible to the brightness of the circumference of the object. Accordingly, sufficient charge cannot be stored corresponding to the brightness of the main object and no clear contrast can be obtained due to low brightness of the main object. As a result, the camera can not focus on the main object but on the background thereof.

SUMMARY OF THE INVENTION

Therefore an object of the present invention is to provide a camera capable of storing charge in accordance with a desired object in a finder.

Another object of the present invention is to provide a camera wherein an object in a back-lit scene can be properly focused on.

A further object of the present invention is to provide a camera capable of determining a main object precisely.

A still further object of the present invention is to provide a camera wherein a desired object of low brightness can be precisely focused.

The above-described objects of the present invention can be achieved by a camera comprising the following elements. Namely, the camera according to the present invention comprises a line sensor including a plurality of storage type photoelectric converting elements; dividing means for dividing the line sensor into a plurality of blocks, each of the blocks including the plurality of photoelectric converting elements; a focus detecting device for performing focus detection with respect to at least one of the blocks based on output of the photoelectric converting elements; a light receiving monitor having a plurality of light receiving sensors, the light receiving monitor being provided near the corresponding block; a storage controlling device for controlling the storage amount of charge to the photoelectric converting element based on the output of the light receiving monitor; a driving device for driving a photographic lens based on the detection result of the focus detecting device.

In the present invention, the line sensor is divided into a plurality of blocks and the light receiving sensors are provided near the corresponding blocks, whereby the storage amount of charge in each block is controlled in response to a signal of the light receiving monitor. Since each block corresponds to each part of an object in the finder of the camera, the storage amount of charge of the line sensor can be controlled by using a monitor sensor corresponding to a desired object portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B are diagrams showing in detail a CCD chip for use in the photoelectric converting apparatus according to the present invention.

FIGS. 22–24 are time charts of a photoelectric converting apparatus according to a second embodiment of the present invention.

FIGS. 25 and 26 are diagrams explaining a manner of setting accumulation modes and islands to be read of the photoelectric converting apparatus according to the present invention.

FIGS. 33–40 are diagrams explaining a fourth embodiment of the present invention.

FIGS. 41–48 are diagrams explaining a fifth embodiment of the present invention.

DESCRIPTION OF THE PREFERRED EMBODIMENTS

Figure 1:
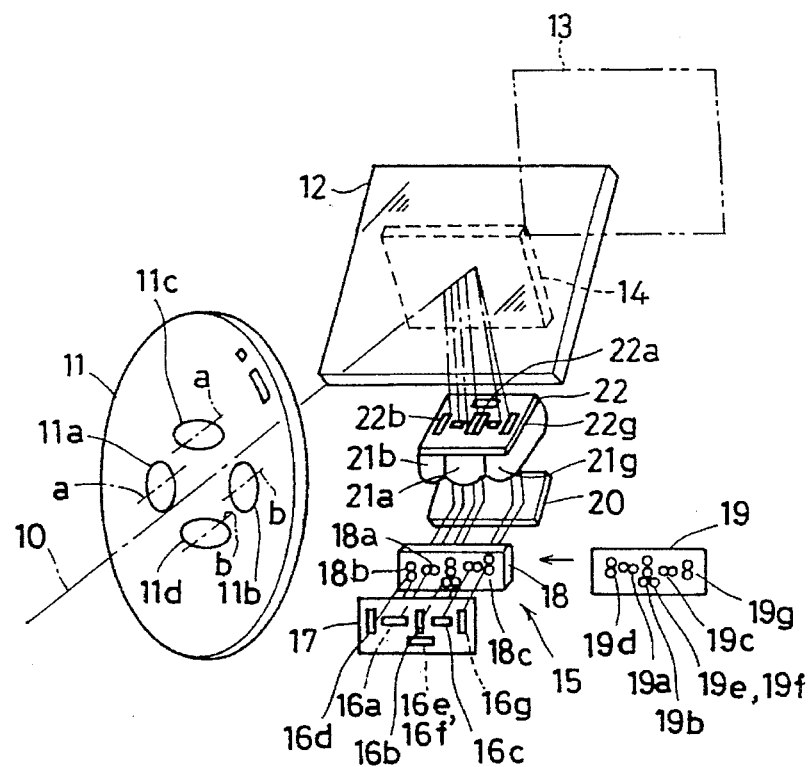
FIG. 1 is a perspective view showing a focus detecting optical system of a camera employing a focus detecting photoelectric converting apparatus according to the present invention.

A focus detecting optical system in a single lens reflex camera having automatic focus detecting function employing the focus detecting photoelectric converting apparatus in accordance with the present invention will be described in the following with reference to FIGS. 1 and 2. A camera body of the single lens reflex camera comprises a photographic lens 11 provided on an optical axis 10 and a main mirror 12 provided inclining upward by 45° behind the photographic lens 11. A film 13 is provided behind the main mirror 12. Luminous bundle for photographing passed through the photographic lens 11 is reflected upward by the main mirror 12, images are formed on a focusing screen and guided to a finder optical system through a penta prism.

A half mirror is formed at least at one portion of the main mirror 12. A submirror 14 whose rotary axis attached on a rear surface of the main mirror 12 is provided facing downward at an angle of 45° between the half mirror portion of the main mirror 12 and the film 13. Luminous bundle for detecting focusing condition of the photographic lens 11 passed through the half mirror portion of the main mirror 12 is reflected downward by the submirror 14 to be guided to a focus detecting apparatus 15 arranged below a mirror box of the camera body.

In taking photographs, the main mirror 12 and the submirror 14 are rotated forward and upward to be displaced from the optical axis 10. The luminous bundle for photographing passed through the photographic lens 11 is formed on the film 13, so that image exposure is carried out on the film 13.

The focus detecting apparatus 15 comprises an AF sensor 17 comprising seven arrangements of photoelectric converting elements 16a, 16b, 16c, 16d, 16e, 16f and 16g. Three arrangements 16a to 16c of the photoelectric converting elements out of the arrangements 16a to 16g are arranged horizontally. Four arrangements 16d to 16g of the photoelectric converting elements are arranged approximately at right angle with the arrangements 16a to 16c of the photoelectric converting elements.

A separator lens plate 18 is provided in front of the AF sensor 17. Separator lens pairs 18a to 18g corresponding to the arrangements 16a to 16g of the photoelectric converting elements are formed in one unit on the separator lens plate 18. An aperture mask 19 is provided directly in front of the separator lens plate 18, the mask 19 having openings 19a to 19g corresponding to the separator lens pairs 18a to 18g. A reflecting mirror 20 is provided facing the aperture mask 19 and the submirror 14. The reflecting mirror 20 guides the luminous bundle for detecting focus reflected downward by the submirror 14 to the arrangements 16a to 16g of the photoelectric converting elements through the aperture mask openings 19a to 19g and through the separator lens pairs 18a to 18g. Condenser lenses 21a to 21g opposing to the aperture mask openings 19a to 19g are provided between the reflecting mirror 20 and the submirror 14. A field stop 22 is provided on the upper surfaces of the condenser lenses 21a to 21g. The field stop 22 has openings 22a to 22g for separating the luminous bundle for focus detection such that the bundle corresponds to the arrangements 16a to 16g of the photoelectric converting elements having different positions and directions.

The TTL phase difference detecting method is the principal of focus detection. Basic part luminous bundles a (represented by dotted lines in FIG. 2) and reference part luminous bundles b (represented by solid lines in FIG. 2) passing through different areas 11a and 11b, 11c and 11d on exit pupil of the photographic lens 11 are respectively received by the basic part A and the reference part B in each of the arrangements 16a to 16g of the photoelectric converting elements. Patterns of light distribution of the images formed by the received light are converted into electric signals in each of the arrangements 16a to 16g of the photoelectric converting elements and the correlative displacement thereof is determined by a correlation circuit (not shown). The photographic lens 11 is moved forward and rearward by a driving mechanism based on a deviation signal from the correlation circuit, so as to realize automatic focus adjustment.

Figure 2:
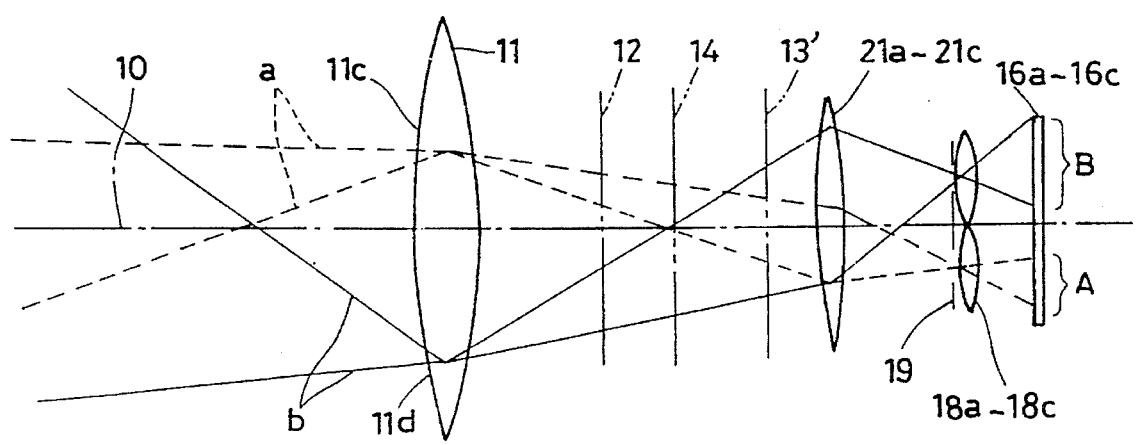
FIG. 2 is a diagram explaining principle of the focus detecting optical system shown in FIG. 1.

In the focus detecting optical system of FIG. 1, arrangements 16d and 16g of the photoelectric converting elements in the vertical direction are provided in addition to the arrangements 16a to 16c of the photoelectric converting elements in the horizontal direction. Therefore, focus detection in the horizontal direction and in the vertical direction can be simultaneously carried out, enabling focus detection of a horizon and the like.

Figure 3:
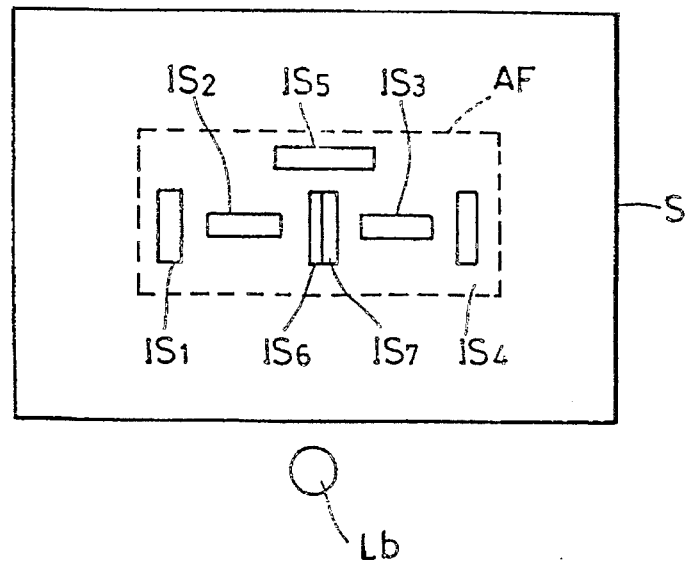
FIG. 3 is a diagram showing a display in a finder of a camera to which the present invention is applied.

FIG. 3 shows an indication in a view-finder of a camera employing the AF sensor 17 to which the photoelectric converting apparatus according to the present embodiment is applied. Focus detection can be carried out on objects positioned in areas IS1 to IS7 (hereinafter referred to as a first to seventh island, respectively) shown by solid lines at the center of a photographing screens. A rectangular frame AF is shown by a dotted line so as to inform the user of the area in which focus detection is carried out. An indicating portion Lb outside of the photographing screen S is provided to indicate the state of focus detection, which is turned on when the camera is brought into an in-focus state.

FIG. 4A shows light receiving portions of arrangements of CCD image pick up elements on the AF sensor 17 employed in the focus detecting apparatus. The arrangement of CCD image pick up elements includes seven line sensors, each comprising a light receiving portion, a charge storing portion and a transferring portion. A basic part and a reference part are provided for each of the islands IS1 to IS7 of FIG. 4, with the center of the optical axis positioned at the center between the basic part and the reference part. A plurality of monitoring light receiving elements (hereinafter referred to as monitor sensors) for controlling time of accumulation to the charge storing portion of the CCDs are provided on one side in the elongate direction of the basic part of each island, which will be described later.

The seventh island IS7 is a line sensor with a red filter. As will be described later with reference to FIG. 29, the seventh island is used, switching with the sixth island IS6.

The seventh island is provided in order to detect focusing condition only by an infrared light component without being affected by an ambient light or natural light when using the auxiliary light emitting infrared light component. Accordingly, it is conventionally impossible to detect focusing condition of an object of low contrast such as a white wall under ambient light, which is enabled by the present invention. Namely, in this system, only the auxiliary light component is extracted without being affected by the outer light and the camera is brought into an in-focus state in a contrast pattern of the auxiliary light. Accordingly, the performance of detecting focusing condition of the object of low contrast can be drastically improved, which will be described later in detail.

In the focus detecting apparatus of the present embodiment, the basic parts of the above-described seven islands are divided into a plurality of blocks, each block of the basic part is compared with a reference part to carry out detection.

Figure 6:
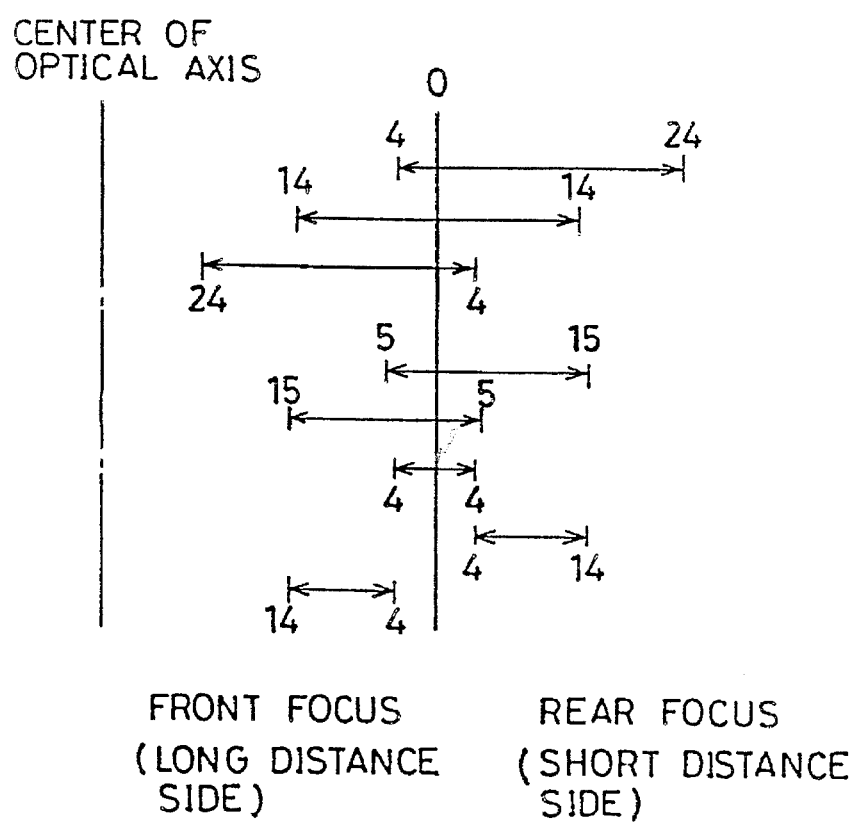
FIG. 6 is an explanation diagram showing the amount of shift of each divisional region in the CCD chip.
Figure 4B:
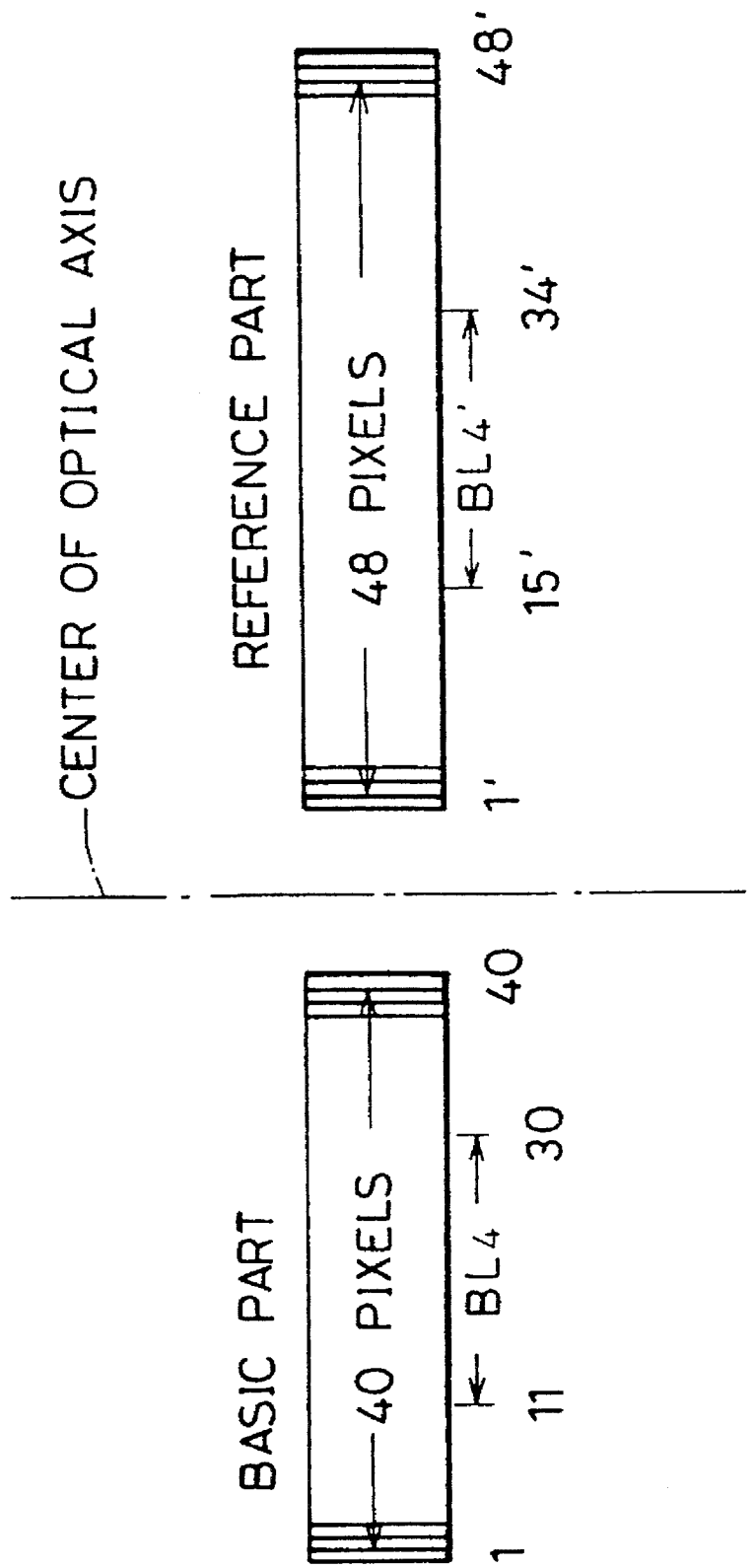
Figure 5:
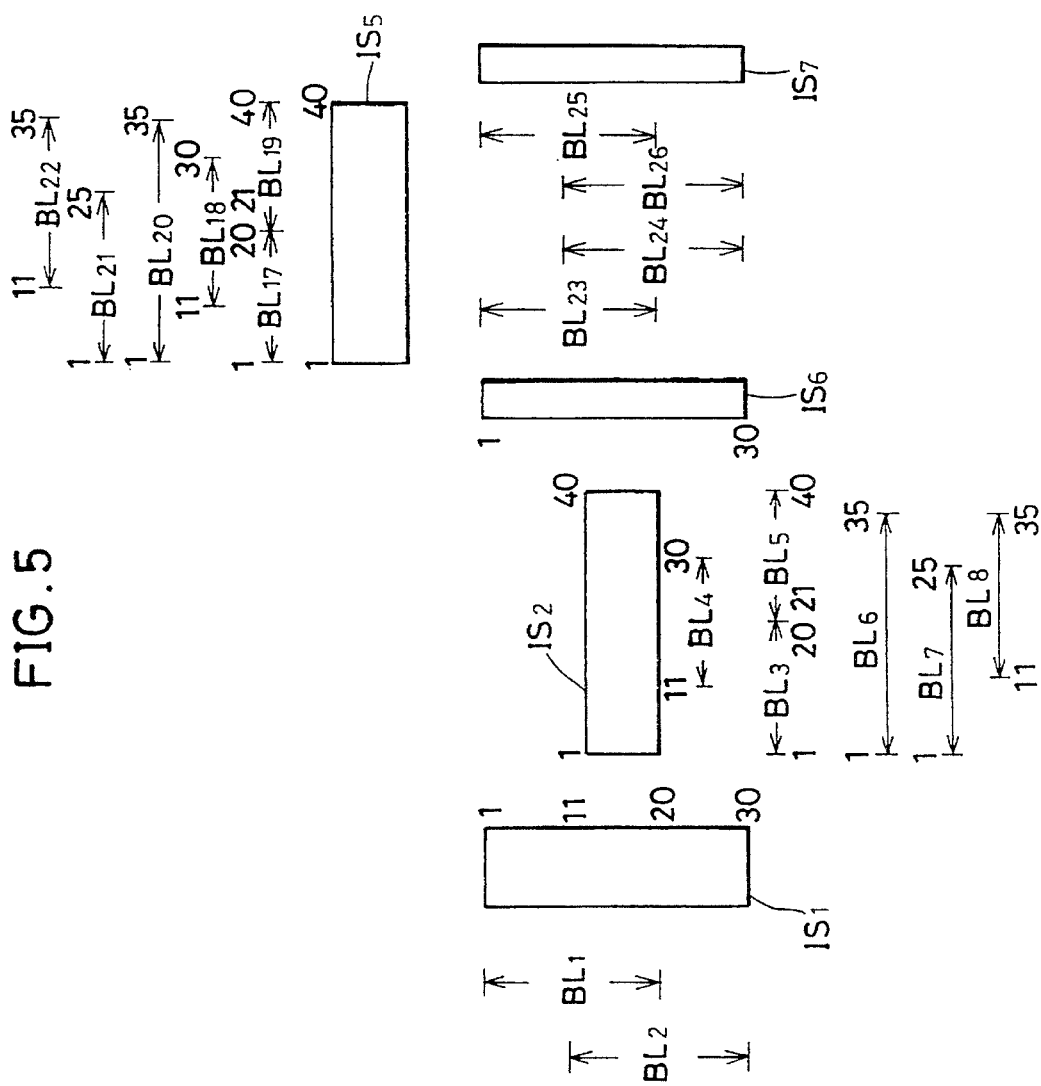
FIG. 5 is an explanation diagram showing divisional regions of a basic part of the CCD chip shown in FIG. 4.

The range of division and the range of defocus of the divided islands are shown in FIGS. 5, 6 and 4B. FIG. 5 shows in an enlargement, the focus detecting area on the photographing screen shown in FIG. 3. The respective islands IS1 to IS7 for focus detection correspond to the areas of the basic parts shown in FIG. 4A. In FIG. 5, the numerals shown in the respective islands indicate data number obtained by the CCD shown in FIG. 4A. The number of data (X', Y') in the basic parts and the reference parts of the respective islands are (30, 40) in the islands IS1, IS4, IS6 and IS7, (40, 48) in the islands IS2, IS3 and IS5. Each island is divided. Each of the islands IS1, IS4, IS6, IS7 is divided into two blocks. For example, the island IS1 includes two blocks BL1 and BL2, the block BL1 comprising data number (1 to 20) and the block BL2 comprising data number (11 to 30). Each of the islands IS2, IS3 and IS5 is divided into three blocks. For example, the island IS2 is divided into BL3, BL4 and BL5. The block BL3 comprises the data (1 to 20), the block BL4 comprises (11 to 30) and the block BL5 comprises (21 to 40)

In the focus detection employing the phase difference detecting method, the center of the optical axis is positioned between the basic part and the reference part. When the images in the basic part and the reference part match with each other and the distance between the images is larger than a prescribed distance, then it is determined as a rear focus state. If the distance is smaller than the prescribed distance, it is determined as a front focus state. If the distance is a prescribed distance, then it is determined as an in-focus state. Therefore, as for the defocus detectable range in the divided block, the blocks which are far from the center of the optical axis in respective islands correspond to the rear focus side. The reason for this is described in detail based on FIG. 4B. FIG. 4B shows the basic part and the reference part of the island IS2. Now, let us consider the range of defocus of the fourth block BL4. The in-focus state is realized when the images on the 15th to 34th elements (BL'4) from the left end in the reference part coincide with the images of the fourth block BL4. If the coincidence of the image occurs on the positions nearer to the left end of the reference part than the above described position, it is determined that the lens is in the front focus state. At that time, the largest number of deviated pixels of the front focus (hereinafter referred to as a deviation pitch) becomes 14. If the coincidence of the images occurs in the portions nearer to the right end of the reference part than the illustrated position, the lens is in the rear focus state, and the maximum deviation pitch of the rear focus is 14. The same is the case with the defocus detectable ranges of the divided blocks in other islands are the same.

The relation is shown in FIG. 6. In the third block BL3, the ninth block BL9 and the 17th block BL17, the deviation pitch in the front focus side is 4 and the deviation pitch in the rear focus side is 24. In the fourth block BL4, the tenth block BL10 and the 18th block 18, the deviation pitch in the front focus side and the deviation pitch in the rear focus side are 14. In the fifth, the 11th and the 19th blocks BL5, BL11 and BL19, the deviation pitch in the front focus side is 24 and the deviation pitch in the rear focus side is 4. The deviation pitch in the front focus side is 5 and the deviation pitch in the rear focus side is 15 in the first, the 15th, the 23rd and the 25th blocks BL1, BL15, BL23 and BL25. In the second block BL2, the 16th block BL16, the 24th block BL24 and the 26th block BL26, the deviation pitch is 15 in the front focus side and the deviation pitch is 5 in the rear focus side. In the sixth block BL6, the 12th block BL12 and the 20th block BL20, the deviation pitch is 4 in both rear focus side and the front focus side. The deviation pitch is 4 in the front focus side and the deviation pitch in the rear focus side is 14 in the seventh block BL7, the 13th block BL13 and the 21th block BL21 and the deviation pitch is 14 in the front focus side and the deviation pitch is 4 in the rear focus side in the eighth block BL8, the 14th block BL14 and the 22th block BL22. However, since calculation is carried out avoiding an overlap with the sixth block BL6, the deviation pitch of the seventh block BL7 are 4 to 14 in the rear focus side, and the deviation pitch in the eight block BL8 are 4 to 14 in the front focus side.

Figure 7:
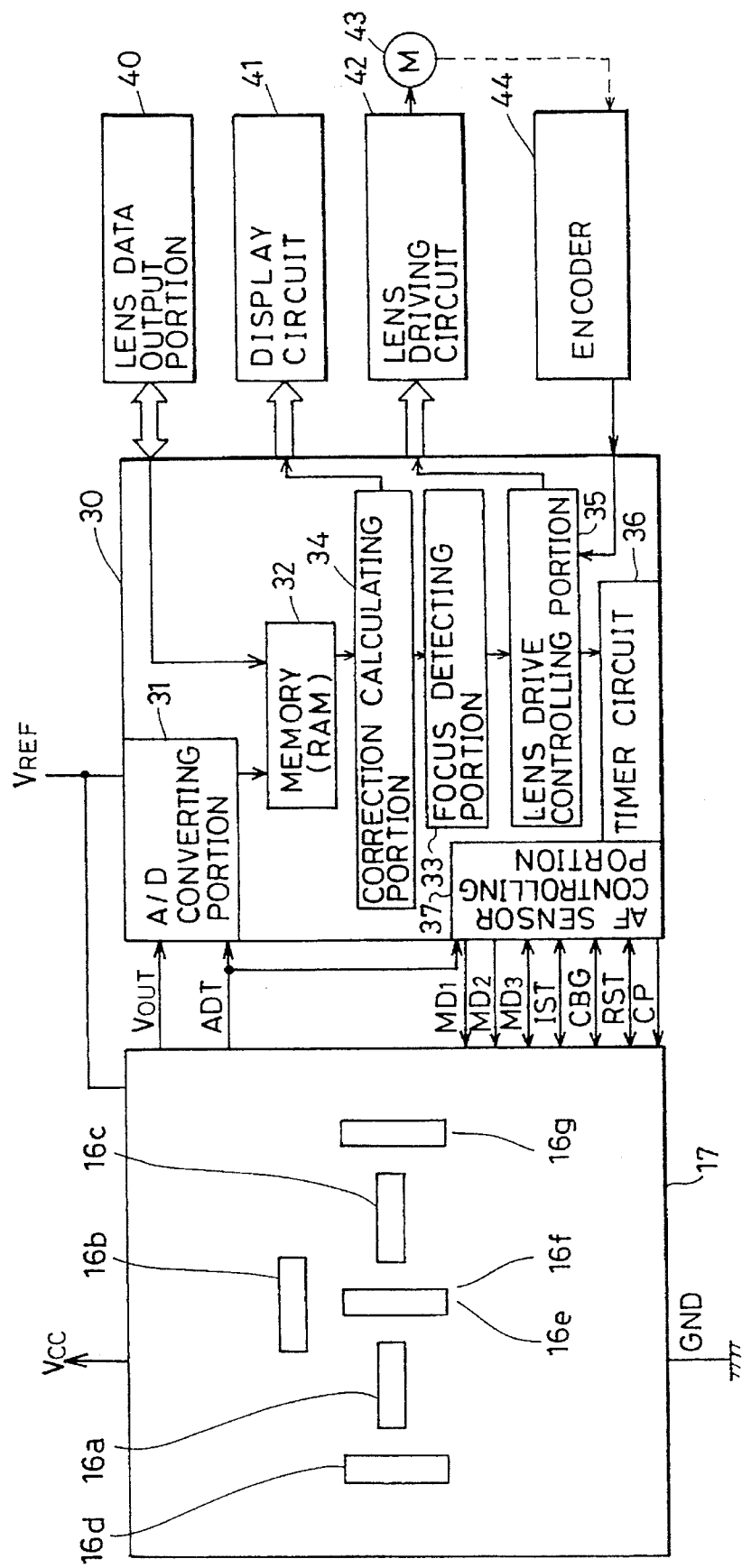
FIG. 7 is a block circuit diagram of an AF sensor and an AF controller employing the photoelectric converting apparatus according to the present invention.

FIG. 7 is a block diagram of an AF system of a focus detecting apparatus of a camera employing the photoelectric converting apparatus of the present invention. Referring to FIG. 7, a control portion comprises an AF sensor 17, an AF controller 30 and peripheral circuits thereof. The AF controller 30 is formed of one chip microcomputer, including an A/D converting portion 31 for converting analog signals provided from an analog signal output line $V_{out}$ of the AF sensor 17 into digital signals, and a memory portion 32 formed of a RAM. The memory portion 32 previously receives data such as defocus amount-lens moving amount converting coefficient $K_L$ which are different in various lenses and a color temperature defocus amount $dF_L$ from a lens data output portion 40 including an ROM of the photographic lens (interchangeable lens unit), and stores digital data from the A/D converting portion 31 one by one. The AF controller 30 further comprises a correction calculating portion 34 for calculating amount of correction based on the output from the memory portion 32; a focus detecting portion 33 for detecting an in-focus point based on the correction amount calculated by the correction calculating portion 34; a lens drive controlling portion 35 for transmitting a signal for driving the lens to a lens driving circuit 42 based on the detection output of the focus detecting portion; a timer circuit 36 for measuring time in order to monitor whether or not accumulation value in the AF sensor 17 (hereinafter the term "charge storage" will be referred to as "accumulation") reaches a prescribed value within a prescribed time period; and an AF sensor controlling portion 37 for exchanging signals with AF sensor 17. The lens drive controlling portion 35 receives data in association with movement of the lens from an encoder 44. A lens driving motor 43 is connected to the lens driving circuit 42 and a display circuit 41 is controlled by the AF controller 30. The AF sensor 17 and the AF controller 30 are separately formed, each on 1 chip. Therefore, the AF system as a whole comprises 2 chips in total. An analog reference voltage $V_{REF}$ is applied to the A/D converting portion 31 of the AF controller 30 and to the AF sensor 17. The AF sensor 17 is connected to a power supply line Vcc and the ground line GND.

The AF sensor 17 and the AF controller 30 are connected to each other by nine signal lines, namely, MD1, MD2, MD3, IST, CBG, RST, CP, Vout and ADT. The mode terminal MD1 constituting the signal line is a terminal for inputting a signal for switching accumulation and reading modes. The mode terminal MD2 is a terminal for inputting a signal for selecting arrangements of pixels to be read, a signal for selecting a monitor sensor and a signal for selecting ST and PD accumulation which will be described later and outputting accumulation completion information 1. The mode terminal MD3 is a terminal for transmitting input of the signal for selecting arrangements of pixels to be read, the signal for selecting a monitor sensor, a signal for directing a reading speed switching input and a clock stop and for outputting accumulation completion information 2.

The accumulation starting signal input terminal IST inputs an accumulation starting signal and a signal for controlling an output mask.

In the present embodiment, a read starting signal input terminal RST has a function of switching input/output to input a read starting signal and output a gain information signal. The ADT outputting signal terminal ADT outputs a timing signal for a pixel data output and accumulation completing signal. The accumulation completing terminal CBG inputs a forced completion signal, a barrier gate control signal and a black level clamp signal for CCDs constituting the photoelectric converting apparatus. In other embodiments which will be described later, the terminals RST and CBG have different functions. The signal output terminal Vout outputs a signal from each island. The clock pulse input terminal CP inputs a clock pulse. Operation of each terminal will be described in detail in the following.

The mode terminals MD1, MD2 and MD3 are signal lines for outputting logic signals from the AF controller 30 to the AF sensor 17 for setting an operation mode of the AF sensor 17. The operation mode of the AF sensor 17 comprises three modes, that is, low brightness accumulation mode, high brightness accumulation mode and data dump mode. The operation mode is selected in accordance with a combination of the logic levels on the signal lines MD1, MD2 and MD3. Reference clocks supplied from the signal line CP can be ON/OFF controlled in the AF sensor 17 by setting the signal line MD3 to high (a logical high) while outputting pixel data (when the signal line MD1 is high and IST is high) and the operation of the AF sensor 17 is temporarily stopped by turning OFF the reference clock. The AF controller 30 is capable of controlling other circuit portions, for example the lens driving circuit 42 and the like. The signal line ADT indicates completion of output of 1 pixel data of the AF sensor 17 in the data dump mode, and supplies an ADT signal indicating a start of A/D conversion to the A/D converting portion 31 in the AF controller 30. In other modes, an interruption signal indicative of a completion of accumulation is outputted from the AF sensor 17 to the AF controller 30 at the time when charges are stored to a proper level in the respective islands of the AF sensor 17. The signal output terminal Vout is an analog signal line, through which outputs Vout from the arrangements 16a to 16g of the photoelectric converting elements in the AF sensor 17 in an analog manner are supplied to the A/D converting portion 31 in the AF controller 30 from the AF sensor 17. The outputs Vout are outputted for every pixel in synchronization with the above mentioned ADT signal, and are A/D converted to be received by the AF controller 30 as the object image information provided from the AF sensor 17.

Specific structure of the AF sensor 17 will be described in the following with reference to FIG. 7. The arrangements 16a to 16g of the photoelectric converting elements are shown in the left side of the figure, and an I/O portion to the AF controller 30 is shown in the right side. The arrangements 16a to 16g of the photoelectric converting elements comprise seven islands IS1 to IS7 arranged in such a manner as shown in the display of the finder of FIG. 3, each controlled independently in principal.

Figure 8A:
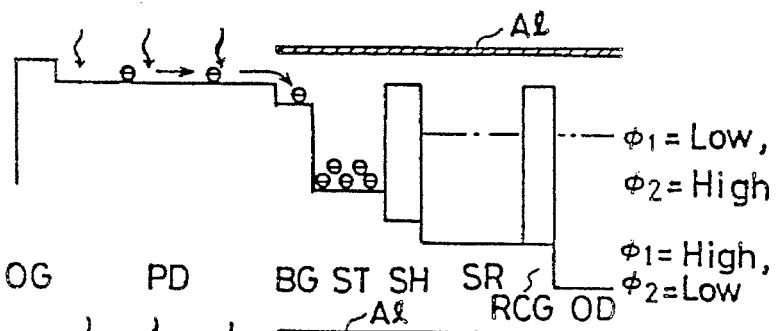
FIGS. 8(a)–8(d) and 9(a)–9(d) are explanation diagrams showing different accumulation modes of the photoelectric converting apparatus according to the present invention.

The AF sensor incorporating the focus detecting photoelectric converting apparatus according to the present invention has two kinds of accumulation modes (high brightness accumulation mode and low brightness accumulation mode) dependent on the brightness of the object. FIGS. 8(a)–8(d) are a diagram showing a supply potential in each portion of the photoelectric converting element in the high brightness accumulation mode (referred to as ST accumulation hereinafter). FIG. 8(a) shows a state during the accumulation operation (during the storage of charges). The potential of the barrier gate BG is set to high (hereinafter referred to as "H") such that the charge generated in the photo-diode PD by photoelectric conversion is flowed into the charge storing portion ST. A prescribed potential is applied to the barrier gate BG to open the gate, thereby rendering a supply potential of the accumulation storing portion ST high to facilitate the accumulation of the charge. At this time, the potential of the shift gate SH is rendered low (hereinafter referred to as "L") to avoid the flow of the charge to be stored in the charge storing portion ST into the shift register SR portion.

Figure 8B:
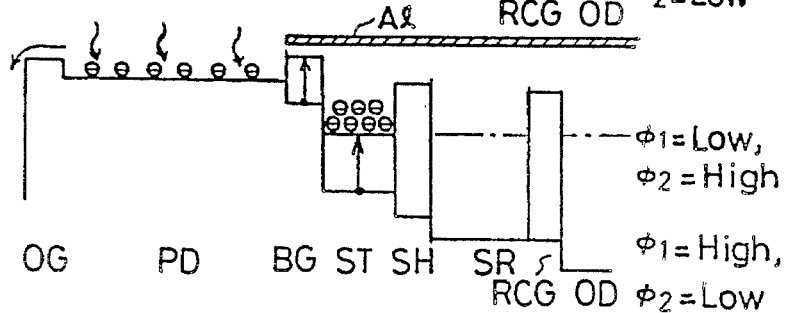

FIG. 8(b) shows accumulation completing operation. The potential of the barrier gate BG is set at a "L" and a prescribed potential is applied to the barrier gate BG to close the gate, which prevents flowing of the charge generated in the photo-diode PD into the charge storing portion ST. The supply potential of the charge storing portion ST is set at a "L" to suppress generation of a dark current in the charge storing portion ST. In this state, pixel data is stored for a short time period.

Figure 8C:
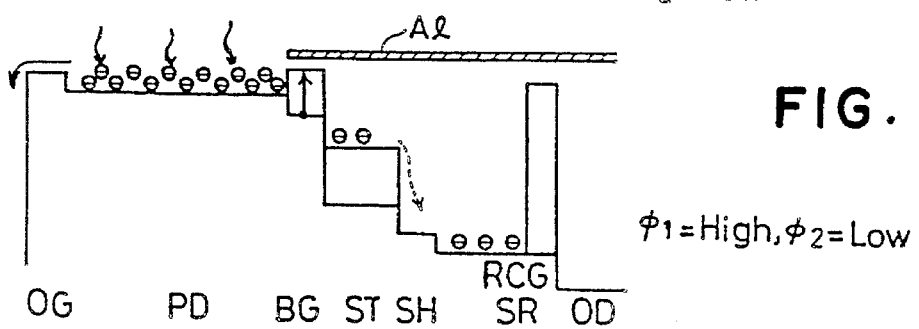

FIG. 8(c) shows a state at the start of reading. The potential of the shift gate SH is set to a high level from the state of (b) in response to the data reading request of the system controller (microcomputer), so that the shift gate SH is opened to transfer the stored charge to the SR portion. The accumulated charge transferred to the SR portion is transferred to an analog portion by transfer clocks $\phi 1$ and $\phi 2$.

Figure 8D:
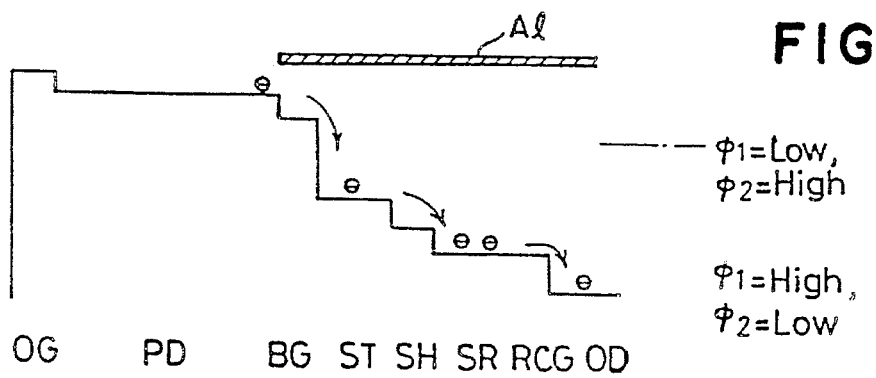

FIG. 8(d) is a diagram of a supply potential in a state where accumulation clearing operation is carried out.

Figure 9A:
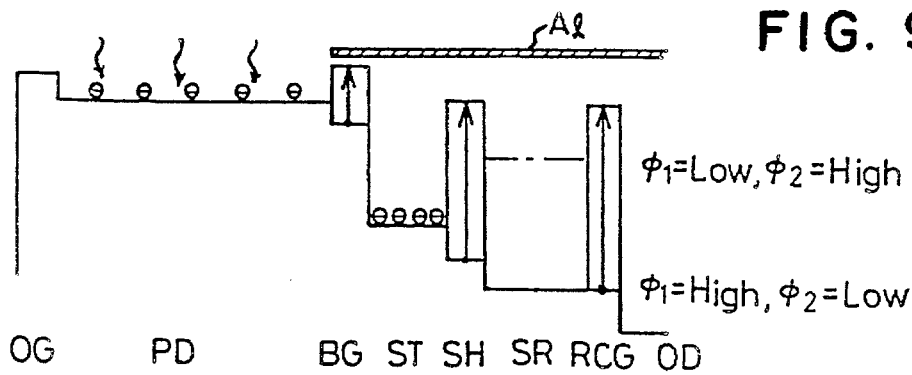

FIGS. 9(a)–9(d) are a diagram of a supply potential in a low brightness accumulation (hereinafter referred to as PD accumulation) mode. FIG. 9(a) shows a state during accumulation after the accumulation clearing operation. The potential of the barrier gate BG is set to a "L" to close the barrier gate BG, differently from the high brightness accumulation mode where the generated charge is stored in the charge storing portion ST. The charge storing is carried out on the photodiode PD.

Figure 9B:
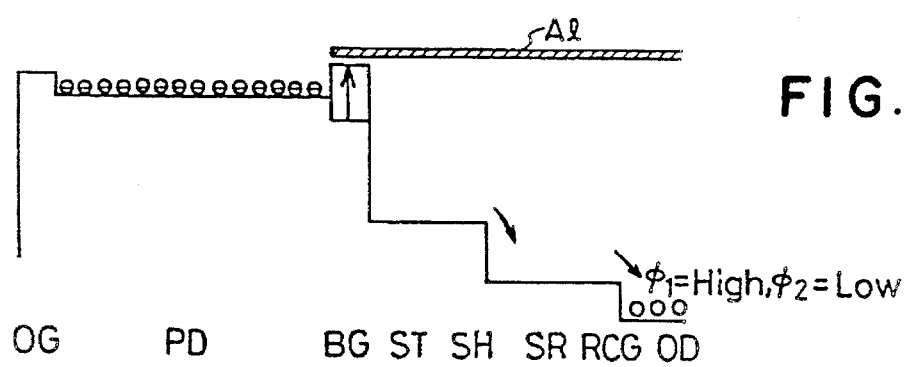

In FIG. 9(b), the charge generated in the charge storing portion ST during the accumulation shown in (a) is discharged to a power supply OD by setting the potentials of the signals SH, RCG and ST, ICG to "H", whereby dark currents flow.

Figure 9C:
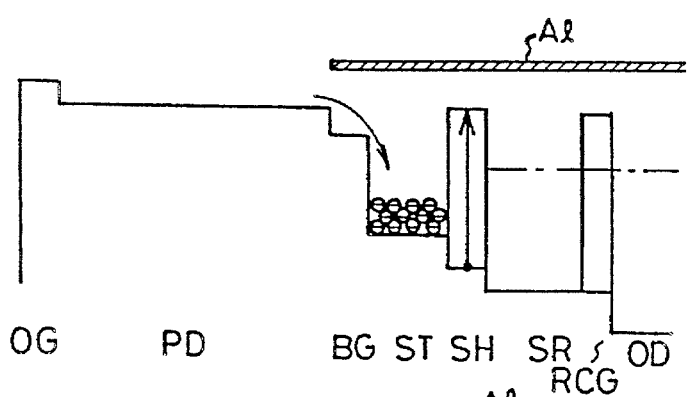

FIG. 9(c) shows a state after the flowing-out of the charge generated in the charge storing portion ST in (b). The potential of the barrier gate BG is increased to a high level, so that the barrier gate BG is opened to transfer the stored charge to the charge storing portion ST. At this time, the potential SH of the shift gate is set to a "L" to avoid the flowing of the charge transferred to the charge storing portion ST into the SR portion.

Figure 9D:
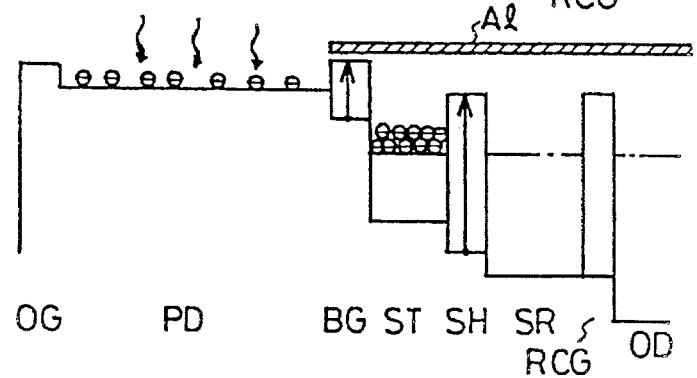

FIG. 9(d) shows a state after the transfer of the stored charge to the charge storing portion ST in (c). The potential of the barrier gate BG is set to "H" so that the barrier gate BG is closed to prevent the charge generated in the photodiode PD portion later from flowing into the charge storing portion ST. In addition, the supply potential of the charge storing portion ST is set to "L" to suppress generation of dark currents in the charge storing portion ST. The subsequent operations are the same as those in the high brightness accumulation mode. The accumulation clearing operation is the same as that of FIG. 8 (d).

As the foregoing, the accumulation completing operation is more complicated in the low brightness accumulation (PD accumulation) mode than in the high brightness accumulation (ST accumulation) mode. Accordingly, there is a case where over-accumulation is carried out due to a delay of the completion of accumulation in the high brightness accumulation. However, since the dark current in the photodiode PD portion is smaller than that in the charge storing portion ST, the effect of the delay in the completion of the accumulation is minimum when the brightness of the object is low, which is advantageous. Therefore, the above-described two types of accumulation modes are used.

Figure 10:
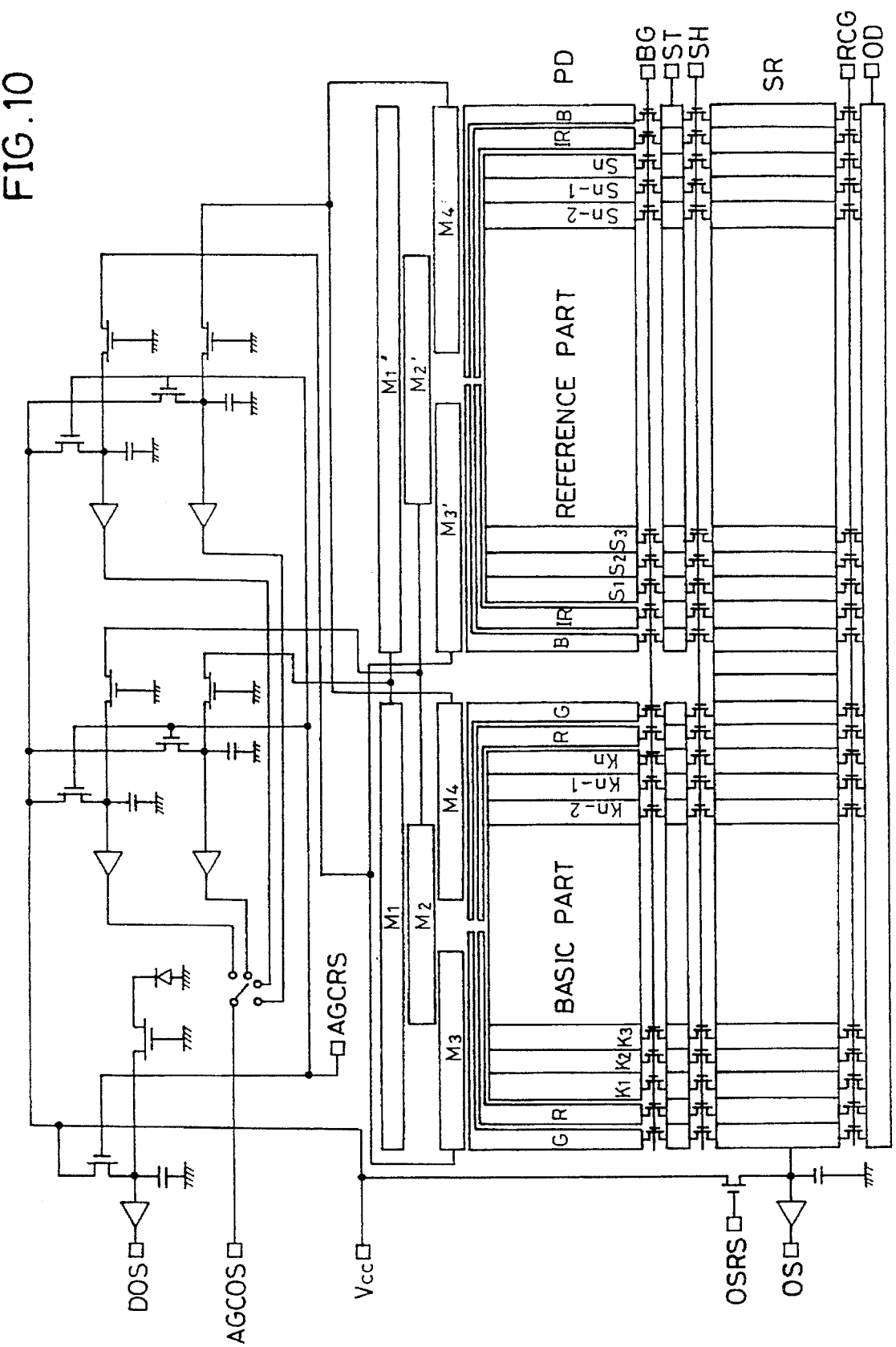
FIG. 10 is a diagram showing arrangements of color detecting elements and monitors according to the present invention.

FIG. 10 is a diagram showing the arrangements of color detecting elements and monitor pixels. As illustrated, the color detecting element has pixels with green (G) and red (R) filters arranged at both ends of the arrangement of pixels of the basic part. Pixels with blue (B) and infrared (I.R) filters are arranged at both ends of the arrangement of pixels of the reference part. The respective pixels extend covering the upper sides of the basic part and the reference part. A pixel area of each color detecting element is the same as those of the other pixels. As a result, a color temperature of the light source illuminating the object is sensed to correct shift of focus in each wavelength, thereby improving precision in the focus detection. In addition, the output of each color detecting element enables the sensing of a skin colored object (person). The method of detecting a skin colored object (person) will be described later.

As shown in FIG. 10, both of the basic part and the reference part of the image sensor respectively have four types of monitor pixels M1 (M1') to M4 (M4') arranged therein. These can be selected for use by the microcomputer. Each of the four types of monitor pixels has the same amount of area in order that output of pixels for focus detection covered by a monitor pixel reaches a proper level.

The monitor pixel M1 (M1') is a monitor pixel for a common use, which monitors an output of photoelectric conversion of the entire pixel area. However, if there is an object having very high brightness around the main object (for example in the back-lit scene or the like), if the monitor pixel (M1) M1' is used, accumulation of the image sensor is completed before the output of the pixel for the main object reaches a proper level because of the effect of the brighter portion. Accordingly, focusing condition can not be detected precisely. Namely, output of the pixel receiving light from the main object has inadequate level to make the contrast low, which disables focus detection on the main object, so that the camera is focused on the brighter portion (the portion not including the main object).

The present invention is directed to provide a focus detecting photoelectric converting apparatus preventing such problems to allow accurate in-focus on a main object. More specifically, when the microcomputer makes the determination that the main object is located at the center portion, the microcomputer selects the monitor pixel M2 (M2') to carry out accumulation by the output of the monitor. As a result, the output of the pixel for the main object is set to a proper level. At this time, the output for the bright portion is overflowed, so that focus detection is carried out only in the waveform portion of the output for the main object, allowing accurate focusing on the main object. Similarly, when the main object is located at the right side, the monitor pixel M3 (M3') is used and when the main object is located at the left side, the monitor pixel M2 (M2') is used. As a result, a focus detecting photoelectric converting apparatus can be provided which allows focusing on the main object with high precision.

The photo-diode PD, the barrier gate BG, the charge storing portion ST, the shift gate SH, the shift register SR and the signal terminals RCG and OD shown in FIG. 10 correspond to the portions having the same numerals shown in FIG. 9(a)–9(d).

(1) The First Embodiment (two-terminal output type)

Figure 11:
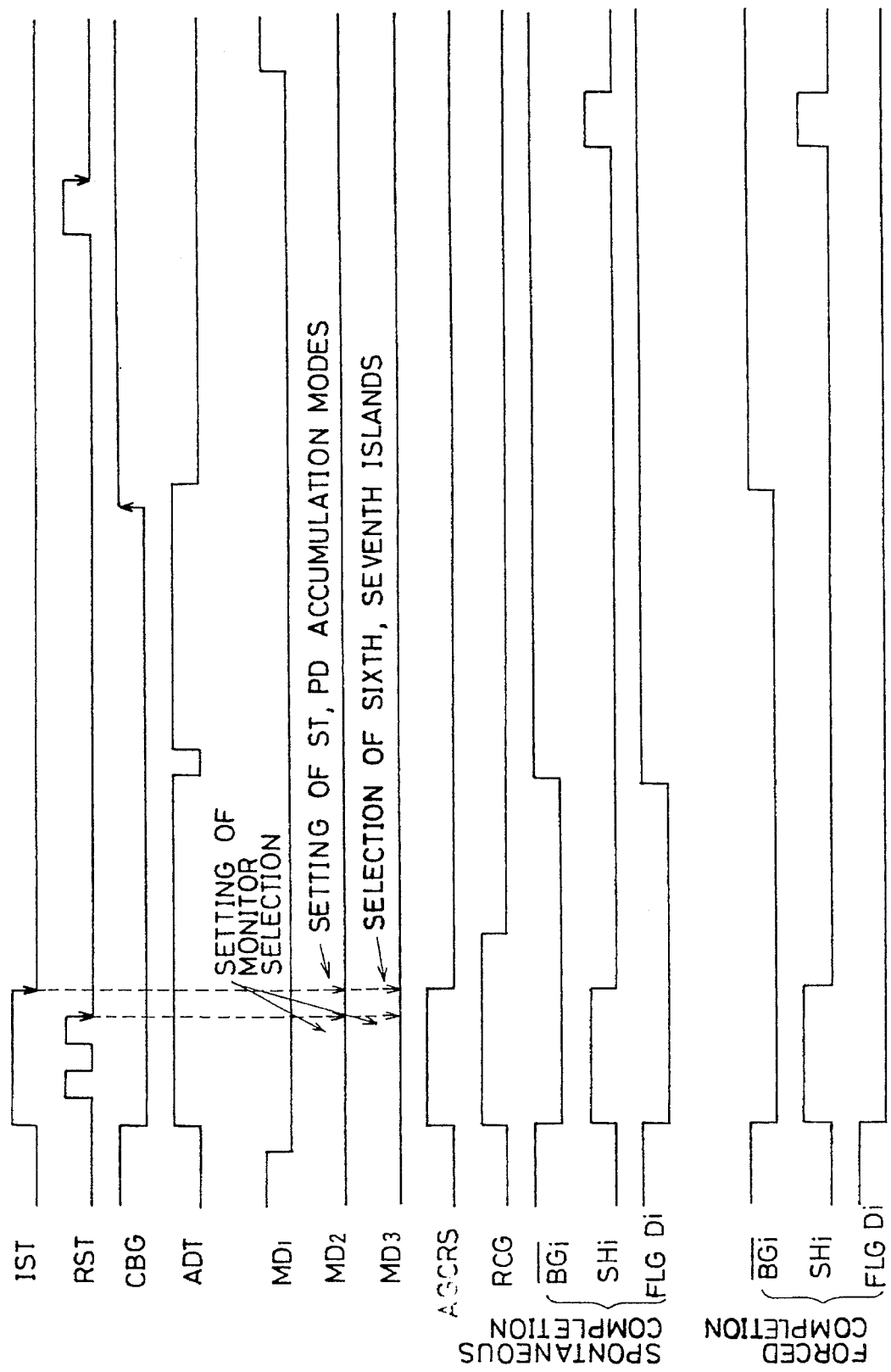
FIGS. 11–14 are time charts according to a first embodiment of the present invention.

In the first embodiment, a sense output of an image sensor is outputted from the two terminals. FIG. 11 shows a time chart of the two-terminal output type photoelectric converting apparatus in the ST accumulation. First, a long H pulse is inputted to an accumulation starting signal IST. As a result, a low level potential is applied to a signal $\overline{Bgi}$ and high level potentials are applied to a shift gate SH and a register clear gate RCG in order to discharge unnecessary charge. In the meantime a short read starting signal RST pulse is inputted twice. As a result, an automatic gain control circuit (hereinafter referred to as a AGC circuit) is reset. Then, a low level potential is applied to the shift gate SH at a fall of the signal IST pulse, so that the shift gate SH is closed, thereby starting accumulation.

At this time, monitor selection is carried out by using mode terminals MD2 and MD3 at a fall of the signal RST. The terminal MD2 selects an accumulation mode and the terminal MD3 selects the sixth or seventh island at the fall of the signal IST. The monitor selection is selection of monitor pixels for use made by the microcomputer among the monitor pixels M1 (M1') to M4 (M4'). The accumulation mode setting is carried out by setting the ST accumulation and the PD accumulation by the microcomputer based on the previous accumulation time. Namely, when the previous accumulation time is shorter than a prescribed time (when the object has high brightness), the ST accumulation is carried out and when it is longer (in low brightness) the PD accumulation is set. The switching between the sixth and the seventh islands is referred to as switching between the arrangement of ordinary pixels (the sixth island) and the arrangement of red filter pixels (the seventh island) depending on whether auxiliary light is used or not.

Completion of accumulation will be described. The fall of the signal IST starts accumulation, whereby a monitoring level is lowered in accordance with the amount of incident light. When the level falls below a predetermined threshold in a certain time period, which is considered that the amount of incident light to the image sensor reaches a sufficient value, a FLG-Di which is an accumulation completing signal of the AGC is inverted, the signal $\overline{Bgi}$ is set to a high level and the potential of the barrier gate $\overline{Bgi}$ is lowered to a "L" level to complete the accumulation, thereby falling the signal ADT. When the accumulation in the other islands is not completed, the signal ADT is caused to rise after a lapse of a predetermined time to prepare for the subsequent completion of accumulation.

Forced completion will be described. In the AF system, the lens should be driven to an in-focus position within a time in which a photographer does not feel uncomfortable. Therefore, a maximum accumulation time is settled in the system. Accordingly, when the accumulation time reaches the maximum, the microcomputer forcibly completes the accumulation. First, the microcomputer causes the signal CBG to attain a high level such that the accumulation is forcibly completed. As a result, the completion of accumulation is transmitted to the CCD. Then, the CCD prevents the flowing of the charge from the photo-diode portion PD to the charge storing portion ST by rendering the signal $\overline{Bgi}$ high and the potential of the barrier gate Bgi low to complete the accumulation, thereby rendering the signal ADT low. In this time chart, one of the four islands is spontaneously completed and the other three are forcibly completed. After the CCD finishes the accumulation completing operation of all the islands, the microcomputer inputs the signal RST pulse to start a reading operation.

The PD accumulation will be described with reference to FIG. 12. While the accumulation starting operation is approximately the same as that of the ST accumulation, the signal $\overline{Bgi}$ level is set at "H" simultaneously with the fall of the signal IST pulse because such operation of the signal BG as shown in FIG. 9 is required. After the accumulation is cleared, the generated charge is stored in the photo-diode PD portion. At this time, the shift gate signal SH1 level is maintained at high and the dark charge generated in the charge storing portion ST is discharged to the shift register portion SR.

With respect to the spontaneous completion, while in the ST accumulation, when the signal FLG-Di attains a high level, the signal $\overline{Bgi}$ is set at a "H" and the signal ADT is set at a "L", in the PD accumulation, and the unnecessary charge generated in the charge storing portion ST is discharged by opening the shift gate SH before opening the barrier gate BG and thereafter the barrier gate BG is opened after the shift gate SH is closed. As a result, the generated charge is transferred from the photodiode portion PD to the charge storing portion ST, so that the barrier gate BG is closed to complete the accumulation. Thus, the microcomputer sets the signals SH and ADT at a low level after the signal FLG-Di attains a high level. Thereafter, the signal $\overline{Bgi}$ is set at a low level and after a lapse of a predetermined time (100 μs) the signal $\overline{Bgi}$ is set at a high level. The accumulated charge is transferred from the photo-diode portion PD to the charge storing portion ST in 100 μs.

The forced completion is carried out similarly to that of the ST accumulation. The signal CBG is set to a high level and subsequent operations are the same as those of the spontaneous completion. After the completion of the accumulation for all the islands, a reading operation is started by inputting the signal RST pulse.

Figure 14:
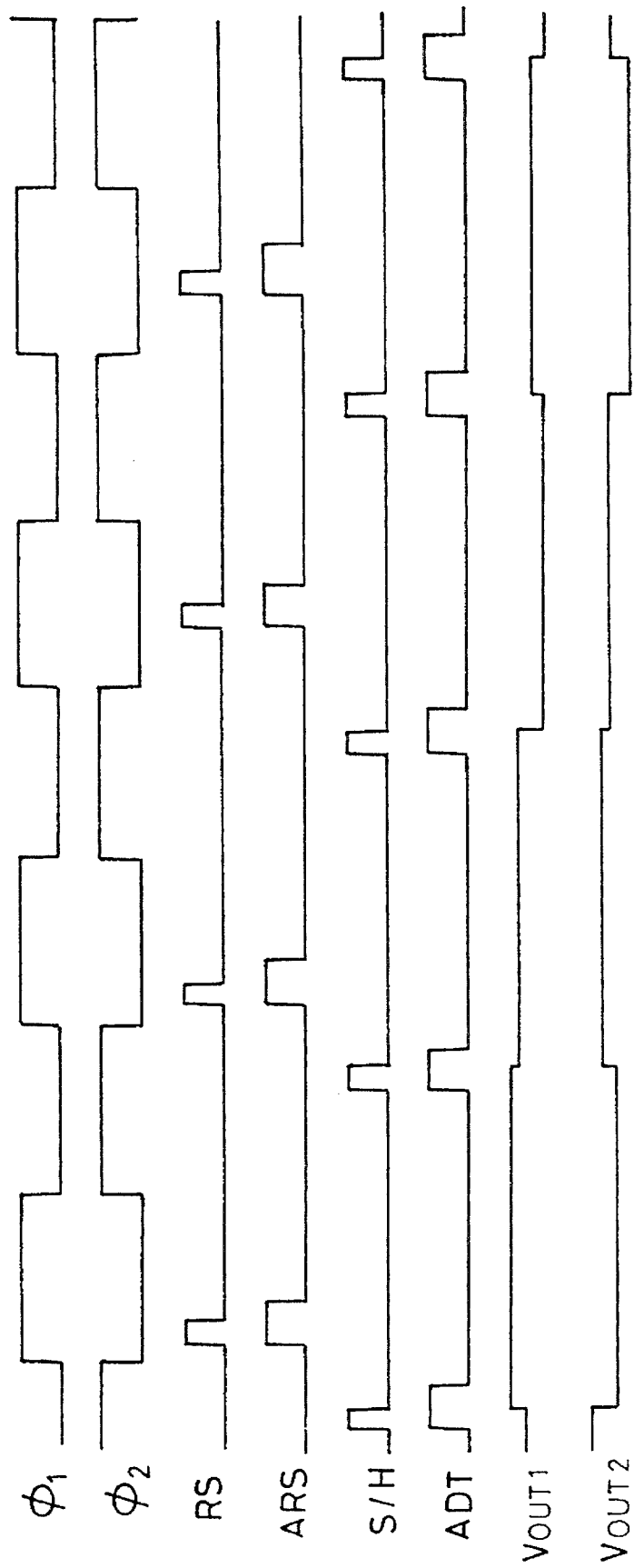
Figure 15:
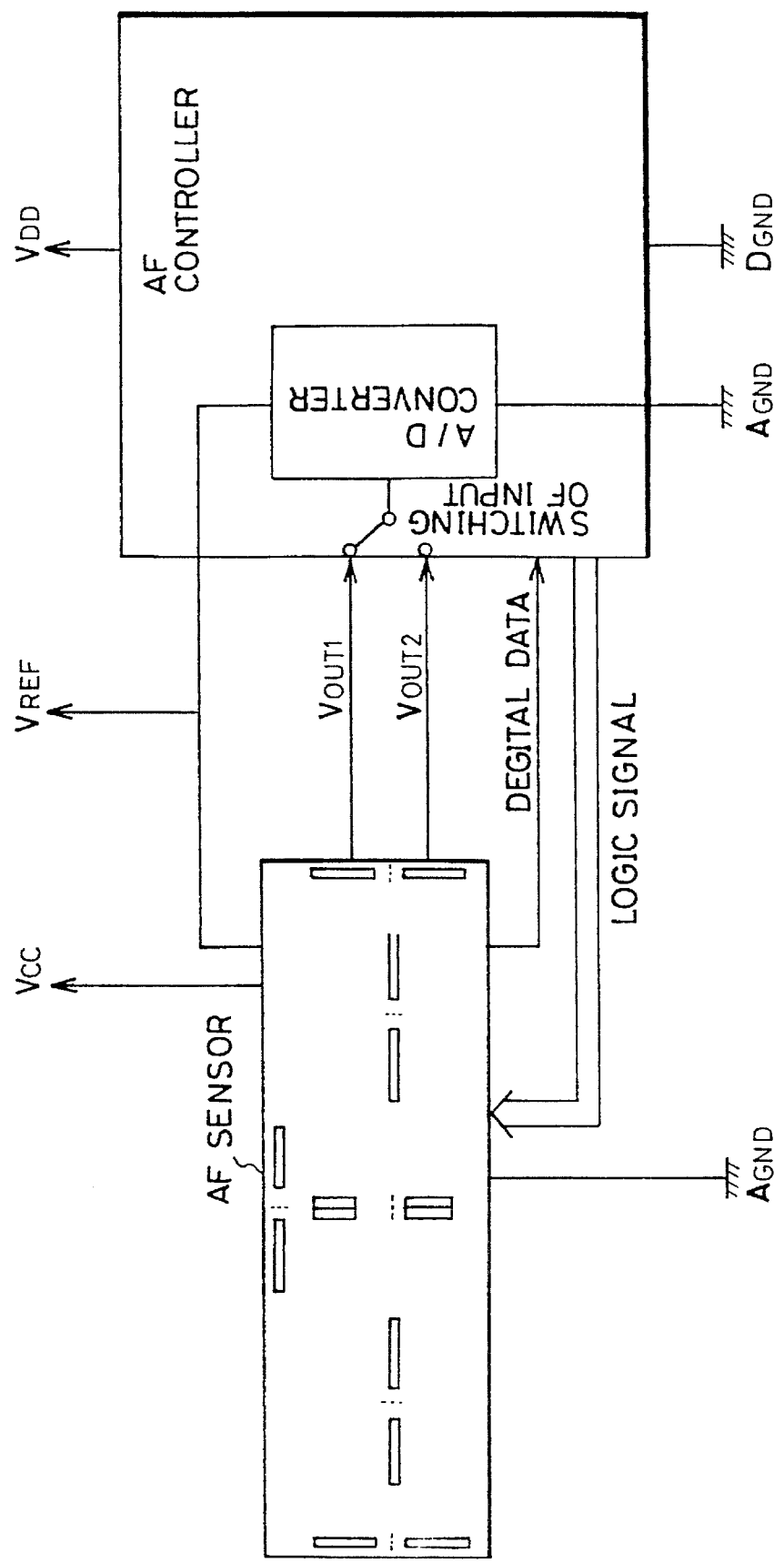
FIG. 15 is a block diagram showing a main part of a 2-terminal output type photoelectric converting apparatus according to the first embodiment of the present invention.

Reading operation of a two-terminal input type apparatus will be described with reference to FIGS. 13 to 15. As shown in the block diagram of two-terminal output type apparatus of FIG. 15, the analog data from the CCD is outputted from terminals Vout1 and Vout2. Meanwhile the A/D converter has one input. The output of the terminals Vout1 and Vout2 is A/D converted by alternately switching input of each pixel. If the A/D converter has two inputs, the output is simultaneously inputted to the A/D converter.

Figure 13:
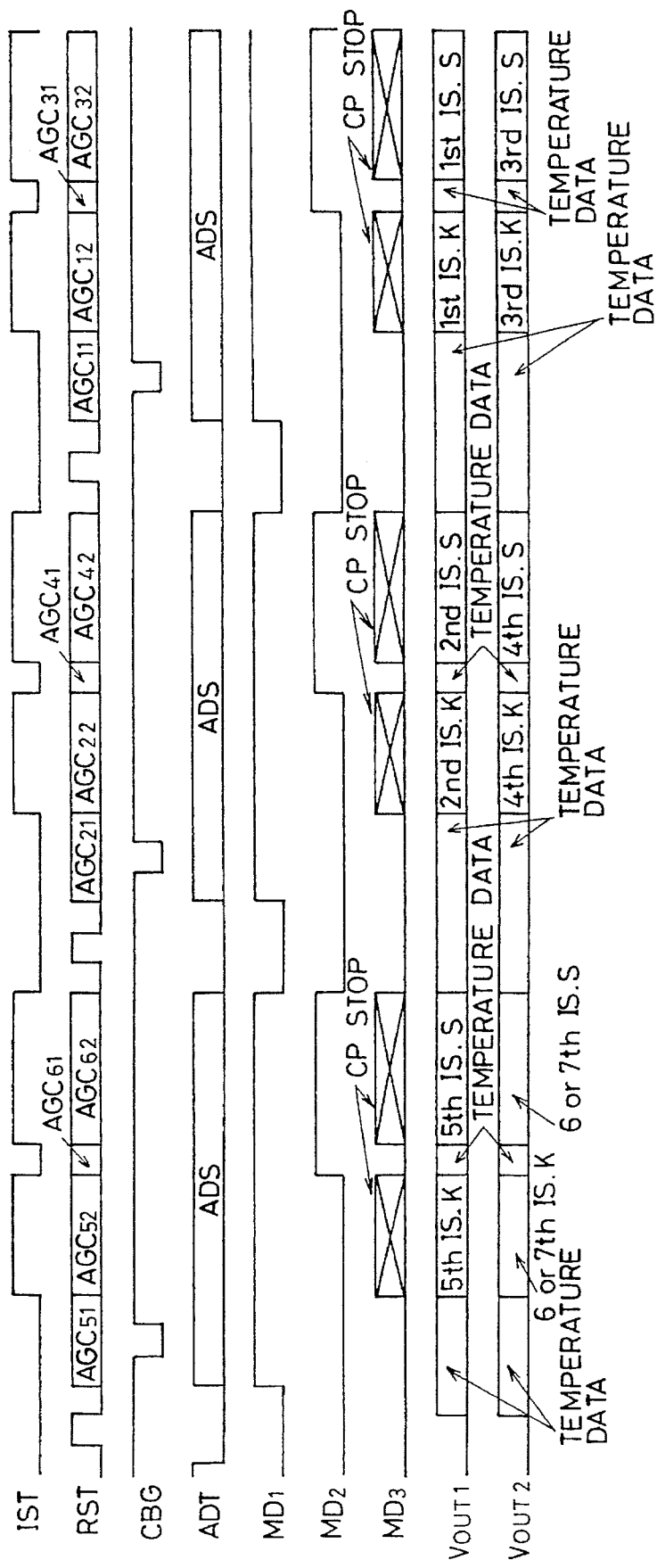

As shown in FIG. 13, in the two-terminal output type apparatus, the mode terminal MD1 is set to a high level after inputting of the signal RST pulse and the AF sensor is set in the data dump mode. The data of the fifth island is outputted from the terminal Vout1 in synchronization with the ADT signal (ADS signal) which is a timing signal of the pixel data output and the data of the sixth or the seventh island is outputted from the terminal Vout2. At this time, by setting the signal CBG to low at the output of pixels of the black basic part, the black basic output is sampled and held. The black basic output is thus sampled and held for the following reasons. A dark current of a CCD increases in proportion to the temperature. Accordingly, the output of the pixel of the black basic part wherein light is intercepted by aluminum, is subtracted from a photoelectric conversion output as a representative of the entire pixel. As a result, only the actual photoelectric conversion output excluding the dark current component is outputted. In addition, when output of pixels in the basic part or output of pixels in the reference part is outputted, a temperature data output is switched to a pixel data output to be outputted from the terminal Vout by setting the signal IST to a high level.

The input terminal of the read starting signal RST is an input/output switching terminal which switches AGCs 51, 52, 61 and 62 by the signals MD2 and IST and outputs the same. When interrupted by others during the data dumping and if the processing thereof is given priority to be carried out, the clock pulse is stopped by setting the signal MD3 to a high level when the signal IST is high. Then, the data dumping is interrupted. The AGC51 and the AGC52 indicate two bit data of the AGC signal from the fifth island IS5, wherein 1 and 2 representing the first data and the second data, respectively.

When the reading of the pixel outputs of the basic part and the reference part is completed, the signal MD1 is set to a low level and the signal RST pulse is inputted, whereby the subsequent pixel output, that is, the pixel data of the second and the fourth islands IS2 and IS4 is read. The reading manner is the same as that of the fifth and the sixth islands IS5 and IS6.

Then, the outputs of the first and the third islands IS1 and IS3 are read. In the present embodiment, the order of the islands to be read is settled as described above, which is changed every time the signal RST pulse is inputted. FIG. 14 shows the relation among the pixel output signals Vout1 and Vout2, the external output signal ADT, the internal signals φ1, φ2, RS, ARS and S/H, wherein φ1 and φ2 are transfer clocks of a CCD, RS is a reset signal of the output portion of the CCD, ARS is a reset signal of the output amplifier and S/H is a signal for sampling and holding the output signal Vout.

Figure 16:
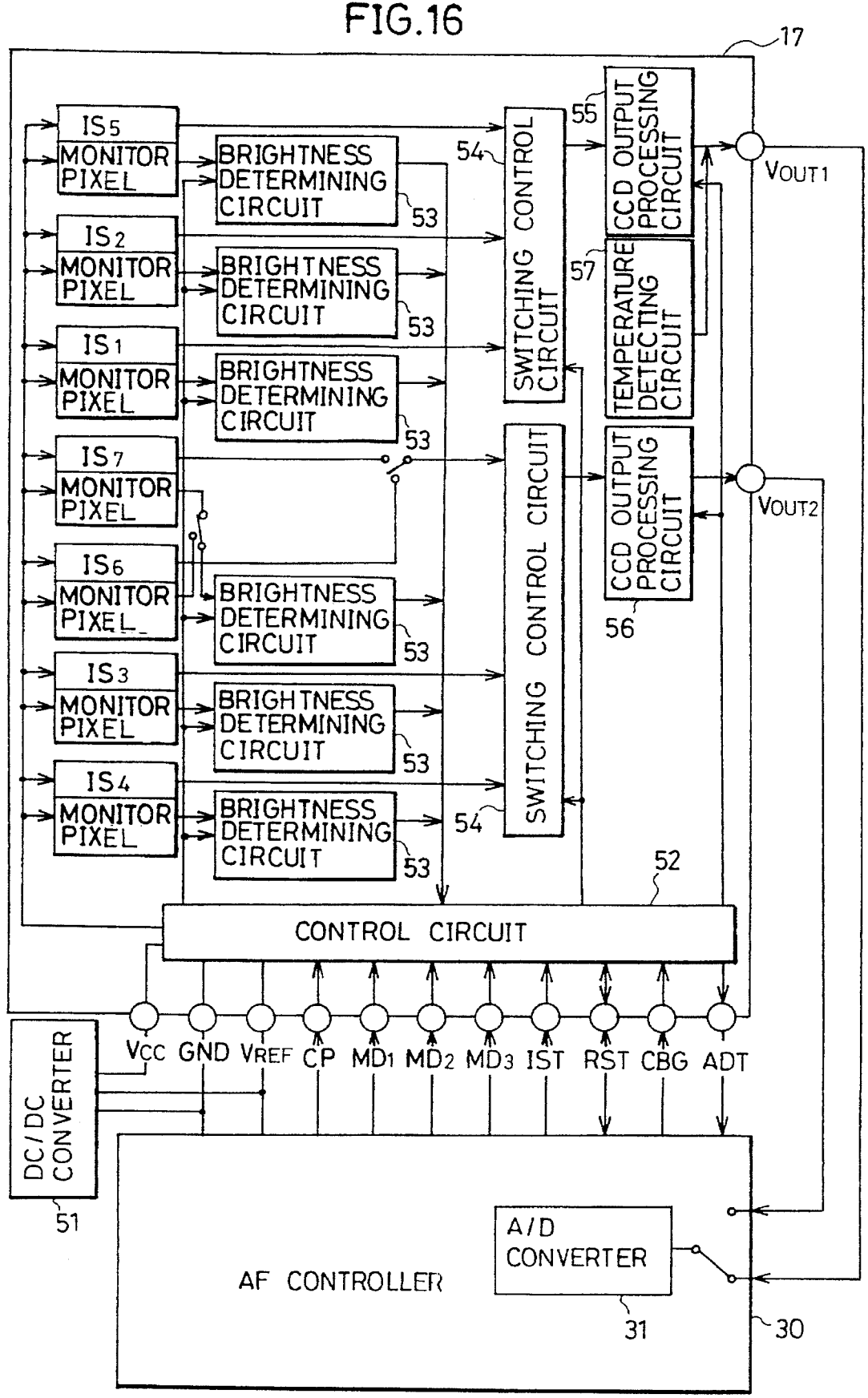
FIG. 16 is a block diagram showing a main part of the photoelectric converting apparatus according to the present invention.

FIG. 16 is a block diagram showing the details of the AF sensor of two-terminal output type apparatus and the periphery thereof. Referring to FIG. 16, a device arrangement of a two-terminal output type device will be described. A focus detecting photoelectric converting apparatus comprises an AF sensor 17 for detecting a brightness distribution of an object, an AF controller 30 for controlling the AF sensor 17 and a DC/DC converter 51 for supplying a potential for driving the AF sensor 17 and the AF controller 30. The AF sensor 17 includes seven islands IS1-IS7 constituted by CCDs which is described with reference to FIG. 5. The CCD constituting each island is provided with a monitor pixel for detecting storage charge in the CCD. An output from each monitor pixel is inputted to each of brightness determining circuits 53. An output signal from each island is inputted to each of switching control circuits 54. The circuit is structured such that the sixth island IS6 and the seventh island IS7 are switched to be used as described previously. An output from each brightness determining circuit 53 is inputted to a control circuit 52. The switching control circuit 54 receives an input of a signal from the control circuit. Each switching control circuit 54 outputs an accumulation result through CCD output processing circuits 55 and 56 via terminals Vout1 and Vout2 to the AF controller 30. A correction signal from a temperature detecting circuit 57 is applied to the output signal from the CCD output processing circuit 55.

A power supply voltage Vcc (13V) for driving a shift register SR of a CCD is applied from the DC/DC converter 51 to the control circuit of the AF sensor 17. The DC/DC converter 51 supplies a $V_{REF}$ (5V) and GND to the control circuit 52 of the AF sensor 17 and the AF controller 30. The control circuit 52 of the AF sensor 17 receives from the AF controller 30, a clock pulse CP, mode switching signals MD1-MD3, an accumulation starting signal IST, a read starting signal RST, an accumulation forcibly completing signal CBG and a timing signal ADT of a pixel data output. The photoelectric converted output signals Vout1 and Vout2 are inputted to an A/D converter 31 of the AF controller 30 in synchronization with the signal ADT. The AF controller performs A/D conversion by switching an input of each pixel alternately.

Figure 17:
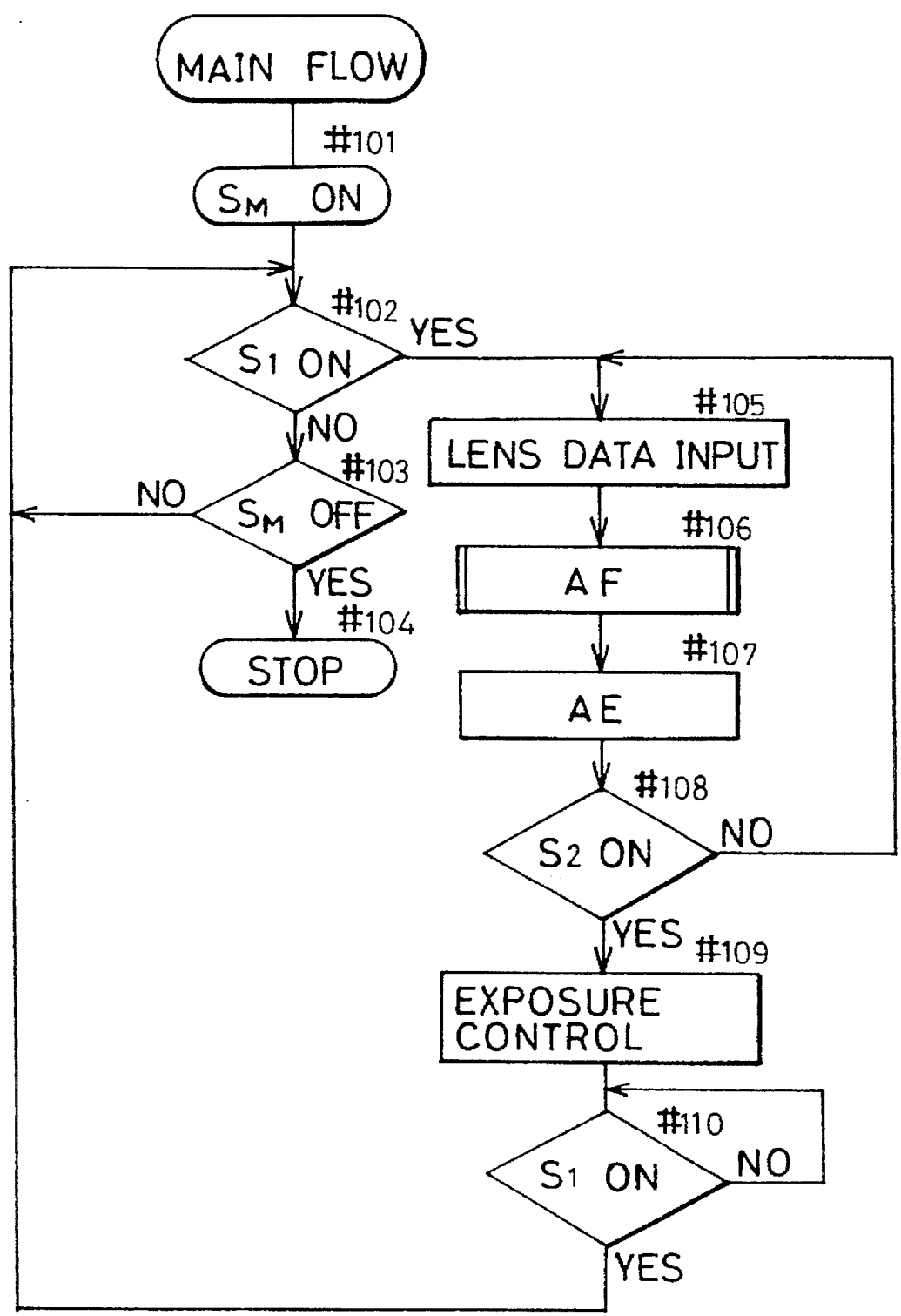
FIGS. 17 to 19 are flow charts showing operations of the main part of the photoelectric converting apparatus according to the first embodiment of the present invention.

An operation of a camera to which the focus detecting photoelectric converting apparatus according to the present invention is applied will be described in the following. FIG. 17 is a flow chart showing a main flow for the camera to which the focus detecting photoelectric converting apparatus according to the present invention is applied. When a main switch $S_M$ (not shown) provided in the camera body is turned on (step #101), the camera system is turned on. Then, the determination is made as to whether a release button (not shown) is pushed to the first stroke (hereinafter referred to as S1 switch) or not (step #102). When the release button is not pushed to the first stroke in step #102, the determination is made as to whether the main switch SM is off or not (step #103, hereinafter # is omitted). If the main switch $S_M$ is off in step 103, the camera stops operating (step 104). If the main switch $S_M$ is not off in step 103, the program returns to step 102.

If S1 is on in step 102, lens data are inputted in the camera body (step 105), so that an AF subroutine which will be described in the following is carried out (step 106) to perform light measuring and exposure calculation (hereinafter referred to as AE) (step 107). Then, the determination is made as to whether the release button (not shown) is pushed to the second stroke (hereinafter referred to as S2 switch) or not (step 108). If the switch S2 is turned on in step 108, exposure is controlled (photographing) (step 109), and the program returns to step 102 after waiting the turning-off of the switch S1. If the switch S2 is not on in step 108, the program returns to step 105.

Figure 18:
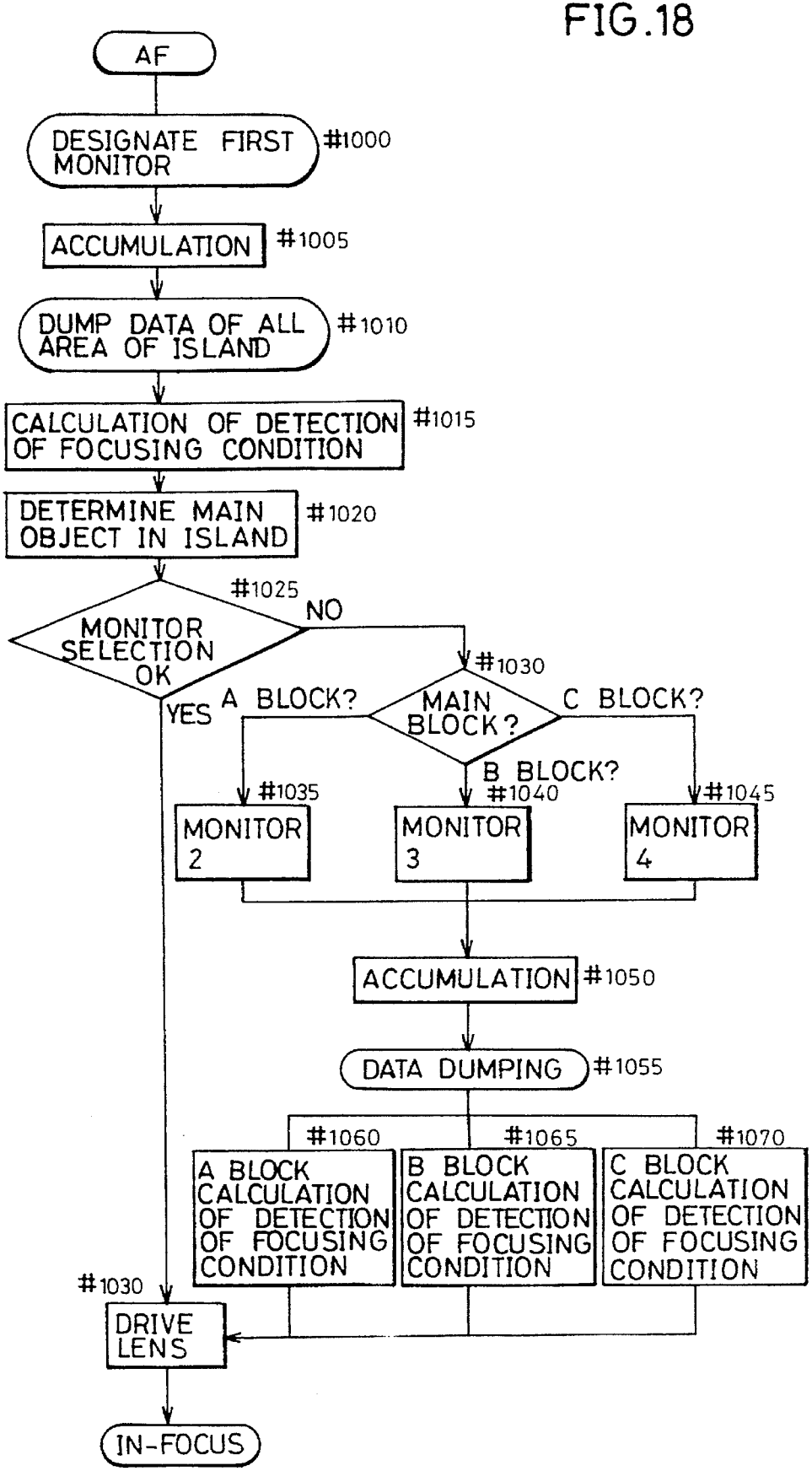

FIG. 18 is a flow chart showing the contents of the AF subroutine shown in step 106 of FIG. 17. First, the first monitor (M1, M1') covering the whole area of the island is selected (step 1000) to carry out accumulation (step 1005). After the completion of accumulation, the data of the entire area of the island is dumped (step 1010) to carry out calculation for the detection of the focusing condition (step 1015). Then, the main object is distinguished between the blocks in the island (step 1020) to select a block for use in focus detection. Meanwhile, it is determined whether the monitor selection is proper or not (step 1025) and if it is proper, the lens is driven (step 1030) based on the signal from the selected block. The determination is made based on the detected data of the brightness distribution as to whether the selection of the monitor is proper or not. If the selection of the monitor is improper, the program proceeds to the step 1030 in order to select a corresponding monitor to the block including the main object. Namely, when the selection of the monitor is improper in step 1025, selection is made again of a monitor corresponding to a block including the main object (steps 1030, 1035, 1040 and 1045). Then, the accumulation is made over again (step 1050). After the completion of accumulation, the data dumping is carried out (step 1055) and calculation of measuring distance is carried out only for the block including the main object (step 1060, 1065 and 1070). Thereafter, the program proceeds to 1080 where the lens is moved to an in-focus position (step 1085).

Namely, according to the present invention, in the CCD comprising one line sensor for measuring the brightness of the object, the CCD is divided into a plurality of blocks as shown in FIG. 10, and a plurality of monitors corresponding to the respective blocks are arranged near the positions corresponding blocks. When the output signal from the CCD is monitored to find that the main object is not clearly determined by the signal from the first monitor covering the whole area of the island, selection is made of a monitor corresponding to the block including the main object. Namely, since the accumulation control is carried out in accordance with the main object, even if the main object has low brightness in a rear light state, the camera can be properly focused on the dark object without being affected by the object having high brightness contrast in the background.

Figure 19:
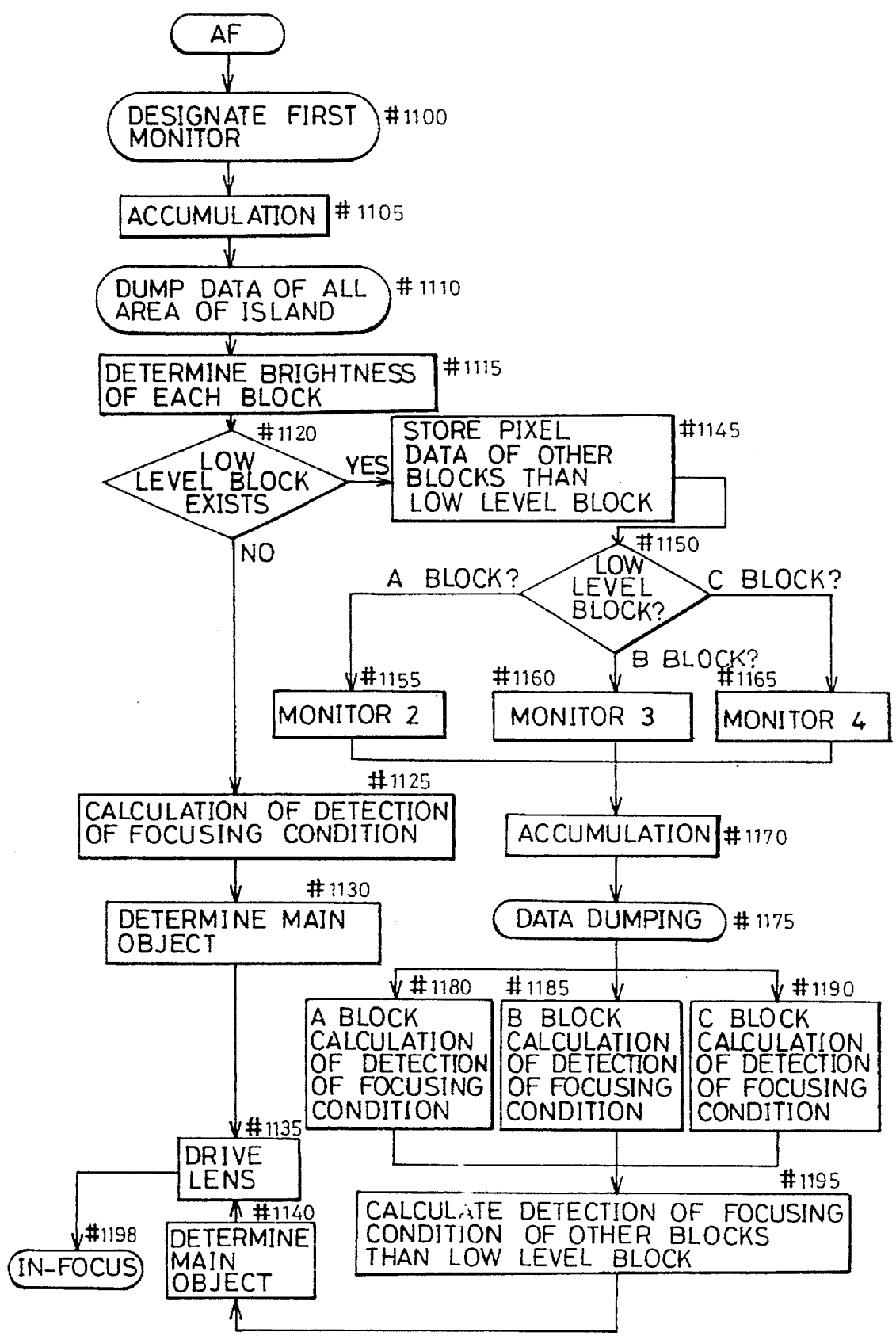

Another embodiment of an AF subroutine will be described. FIG. 19 is a flow chart showing another embodiment of an AF subroutine. First, the first monitor (M1 and MI') covering the whole area of the island is selected (step 1100) to perform accumulation (step 1105). After the completion of accumulation, the data of the whole area of the island is dumped (step 1110), brightness of each block is checked (step 1115) to find whether any block has extremely low level compared with other blocks or not (step 1120). If no block is found to be of a low level (NO in step 1120), calculation of the measuring distance is carried out for each block (step 1125) and the main object is determined (step 1130), thereby driving the lens (step 1135). As a result, the range is moved to an in-focus position (step 1198). If some block is of a level extremely lower than those of the other blocks in step 1120, the pixel data of the other blocks than the block of the low level is stored in the memory (step 1145) to again select a monitor corresponding to the block of the low level (steps 1150, 1155, 1160 and 1165). Thereafter, the accumulation is again carried out (step 1170) and the data dumping is carried out (step 1175). Then, calculation of the measuring distance is carried out only for the low level block (steps 1180, 1185 and 1190) to calculate the amount of defocus (step 1195). In addition, calculation of the measuring distance is carried out by the pixel data of the other blocks stored in the memory than the low level block (step 1195) to calculate the amount of defocus. The main object is distinguished by thus obtained each amount of defocus (step 1140), thereby driving the lens (step 1135) to move an in-focus position (step 1198).

In another embodiment of the AF subroutine shown in FIG. 19, brightness is determined of the three blocks, whereby when some block is of a low level because the main object becomes black due to for example, rear light or the like, the main object is distinguished based on the result of the calculation of the measuring distance of other blocks than the low level block, so that the lens is driven to an in-focus position based thereon.

Figure 20:
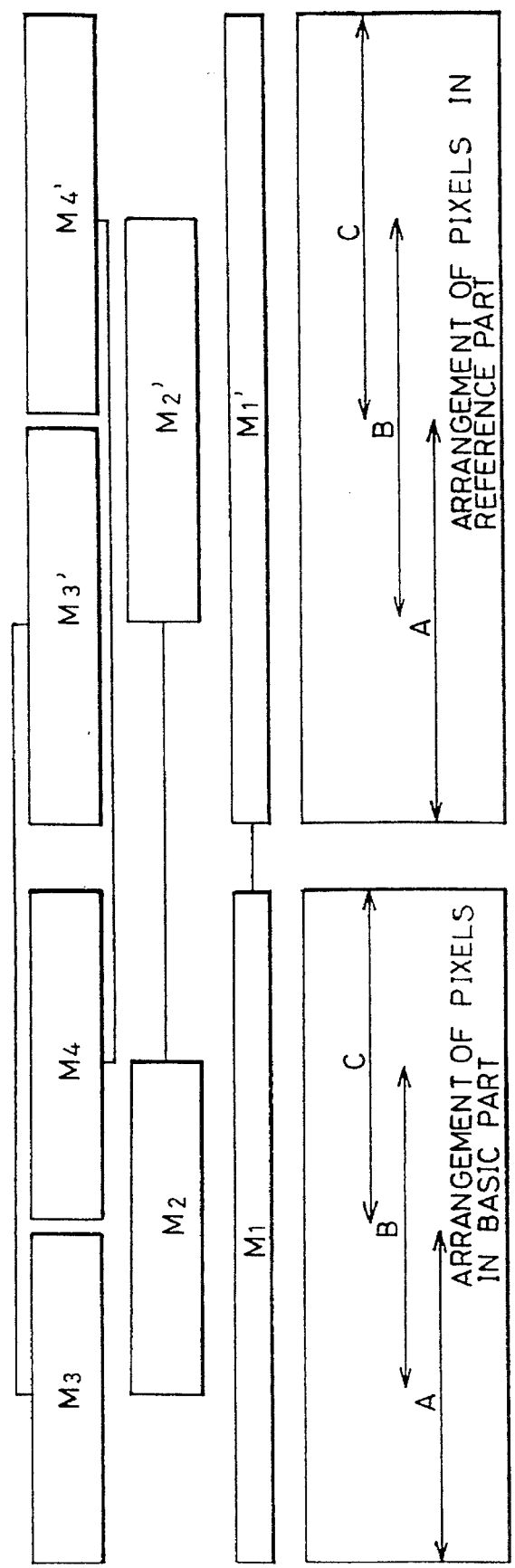
FIG. 20 is a diagram showing a modified example of an arrangement of monitor sensors of the photoelectric converting apparatus according to the present invention.

A modified example of an arrangement of monitors will be described with reference to FIG. 20. FIG. 20 is the diagram corresponding to FIG. 10. FIG. 20 differs from FIG. 10 in that the first monitors M1 and M1' covering the whole area of the island are arranged at the side nearer to the pixels of the CCD. FIG. 20 also shows one example of block division of the arrangement of pixels. Referring to FIG. 20, each of the basic part and the reference part is divided into three blocks A, B and C, a monitor being arranged corresponding to the position of each block. Namely, the monitors M3 and M3', the monitors M2 and M2', and the monitors M4 and M4' are provided for the block A, the block B and block C, respectively. The same monitors are arranged symmetrically in the basic part and the reference part at the corresponding positions, the same monitors being connected with each other by an interconnection in order to obtain an optimum gain at least in an in-focus state.

(2) The Second Embodiment (one-terminal output type)

An one-terminal output type focus detecting photoelectric converting apparatus will be described. The photoelectric converting apparatus of one-terminal output type has only one output terminal from the AF sensor 17. Accordingly, this apparatus corresponds to the terminal output type photoelectric converting apparatus described in the first embodiment without the output signal Vout2 from the AF sensor 17 (see FIG. 16).

Figure 28B:
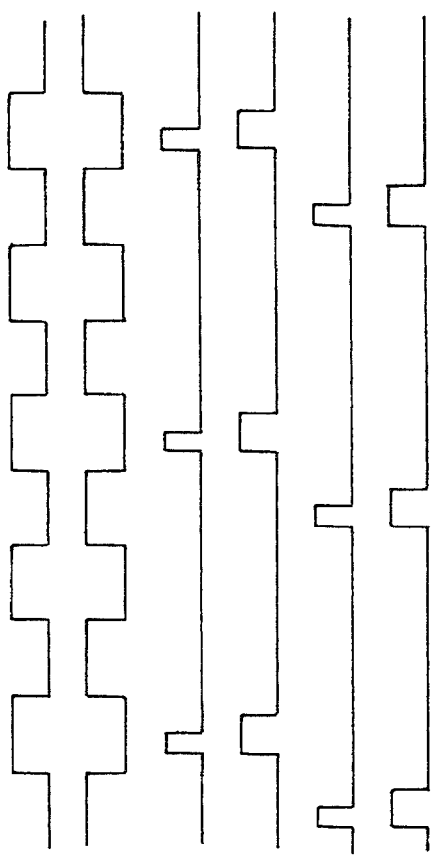
Figure 28A:
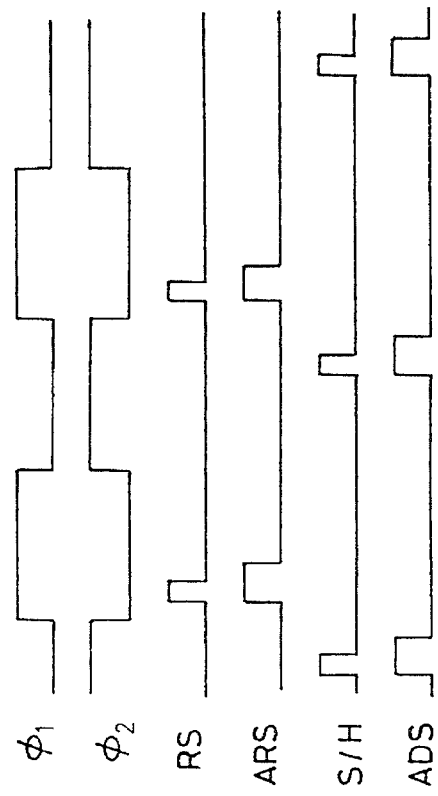

Referring to FIGS. 22–25, a time chart of one-terminal output type apparats will be described. While the method of driving a CCD is basically the same as that of the two-terminal output type apparatus, if all the outputs of the pixels of the six islands are outputted from one terminal, the data dumping time becomes very long, which is not appropriate for an FA system. Therefore, the speed of the transfer clocks φ1 and φ2 is doubled the normal speed (FIG. 28A) as shown in FIG. 28B to output the shift gate signal SH once for the output of two pixels. Accordingly, the data of the two pixels is added and outputted as the data of one pixel, and therefore apparently it becomes equivalent to the half of the number of pixels, resulting in a data dumping time half the normal one.

Figure 21:
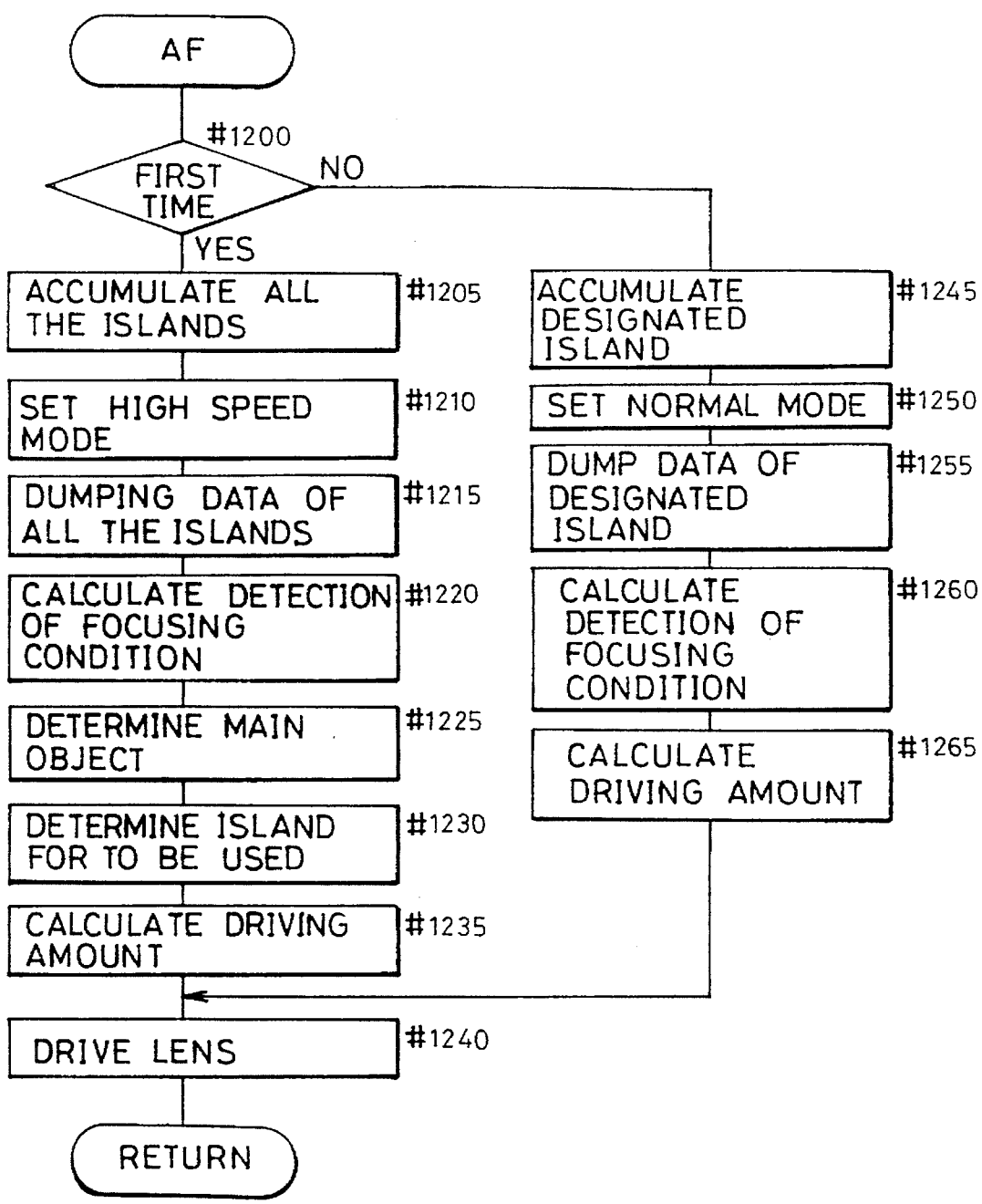
FIG. 21 is a flow chart of an AF subroutine in a double speed mode.

As described with reference to FIG. 21, in this mode, after the island including the main object is found in the first measurement of distance, the data is read at a normal speed by designating only the island including the main object or only a plurality of islands including that island in the second and the subsequent measurements of distance. As a result, it becomes possible to reduce the data dumping time and detect focusing condition with high precision.

The mode at the start of the accumulation is set at the fall of the accumulation starting signal IST by using the mode signals MD2, MD3, and MD4 as shown in FIG. 22. This mode setting may be carried out in such manner as described in the first embodiment. In addition, selection of islands to be read is also made by using the mode signals MD2, MD3 and MD4 (see FIG. 26).

Referring to FIG. 23, the time chart of the ST accumulation of one-terminal output type apparatus will be described. As described previously, selections of monitors, accumulation modes, the sixth and the seventh islands or the like are made by using the mode signals MD2, MD3 and MD4 by the fall of the accumulation starting signal IST. A reading speed is set by the mode signal MD2 and the fall of the accumulation completing signal CBG. Selection of islands to be read is made by the read starting signal RST and the mode signals MD2, MD3 and MD4.

Setting of the barrier gate signal $\overline{Bgi}$ and the shift gate signal Sh1 and the operation following the same are the same as those of the first embodiment. A manner of spontaneous completion is also the same. The forceful completing operation is carried out by setting the accumulation forceful completing signal CBG to a high level as in the first embodiment, wherein witching of a reading speed (reading at a normal speed or at a double speed) is set by the mode signal MD2. Subsequently, the read starting signal RST pulse is inputted, so that an island to be read is selected as described above, whereby the microcomputer designates an island to be read. The operation in the PD accumulation (see FIG. 23) is also the same as that in the ST accumulation.

The operation of the data dumping (see FIG. 24) is also basically the same as that of the two-terminal output type apparatus. The increase of the data dumping time is prevented by setting an island to be read when the read starting signal RST pulse is inputted.

Figure 27:
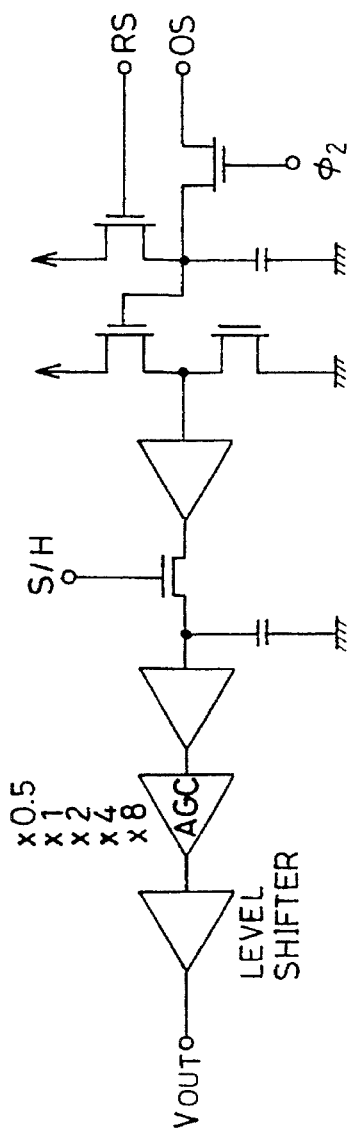
FIGS. 27, 28A and 28B are diagrams explaining a high speed reading mode.

FIG. 27 is a diagram showing a high speed reading circuit in the case of reading at a high speed of a double pitch. In this high speed reading circuit, if the reading mode is normal, the amplification factors of auto gain signal AGC are changed from X1, X2, X4 and X8 to X0.5, X1, X2 and X4.

Figure 29:
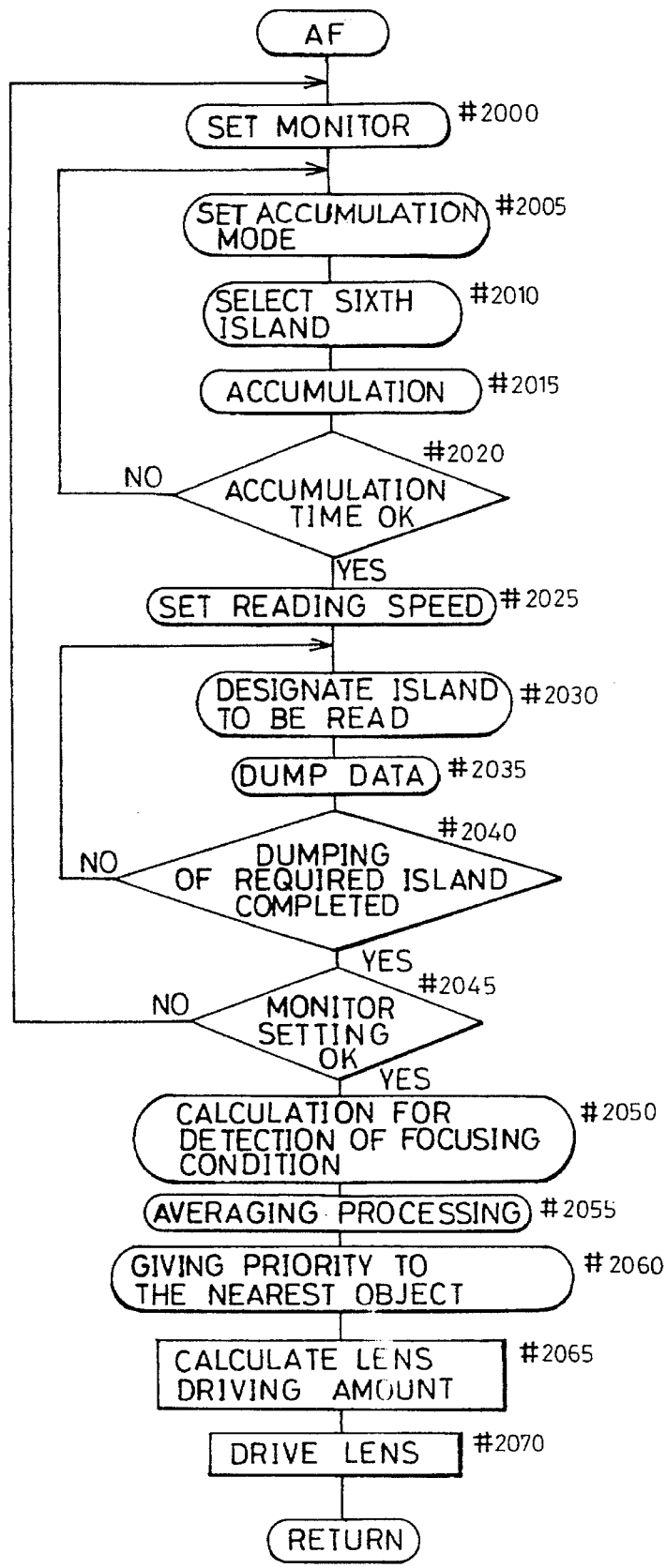
FIG. 29 is a flow chart showing an AF subroutine according to the second embodiment of the present invention.

A flow chart of an AF subroutine of one-terminal output type apparatus will be described. FIG. 29 shows the flow chart of the AF subroutine of one-terminal output type apparatus, which corresponds to the first embodiment shown in FIG. 18. At first, the monitor pixels M1 and M1' covering the entire arrangement of pixels are designated (step 2000) and a PD accumulation is set as an accumulation mode (step 2005). The sixth island is designated among the sixth and the seventh islands (step 2010) to start storing charge (accumulation) (step 2015). After the completion of accumulation, the accumulation time is checked (step 2020) and when the accumulation mode is inappropriate (NO in step 2020) the accumulation is done over again and if appropriate, a reading speed is doubled (step 2025) and all the islands are sequentially designated to carry out data dumping (steps 2030 and 2035). The brightness distribution is verified to find the monitor setting is appropriate (step 2045), the program proceeds to calculation of the measuring distance (step 2050). If the monitor setting is inappropriate (NO in step 2020), monitor pixels are reset corresponding to the pixel blocks which are supposed to include the main object to carry out the accumulation over again. The amount of defocus is obtained (step 2065) by such algorithm as calculation of the distance measuring (step 2050), averaging processing (step 2055) and the priority of the nearest object (step 2060) to drive the lens to an in-focus position (step 2070). When the measuring distance is successively carried out with respect to the main object, only the arrangement of pixels including the main object is read, and islands thereof are designated to carry out measurement of distance.

The device arrangement according to the second embodiment is the same as that according to the first embodiment shown in FIG. 16 except that the output terminal Vout2 is not provided and therefore, illustration thereof is omitted.

Description will be made of the embodiment in a double speed mode. Herein, the double speed mode is referred to as data reading at a faster speed than that of a normal reading. FIG. 21 is a flow chart showing an AF subroutine in a double speed mode. In step 1200, the determination is made as to whether it is the first measurement of distance or not and if it is the first measurement, multi-measuring is carried out by using all the islands (step 1205). Accumulations of all the islands of the CCD are carried out in step 1205, the high speed mode is set for data output (double speed mode) (step 1210), to carry out data dumping of all the islands (step 1215). Then, calculation of the measurement of distance is carried out for each island (step 1220), and the determination is made as to which island includes the main object based on the result of the measurement of distance of each island (step 1225) to determine which island is to be used (step 1230). Then, the lens driving amount is calculated from the amount of defocus of the island to be used (step 1235), whereby the lens is driven by that amount (step 1240).

When the determination is made that it is the second or the later measurement of distance, the measuring distance of the previously designated island is carried out. Namely, accumulation of the designated island is carried out (step 1245), the high speed mode is switched to the normal speed mode for data output (step 1250) to dump the data of the designated island (step 1255). Then, calculation of the measurement of distance is carried out (step 1260), the lens driving amount is obtained from the amount of defocus (step 1265), so that the program precedes to the step 1240.

While accumulation is carried out only for the designated island in the second or later measurement of distance, accumulation may be carried out for all the islands as shown in FIGS. 19 and 20.

(3) The Third Embodiment (of one-terminal output type and having four islands)

The third embodiment of the present invention will be described. While the output terminal of the third embodiment is the same as that of the second embodiment, the number of islands for focus detection is reduced from seven to four.

The four islands in this embodiment are referred to as the eleventh to fourteenth islands IS11–IS14, respectively.

Figure 30:
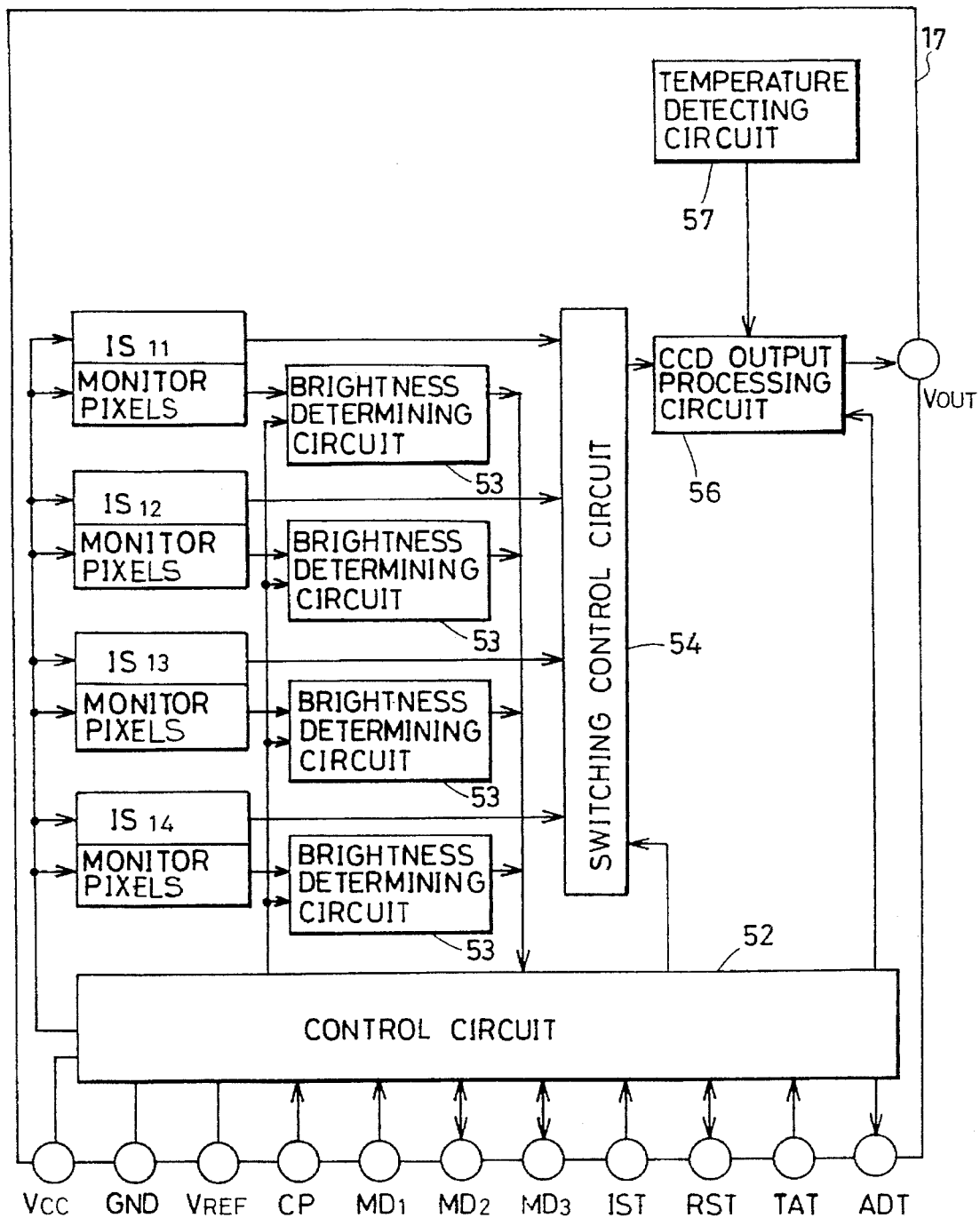
FIGS. 30–32 are diagrams explaining a third embodiment of the present invention.
Figure 31:
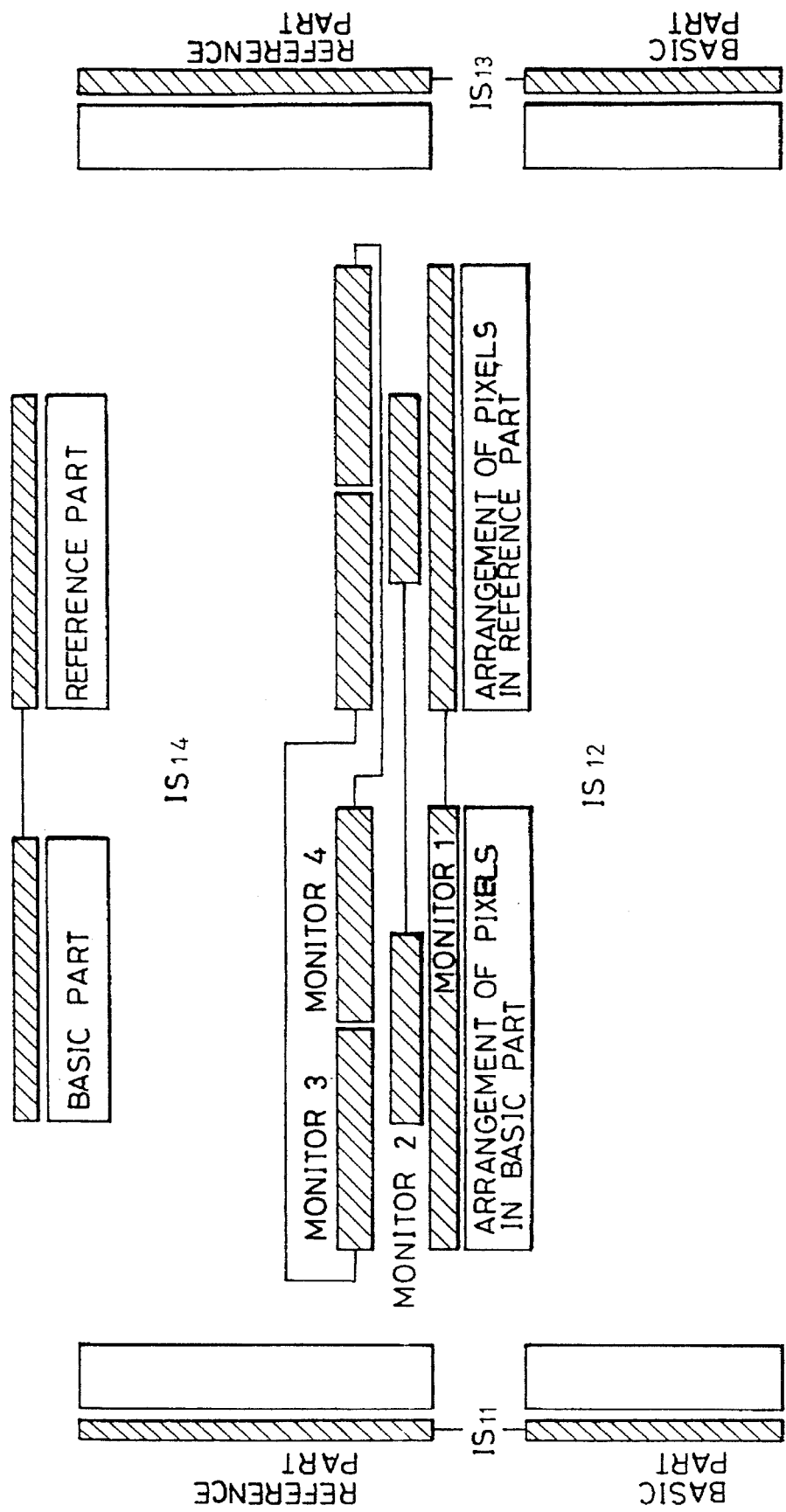
Figure 32:
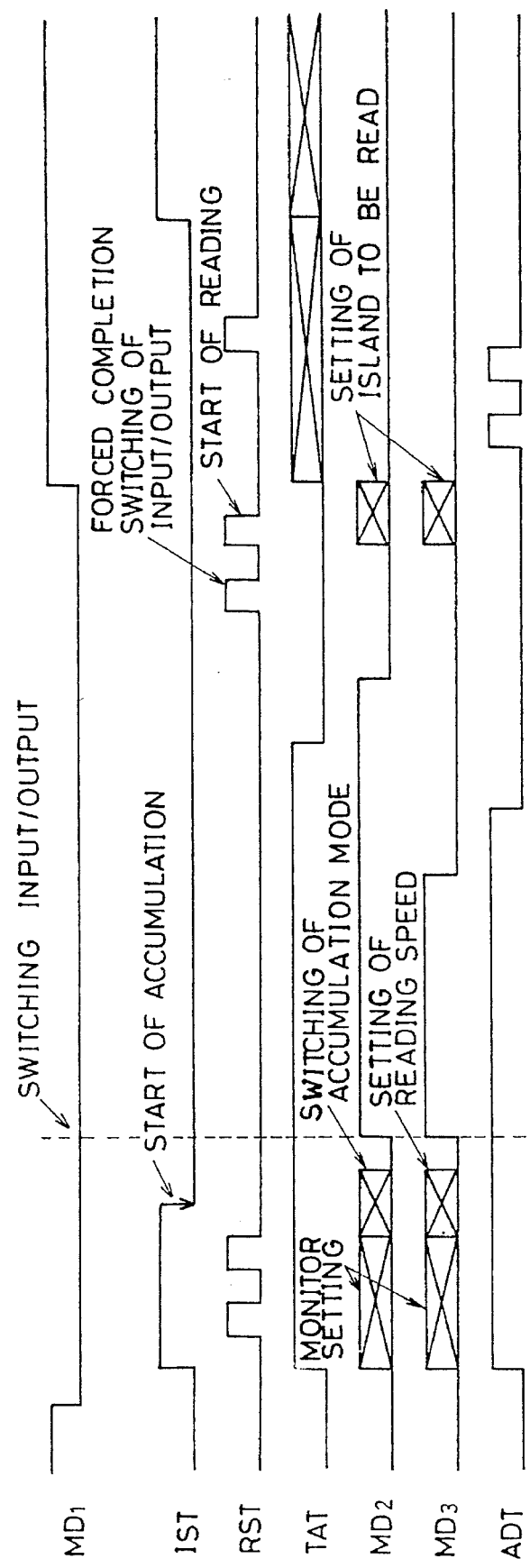

FIG. 30 is a diagram of a device arrangement according to the third embodiment of the present invention, FIG. 31 is a diagram showing a layout of monitor pixels according to the third embodiment of the present invention, and FIG. 32 is a timing chart of each terminal of the device according to the third embodiment.

Figure 12:
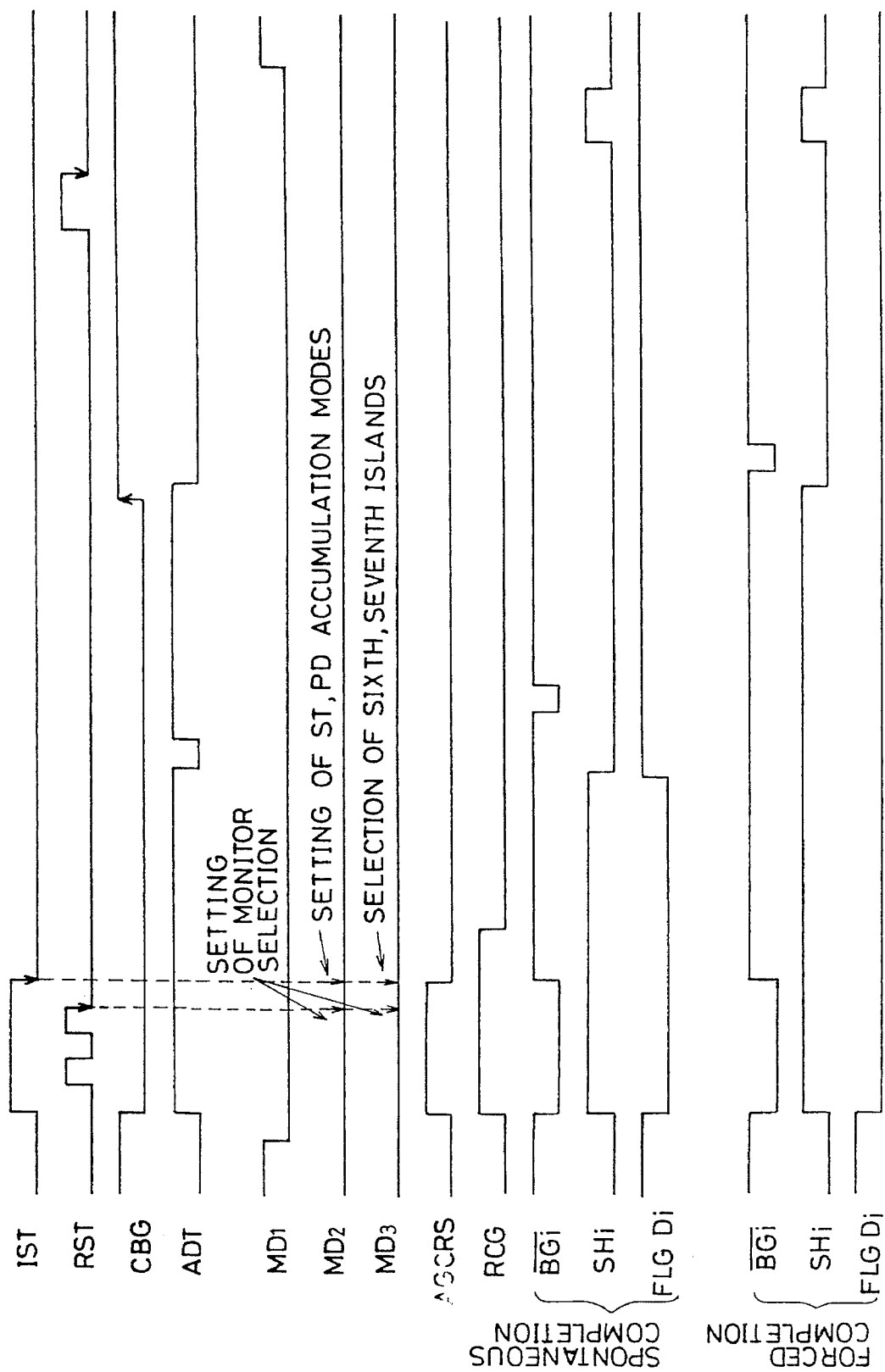

FIG. 30 corresponds to the first embodiment of FIG. 16, FIG. 31 corresponds to FIG. 4A and FIG. 32 corresponds to FIGS. 11 and 12.

Referring to FIG. 32, the mode signal MD1 is set to a "L", the accumulation mode is set, and the read starting signal RST pulse is inputted twice while the accumulation starting signal IST is high, to reset the AGC circuit. At this time, the monitor setting is carried out by using the mode signals MD2 and MD3 at the fall of the read starting signal RST pulse. The accumulation mode is set by the mode signal MD2 at the fall of the accumulation starting signal IST pulse and the reading speed is set by the mode signal MD3 to start accumulation. After a lapse of a predetermined time from the fall of the accumulation starting signal IST pulse, the inputs/outputs of the mode signals MD2 and MD3 are switched, so that the output terminals thereof become output terminal. The accumulation information of each island is outputted in parallel by using these output terminals TAT, MD2, MD3 and ADT. The AF controller (not shown) waits for the four parallel outputs of TINT attaining the low level by permitting interruption. Accordingly, the AF controller is enabled to check the order that the accumulation completing signal TINT of each island attains the low level and the accumulation time. The first read starting signal RST is inputted when all the TINT signals are inputted or the accumulation is forcibly completed after a lapse of a predetermined time. The input of this signal allows the mode terminals MD2 and MD3 to be designated as input pins and a subsequent input of the second read starting signal RST pulse allows these pins to set an island to be read to start data reading. Then, the mode signal MD1 is set to a "H" to set the data dumping mode. The pixel data is outputted from the signal output terminal vout in synchronization with the ADT output signal ADT pulse. When the data indicates unnecessary image data, the accumulation starting signal IST is set to a "L", so that temperature data is outputted from the signal output terminal Vout. When the output of the pixels in the black basic part is outputted, the read starting signal RST is set to a "H" and the black basic output data is sampled and held. Then, when the pixel of the basic part is outputted, the accumulation starting signal IST is set to a "H", so that the pixel data is outputted from the signal output terminal Vout. In addition, during the data dumping, there is a case where data can not be accepted because the AF controller carries out other functions. In such a case, the signal TAT is set to a "H" to interrupt data dumping.

(4) The Fourth Embodiment

The fourth embodiment will be described.

The basic structure of the fourth embodiment is approximately the same as that of the third embodiment. Namely, the fourth embodiment is structured as shown in FIG. 30 and the monitor has the layout as shown in FIG. 31. FIG. 38 shows the timing chart corresponding to that of FIG. 32.

FIGS. 39 and 40 are diagrams showing the structure of a double speed reading circuit according to the present embodiment.

The difference between the timing charts in FIGS. 32 and 38 is that a gain of the double speed amplifier is determined by the MD2 during a period from a fall of the first RST pulse to a rise of the second RST pulse, both pulses being inputted during a period when the accumulation starting signal IST is at high.

According to the method of determining a gain of the double speed amplifier, in a first focus detection, when amplification factor of a double speed amplifier is set to ½ in a double speed reading and consequently, if a maximum output level after A/D conversion is below a predetermined level with the maximum accumulation time and gain of the AGC amplifier being 8 times, namely it is so dark that no overflow occurs even with the amplification factor of the double speed amplifier set to 1, the system controller sets the amplification factor of the double speed amplifier to 1 in the subsequent measurements. As a result, it is possible to double the sensor output and to increase the limit of the low brightness by 1 EV. Namely, this enables increase of the limit of low brightness by 1 EV by the increase of sensitivity caused by the effect of the double speed reading without complicated controlling of switching of a monitor control level. When extreme overflow occurs, amplification factor of the double speed amplifier is returned to ½.

In addition, since the number of pixels of the longitudinal islands (the first and the third islands) is small compared with the lateral islands (the second and the fourth islands) in the device according to the present embodiment, a sufficient area of focus detection cannot be obtained in a double speed reading. Namely, when the lens is located at an infinite position, it cannot focus on the object around the nearest position. Conversely, when the lens is located at the nearest position, it cannot focus on the object near the infinite position.

Therefore, in the present embodiment, the device is structured such that in the double speed reading, the longitudinal islands do not carry out the double speed reading to obtain a sufficient area of focus detection.

The other functions and timings are the same as those of the third embodiment.

(5) The Fifth Embodiment

Figure 41:
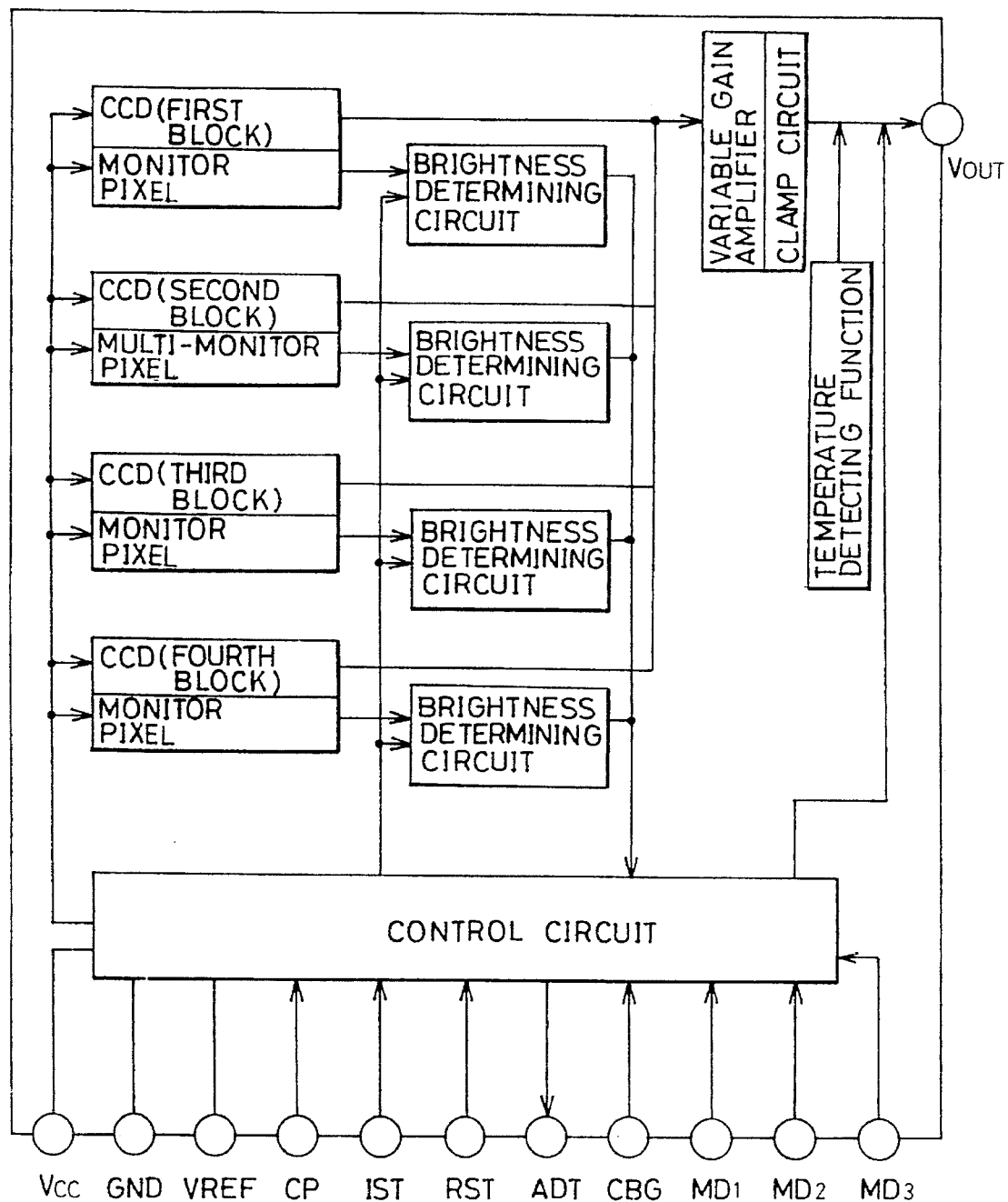
Figure 42:
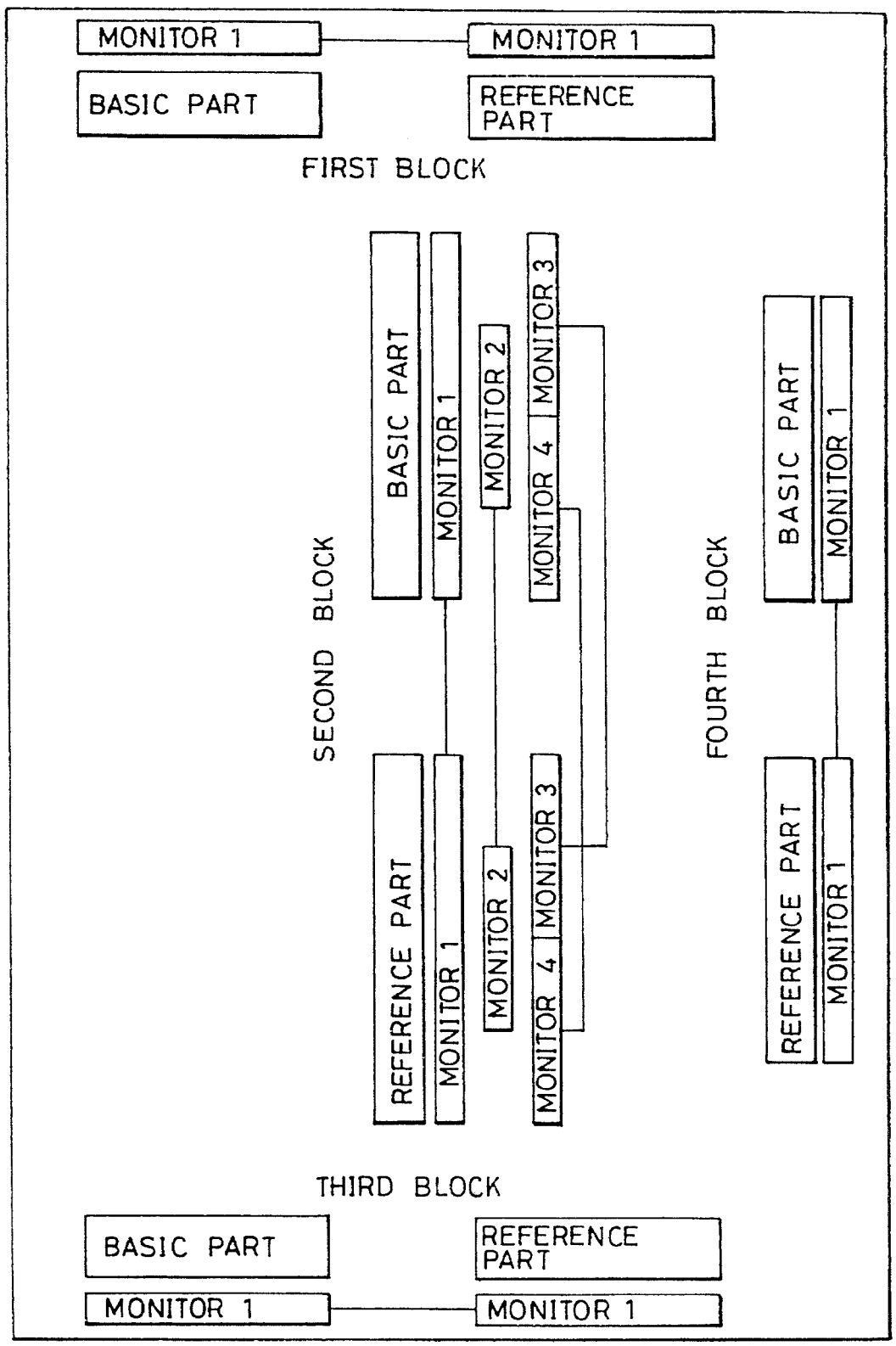

FIGS. 41 to 48 are timing charts and diagrams of mode setting of the fifth embodiment. As shown in FIG. 41, the basic structure of the fifth embodiment is approximately the same as those of the third and the fourth embodiments. The differences are that a TAT terminal is replaced by a CBG terminal to directly control a barrier gate in an accumulation completing operation during the PD accumulation and that no input/output pin is provided because the accumulation completion information is serially outputted from the ADT terminal and a signal of the order of completion of accumulation and the gain information are outputted from the Vout terminal.

Figure 43:
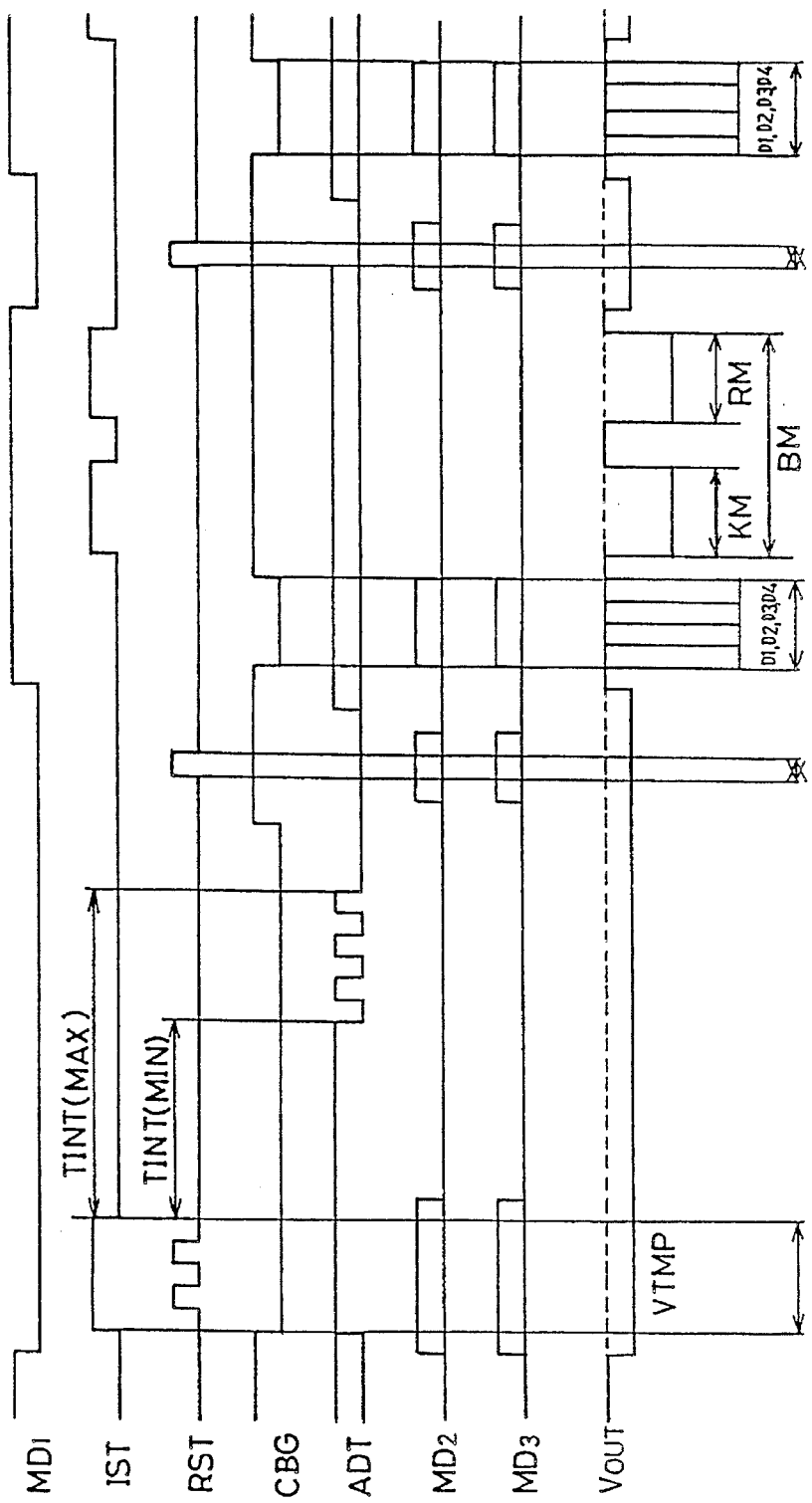
Figure 44:
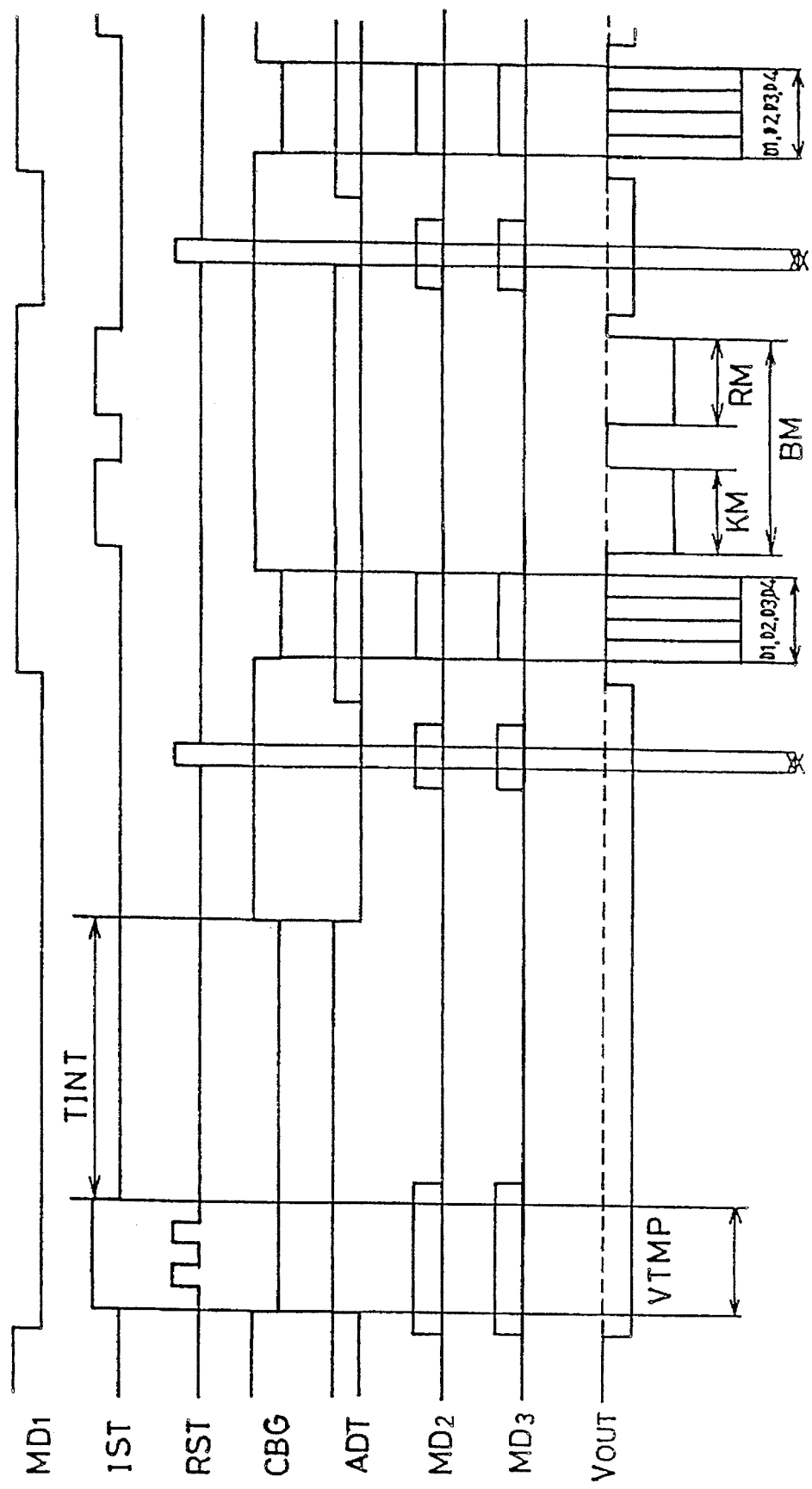

First, FIG. 43 shows a case wherein time of completion of accumulation varies in each of all the islands in the ST accumulation and accumulation of each of all the islands completes spontaneously.

After setting MD1 to low to set the accumulation mode, IST is set to high, CBG is set to low and the RST pulse is inputted twice to set the IST to low, thereby clearing the initialization of the sensor and the unnecessary charge to start accumulation. At this time, by latching the state of the MD2 and MD3 terminals at the fall of the first RST pulse (the fall of the LPA signal in FIG. 35), the divided monitors of the second island are designated. Then, by latching the state of the MD2 terminal at the rise of the second RST pulse the (fall of the LPA 1 signal in FIG. 35), an external control amplifier is set. The amplification factor of the external control is set to ½ of the normal amplification during the double speed reading and makes the voltage which corresponds to the detected charge doubled during the double speed reading into half so as to have approximately the same output voltage level as that of the normal reading. When the amount of detected charge is small so that no overflow occurs even with the doubled output voltage as a case where the brightness of the object is at the limit of the low brightness, the performance at the limit of the low brightness is improved by externally setting the amplification factor to 1 to double the output voltage. As a result, the normal accumulation control can be performed both in the normal reading and the double speed reading and the sensitivity can be doubled in a very low brightness near the limit of the low brightness to improve the performance at the limit of the low brightness.

By latching the state of the MD2 terminal at the fall of the second RST pulse (the fall of the LPB signal in FIG. 35), switching between the ST and PD accumulation modes is set and by latching the state of the MD3 terminal, setting of the normal reading and the double speed reading is carried out.

When the accumulation is started by the fall of the IST, the microcomputer waits for interruption, ordinarily four interruptions, by the fall of the ADT signal while performing other processings. While in this timing chart, accumulation completing timing of each island is different, resulting in four interruptions, there is a case where the accumulations complete simultaneously dependent on distribution of brightness of the object. At this time, while it is possible to construct logic such that a fall of the ADT signal is outputted by shifting the timing, in the present invention it is structured such that a fall of one of ADT signal is checked when the accumulations of all the islands complete simultaneously in order to reduce the scale of a logic circuit. Therefore, the microcomputer of the present system checks whether or not the ADT signal attains high after a lapse of a predetermined time after the fall of the ADT signal. Namely, if the ADT signal does not attain high after a lapse of a predetermined time, it is considered that the accumulation of all the islands is completed to proceed to the subsequent step and if the signal attains high, the microcomputer waits for interruption of the subsequent ADT signal.

Figure 35:
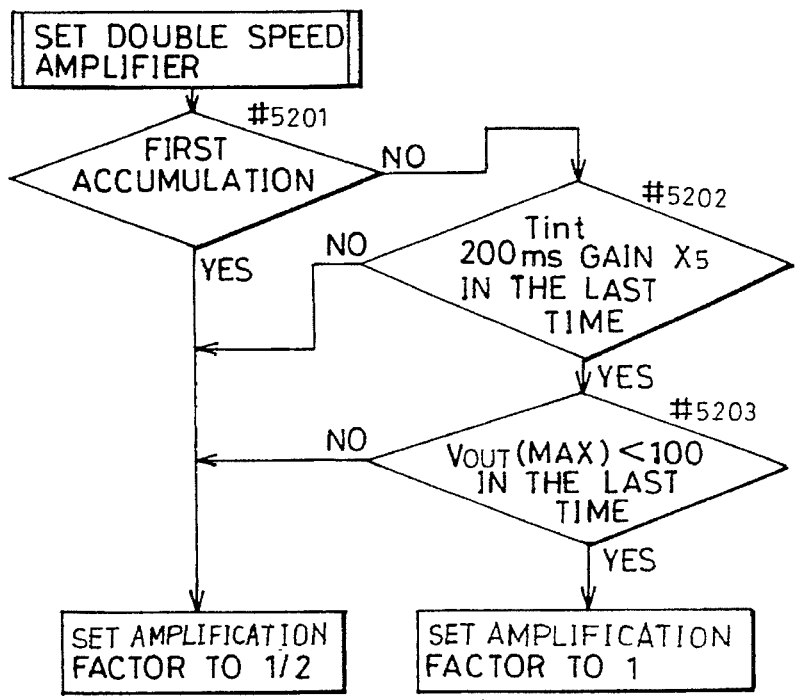

When the accumulation of all the islands is completed, the microcomputer sets the CBG to high to input the RST pulse to the sensor. At this time, an island to be read is selected by latching the state of the MD2 and MD3 terminals. Thereafter, the MD1 is set to high after a lapse of a predetermined time to set the data dump mode. As a result, the Vref voltage is outputted from the Vout terminal from which temperature data ($V_{TMP}$) is outputted when the MD1 is low and a pixel output is internally read in synchronization with the ADT signal. At this time, the pixel output is not externally outputted. Thereafter, when the turn comes that an output of a shaded pixel in the black basic part is read, CBG is set to low to clamp the output of the black basic part to Vref. At this time, such digital data as in FIG. 35 is outputted from the Vout terminal by the combination of the MD2 and MD3. Thereafter, when the turn comes that the arrangements of pixels in the basic part are outputted, IST is set to high to output the arrangements of pixels in the basic part from the Vout terminal, after the output of the arrangements of pixels of the basic part, IST is set to low to mask the output and when the turn comes that arrangements of pixel of the reference part are outputted, IST is set to high to output the arrangements of pixels of the reference part from the Vout terminal. After the completion of output of the arrangements of pixels of the reference part, IST is set to low to mask the output.

Thereafter, MD1 is set to low to complete reading of one island. When another island is subsequently read, the RST pulse is inputted as previously, whereby the MD2 and MD3 select an island to be read.

FIG. 47 is a timing chart at the forced completion of the ST accumulation. The basic timing is the same as that of FIG. 46, only differing in that no interruption of the completion of accumulation is made after a lapse of a predetermined time (after 20 ms in the present embodiment). In this timing chart, no interruption of completion of accumulation is made. The same occurs in the case where accumulation of some islands is completed and that of others is not completed after a lapse of predetermined time.

The reason for the forced completion is to stop accumulation in such a time period as not making a user uncomfortable due to the delay in autofocusing operation resulted from too long time period of accumulation. Insufficient amount of storage charge caused by the above is compensated for by amplification by the AGC amplifier.

The method of the forced completion is as follows. When the accumulation of all the islands is not completed after a lapse of a predetermined time, the microcomputer sets the CBG to high to instructs the sensor on the forced completion and in response thereto, the sensor sets the ADT to low to complete the accumulation of all the islands. The subsequent timings are the same as those of the spontaneous completion.

Figure 45:
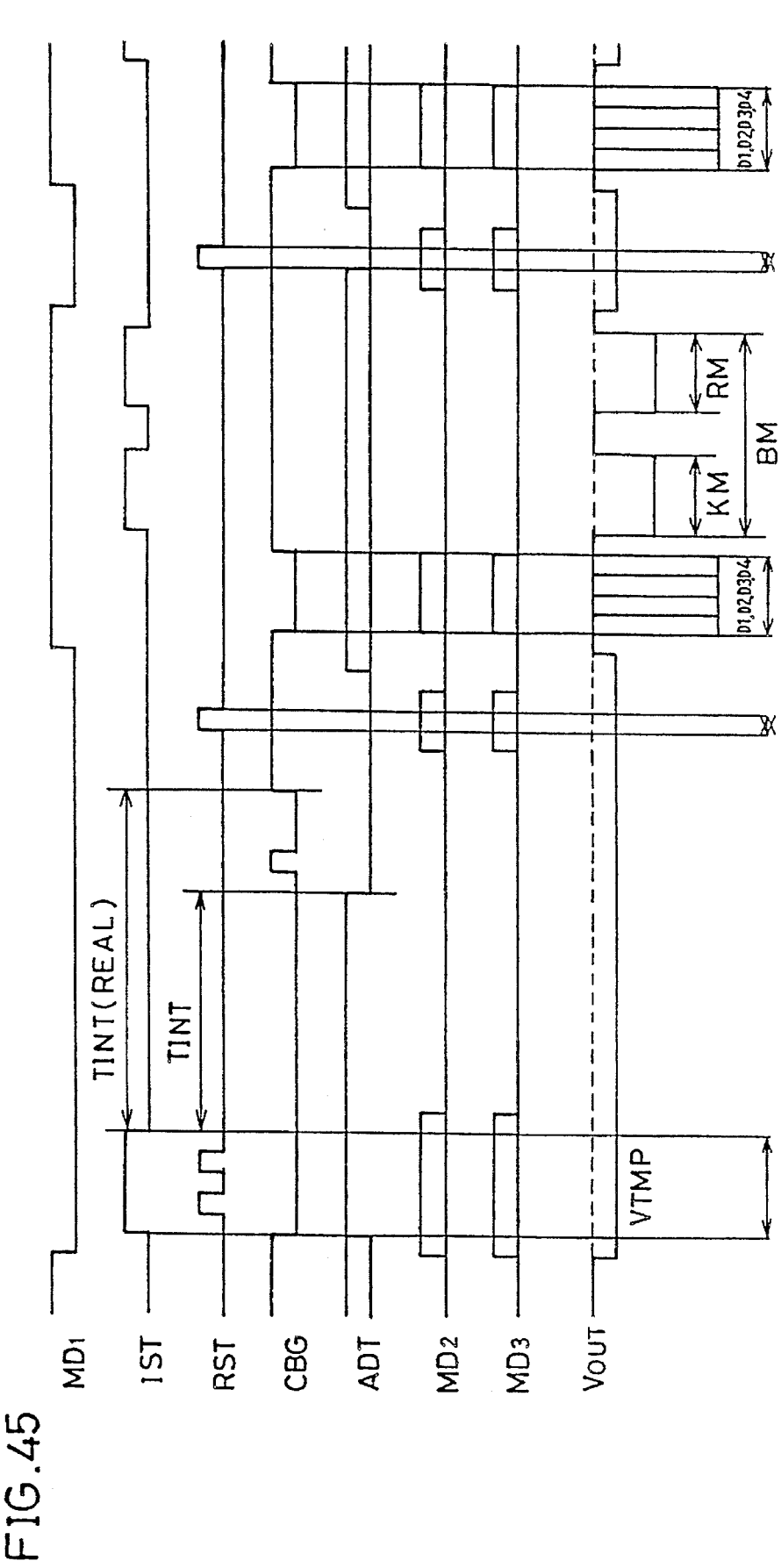
Figure 46:
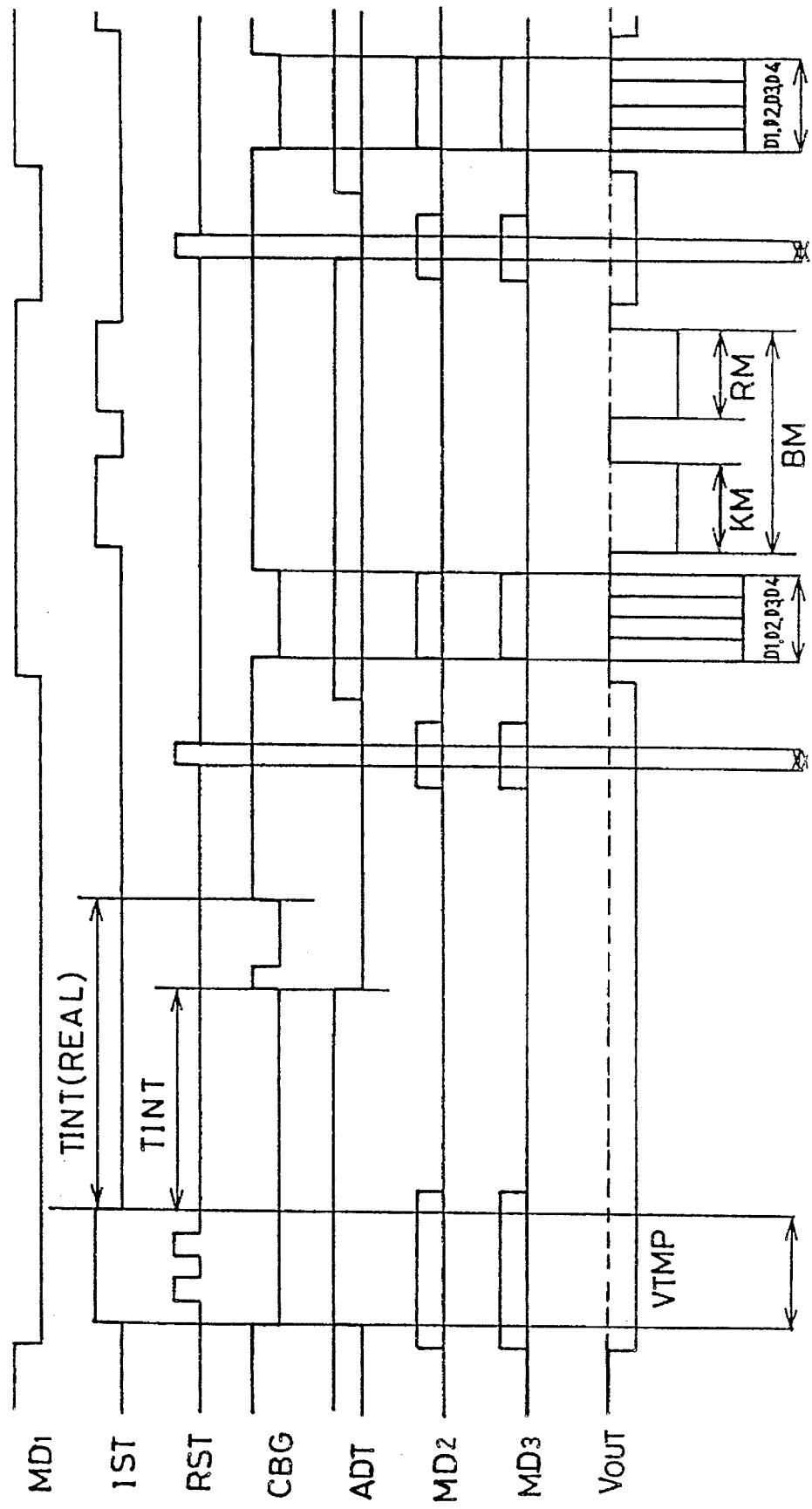

FIG. 45 is the timing chart in the spontaneous completion of the PD accumulation. The basic timing is the same as that of FIG. 43, only differing in a signal waveform of the CBG during the completing operation of accumulation. The present embodiment is structured such that in the PD accumulation, completion of accumulation of one island is considered as the completion of accumulation of all the islands. Therefore, CBG is set to high in response to the ADT at low, set to low after a lapse of a predetermined time and set to high after about 100 µs to complete accumulating operation. The subsequent operation timings are the same as those of FIG. 46.

it goes without saying that each island can be separately controlled in the logic circuit if possible.

Figure 33:
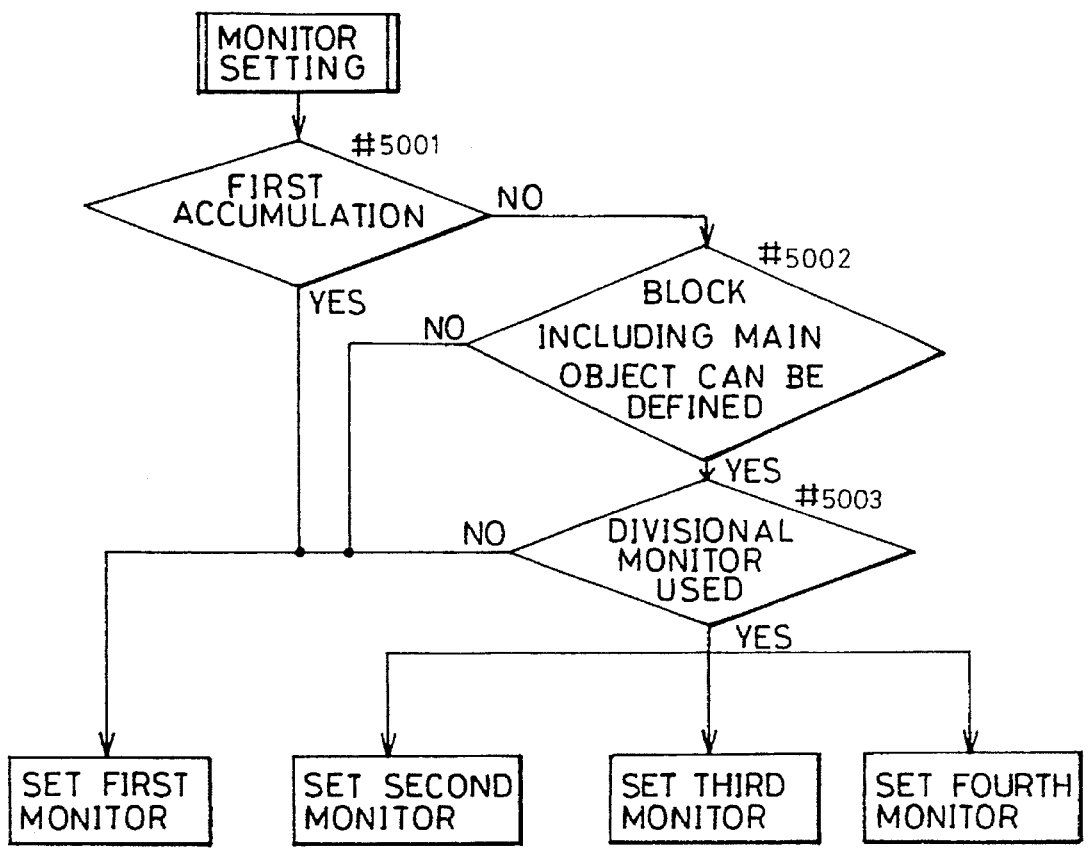

FIG. 33 is a timing chart of the forced completion of the PD accumulation and differs from that of FIG. 48 in that the accumulating operation is completed by setting CBG to high to transmit the forced completion to the sensor if after a lapse of a predetermined time (200 ms in the present embodiment) after the start of the accumulation, the ADT does not attain low and then setting CBG to low and to high after a predetermined time (about 100 µs). The subsequent operation timings are the same as those of FIG. 46. The shortage of the storage charge caused by the forced completion is compensated for by the amplification by the AGC amplifier similarity in the forced completion of the ST accumulation.

Figure 34:
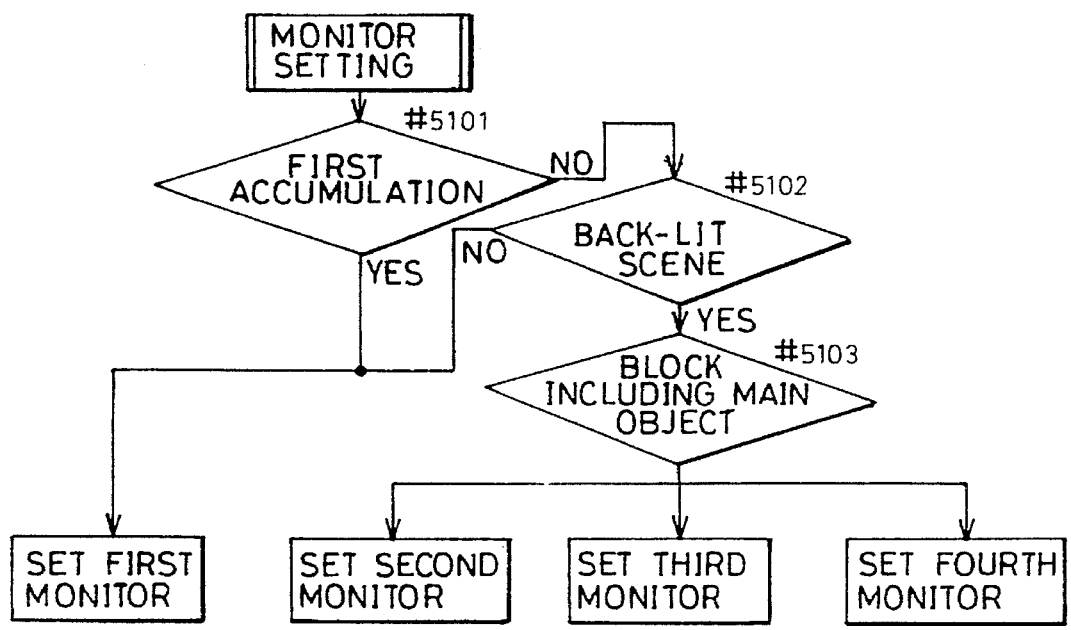

FIG. 34 is a diagram showing setting of each mode by the MD2 and MD3 terminals and a combination of digital data.

FIG. 39 is a diagram showing a circuit for double speed reading according to the present embodiment. This diagram is approximately the same as that of FIG. 13, except that in FIG. 13, the amplification factor of the AGC amplifier is set to ½ in the double speed reading, in FIG. 39, a double speed amplifier is provided in front of the AGC amplifier and the amplification factor thereof is set to ½ or 1.

A setting method of each mode will be described with reference to the flow charts shown in FIGS. 33–37. FIG. 33 shows a method of selecting a divisional monitor.

Since distribution of the entire brightness is not known, the first monitor is used to broadly monitor the entire island in the first accumulation (#5001). In the second and the subsequent measurements of distance, if a main object is defined in the first measurement of distance and the microcomputer determines that it is better to use a divisional monitor, a divisional monitor corresponding to a distance measuring block including the main object. If a main object cannot be defined, that is, when image magnification is large so that any block can be supposed to includes the main object, and when distance cannot be measured because of low contrast or the like, or when the microcomputer determines that it is better not to use a divisional monitor even if the main object can be defined, the first monitor is used. (#5002, #5003)

FIG. 34 shows another embodiment of a method of selecting a divisional monitor.

In the first accumulation, the first monitor is used for the above-described reasons (#51-1). In the second and the subsequent measurements of distance, when a rear light state is sensed, measurement of distance is carried out by using a divisional monitor corresponding to a distance measuring block which is supposed to include the main object (#5102, #5103).

FIG. 35 is a flow chart showing a method of setting a double speed amplifier.

In the first accumulation, since neither position of a main object nor distribution of brightness thereof is found, measurement of distance is carried out for all the area to be measured in a double speed reading and amplification factor of a double speed amplifier is set to ½ in order to prevent overflow. In the second and the subsequent measurements of distance, only when the maximum value Vout (MAX) of the pixel output is 100 LSB or less with an accumulation time of 200 ms and gain set to 8 in the previous measurement, namely, only in very low brightness when no overflow occurs even with the double output in the largest AGC region, amplification factor of the double speed amplifier is set to 1 to amplify the output voltage in order to improve the limit of low brightness (#5202, #5203).

Figure 36:
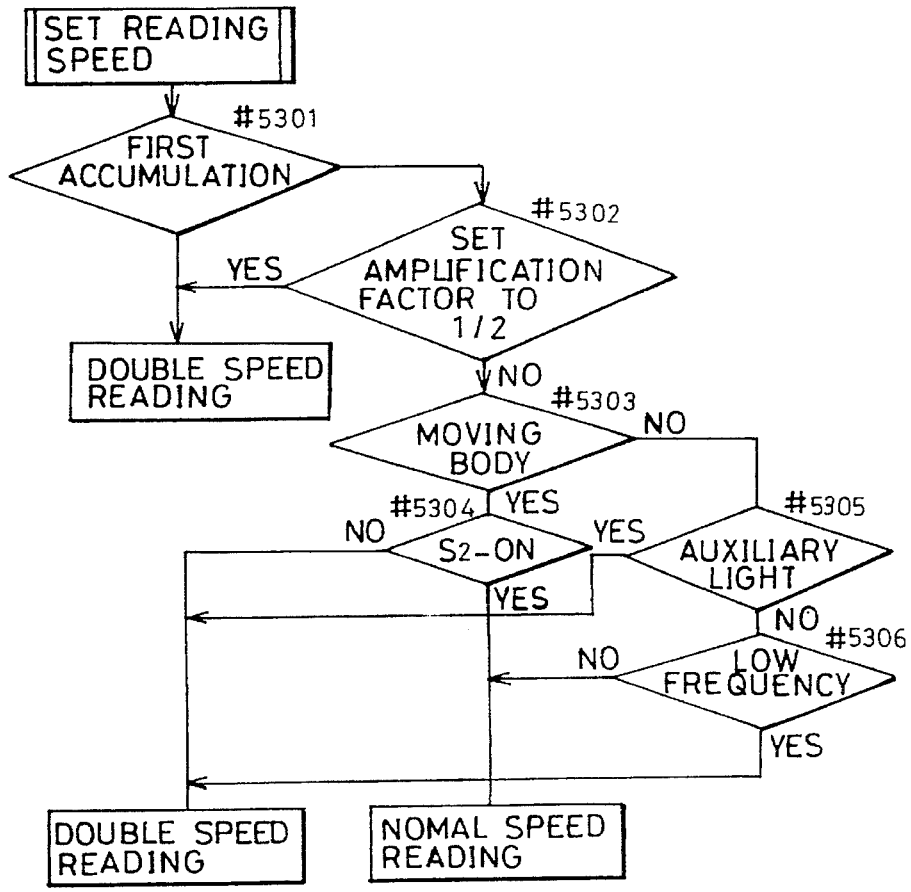

FIG. 36 is a flow chart showing setting of a reading speed.

In the first accumulation, for the same reason as in #5201, a double speed reading is set and in the second and the subsequent measurements of distance, if the amplification factor of the double speed amplifier is set to ½, a double speed reading is always carried out (#5302), if the amplification factor is set to 1, the determination is subsequently made as to whether the object is a moving body or not (#5302) to carry out measurement of distance in the double speed reading, if it is the moving body and $S_2$ (release starting switch) is not turned on and if it is turned on, a normal speed reading is set to carry out measurement of distance of the present position of the object with high precision (#5304).

If it is not a moving body, the determination is made as to whether the auxiliary light mode is set or not (#5305) and if it is in the auxiliary light mode, a double speed reading is set. If not in the auxiliary light mode, the determination is made as to whether the object is an object of a low frequency or not and if it is the object of low frequency, the double speed reading is set and if not, a normal speed reading is set (#5306).

Figure 37:
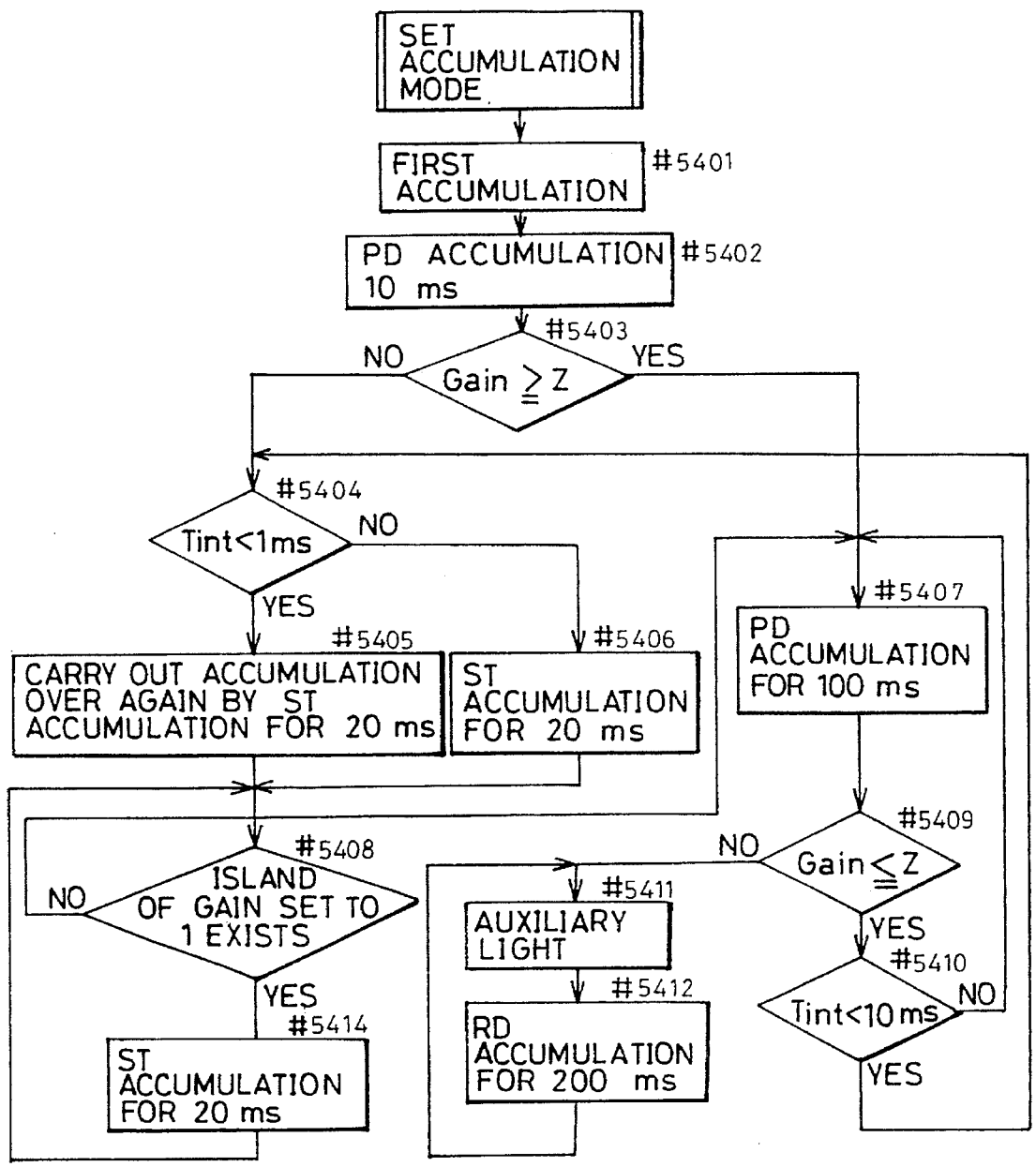

FIG. 37 is a flow chart showing setting of accumulation modes. For the first accumulation, the PD accumulation is carried out in order to remove after image, wherein the maximum accumulation time is set to 10 ms to carry out the PD accumulation in order not to make a user uncomfortable because of a too long accumulation time (#5401, #5402). At this time, when the brightness of the object is low and the gain has to be doubled or more, the PD accumulation is carried out with the maximum accumulation time of 100 ms for the subsequence measurement of distance (#5403, #5407).

When the brightness of the object is high and the accumulation time is less than 1 ms, completion of the accumulation cannot be properly carried out because of the delay in the completion of the PD accumulation. Therefore, the ST accumulation with the maximum accumulation time set to 20 ms is newly carried out (#5404, #5405) and if the accumulation time is 1 ms or more, the ST accumulation is carried out with the maximum accumulation time of 20 ms for the subsequent accumulation to make the result of the measurement of distance in this accumulation effective (#5404, #5406).

In the ST accumulation, while a gain of some island is 1, measurement of distance is repeated in the ST accumulation (20 ms) (#5408, #5414) and when gains of all the islands are 2 or more, the PD accumulation with the maximum accumulation time of 100 ms is carried out (#5407).

In the PD accumulation mode, when the gain is 2 or less and the accumulation time is 10 ms or more, the PD accumulation is repeated (#5410), when the accumulation time Tint is 1 ms $\leq$ Tint $\leq$ 10 ms, the ST accumulation with the maximum accumulation time of 20 ms is set for the subsequent accumulation (#5410, #5404, #5406) and when Tint $\leq$ 1 ms, the ST accumulation with the maximum accumulation time of 20 ms is carried out (#5405).

In the auxiliary light mode, the PD accumulation with the maximum accumulation time of 200 ms is set to emit the auxiliary light (#5411, #5412).

(6) Auxiliary Light Mode

Figure 49:
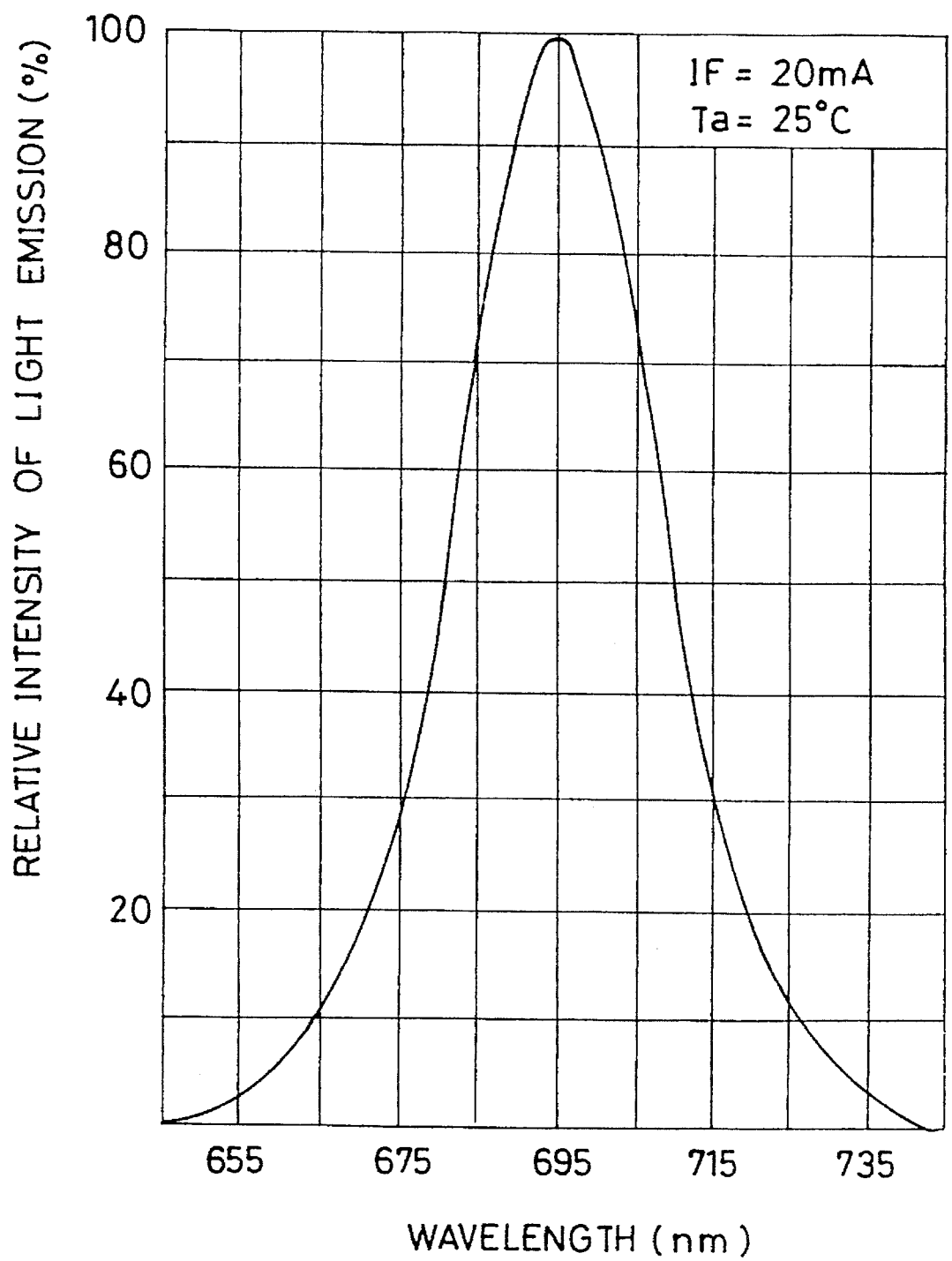
FIGS. 49–51 are diagrams explaining an auxiliary light mode of the photoelectric converting apparatus according to the present invention.

Description will be made of a case where distance is measured by infrared light component of the auxiliary light described in the first embodiment. FIG. 49 is a diagram showing a relation between a waveform of flash emission and intensity of flash emission of the auxiliary light LED generating auxiliary light. Referring to FIG. 49, the auxiliary light has emission spectrum characteristics which has a peak at a wavelength of 695 nm.

Figure 50:
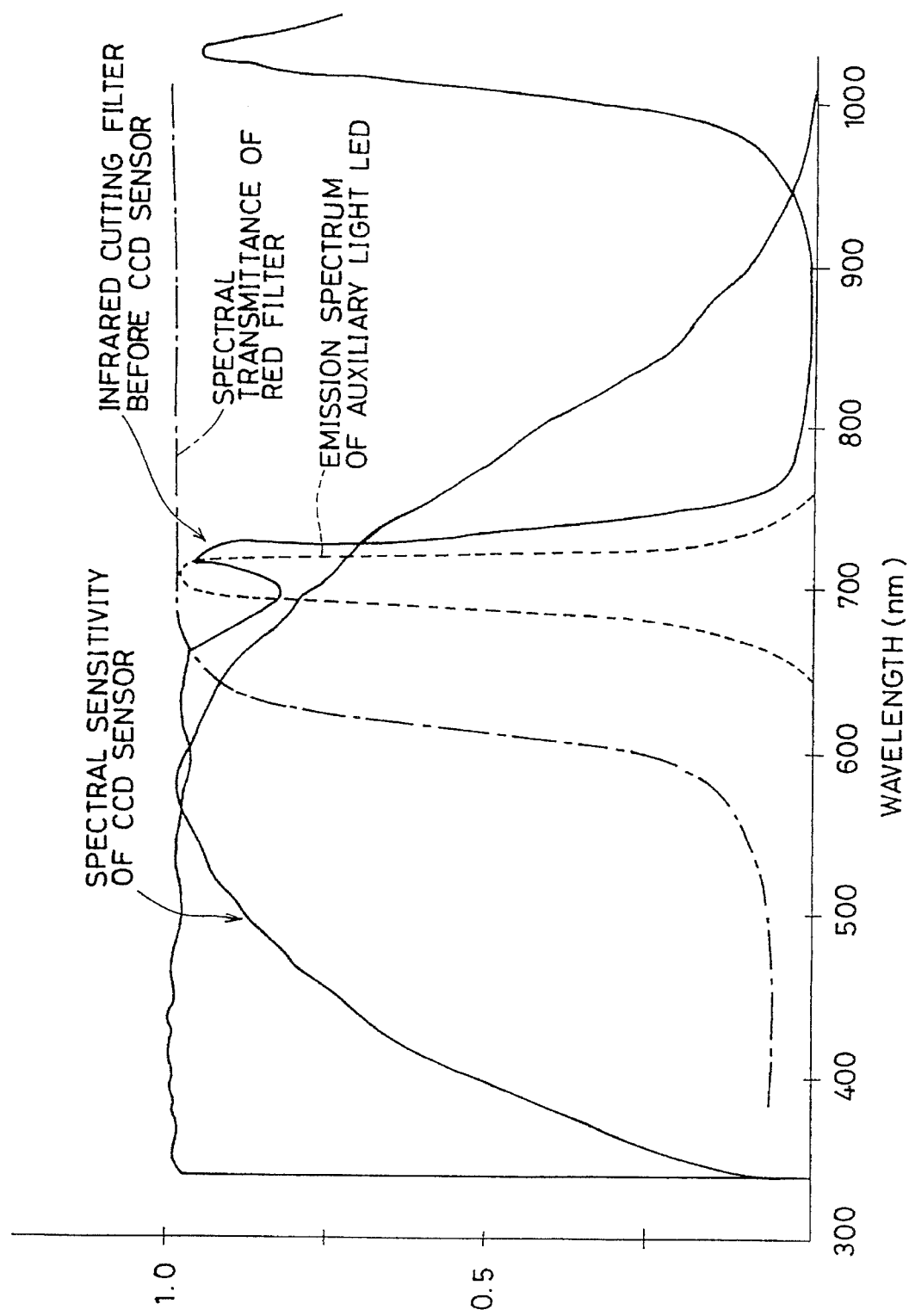

FIG. 50 is a diagram showing a relation between a wavelength and a spectral sensitivity of a CCD sensor constituting an AF sensor. When the distance is measured by ambient natural light, the measurement is carried out only by the auxiliary light so as not to be affected by the surrounding white light. At this time, a red filter is provided in the detection portion of the CCD for measuring only the auxiliary light component. In addition, a red filter is also provided in a monitor element for controlling accumulation. This provision is for matching the amount of the received light of the sensor with the amount of the received light of the monitor. The wavelength of the light emission of the auxiliary light LED shown in FIG. 49 is indicated by the dotted line in FIG. 50. The distance can be measured without being affected by the external light because the auxiliary light is sensed in a portion having high sensitivity of the CCD formed by a bandpass filter comprising an infrared ray cut filter and a red filter. It is more effective to change the pass band of the red filter in accordance with the spectrum distribution of the auxiliary light.

Figure 51:
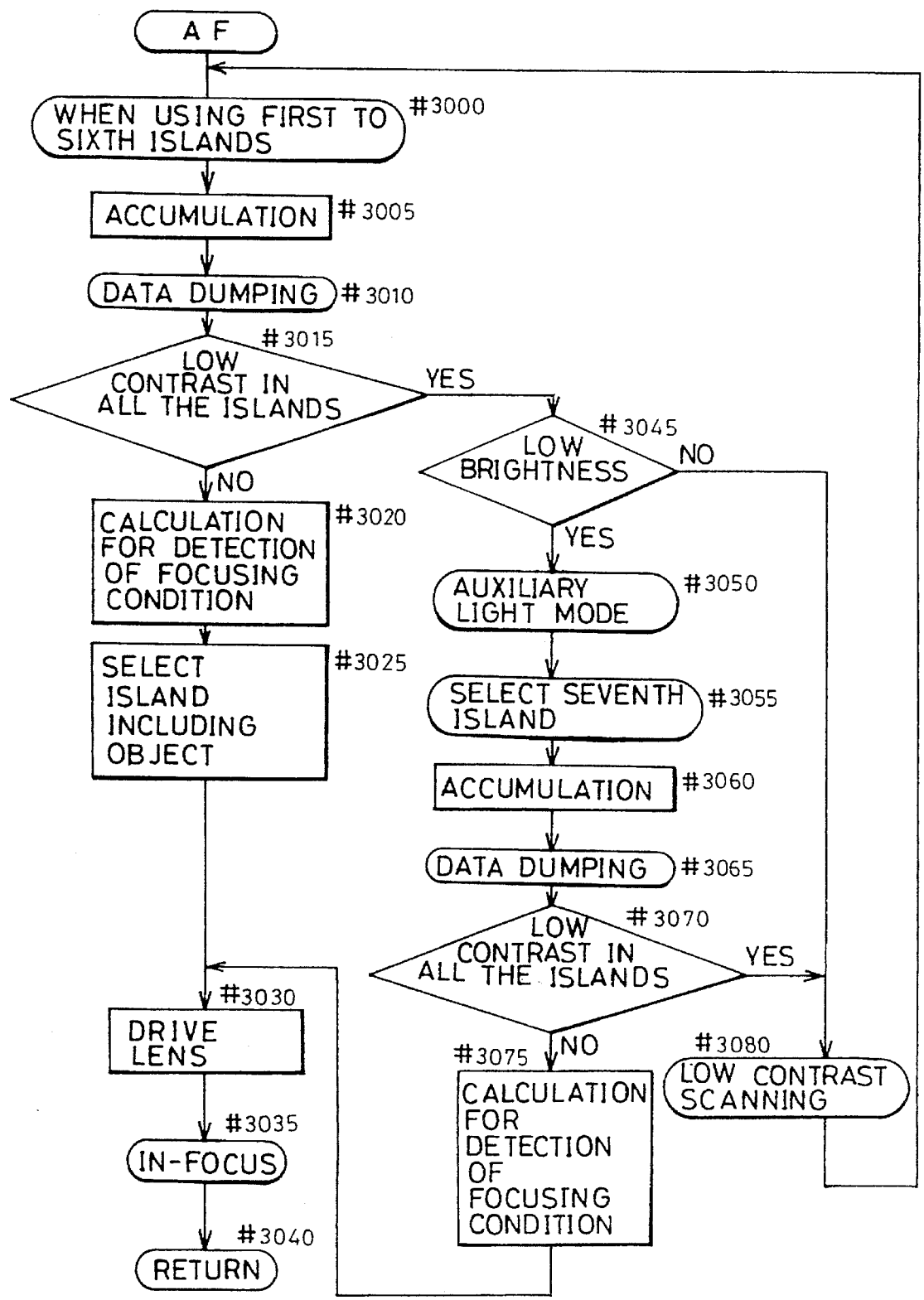

The AF subroutine in the auxiliary light mode will be described. FIG. 51 is a flow chart showing the AF subroutine in the auxiliary light mode. First, the first to the sixth islands IS1-IS6 are used (step 3000) to carry out accumulation (step 3005). As a result, the data is dumped (step 3010) to determine whether all the first to the sixth islands have low contrast or not (step 3015). If not all the islands have low contrast (NO in step 3015), calculation of the measurement of distance is carried out based on the data of the island which contrast is obtained (step 3020). The island including the object are selected (step 3025) and the lens is driven to the position of the islands (step 3030), so that the lens is moved to an in-focus position (step 3035). When the determination is made that all the islands have low contrast in step 3015, it is determined whether the output signals from all the islands have low brightness or not (step 3045). When the determination is made that the output signals from all the islands have low brightness (YES in step 3045), the auxiliary mode is set (step 3050) to drive an auxiliary light circuit (not shown). Then, the seventh island IS7 with the read filter for the auxiliary light is selected among the sixth and the seventh islands (step 3055), and accumulation is carried out (step 3060) to dump the data (step 3065). Thereafter, the determination is made again as to whether all the islands have low contrast or not (step 3070) and if not all the data from all the islands have low contrast (NO in step 3070), calculation of the measurement of distance is carried out based on the data obtained in the seventh island IS7 (step 3075), so that the lens is moved to an in-focus position based on the amount of defocus (steps 3030 and 3035). When the determination is made in step 3070 that all the islands have low contrast, low contrast scanning is carried out (step 3080), whereby the program returns to step 3000 again.

(5) Color detecting elements and determination of islands including the main object by using the color detecting elements.

Now, description will be made of a color detecting element described in the first embodiment of FIG. 10 and a method of determining islands including the main object by using the same will be described. FIG. 52 is a diagram explaining a method of forming a color filter for use in a color detecting element. The color detecting element is a color filter comprising three primary colors of R, G and B formed by the on-air system. The on-air system is a system wherein a transparent resist referred to as a base layer is applied on a wafer of CCD wherein wafer-process is completed. This layer allows improvement of the irregularities of the wafer formed during the wafer processing and also serves to improve adhesiveness to the subsequent dying resist. Thereafter, development by light exposure is carried out by a normal PEP (Photo Engraving Process).

Figure 52A:
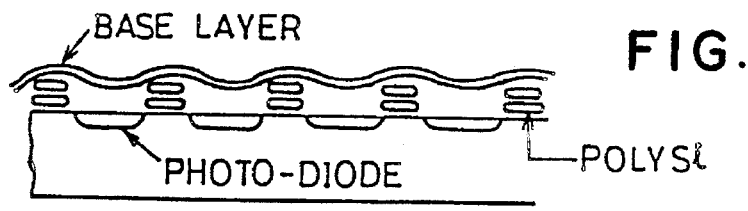
FIGS. 52(a)–52(g) are diagrams explaining a pixel with a color filter and a method of using the same in the photoelectric converting apparatus to the present invention.
Figure 52B:
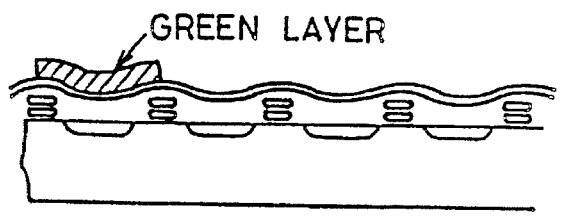
Figure 52C:
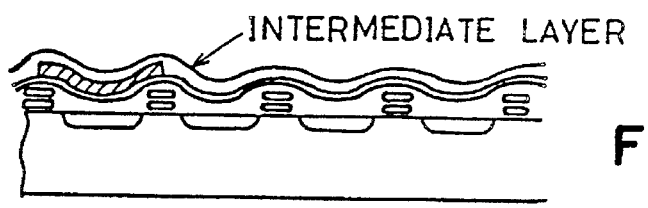
Figure 52D:
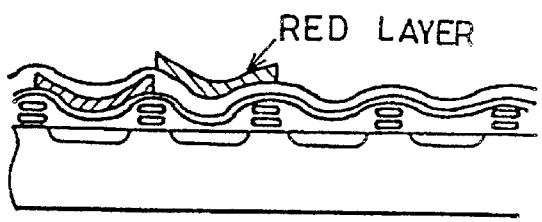
Figure 52E:
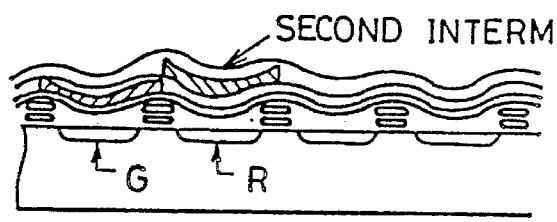
Figure 52F:
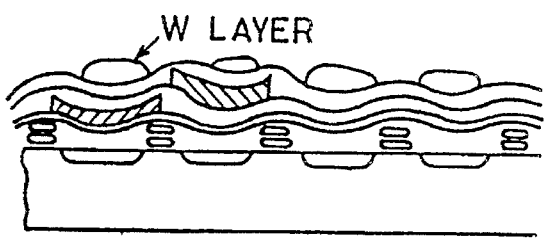
Figure 52G:
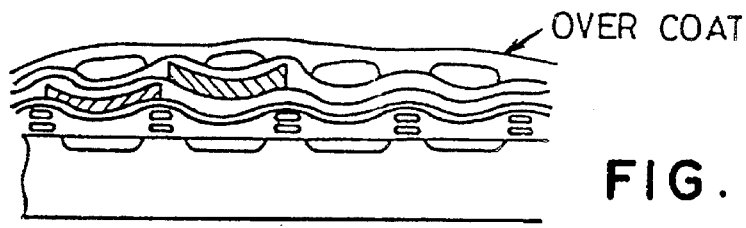

The color filter is formed through the processes of FIGS. 52(a)–52(g). After the development by light exposure, a dying resist is applied on the base layer, so that a pattern is formed on each pixel one by one, as shown in FIG. 52(b). Then, this wafer is soaked in dying liquid of green G and dried, resulting in the formation of the G layer. Then as shown in FIG. 52(c), the transparent resist is again applied and patterned in order to prevent color mixture in the subsequent dying process. This transparent layer is referred to as an intermediate layer. Then, as shown in 52(d), the dying resist is applied and patterned similarly in the formation of the G layer. Then, after this wafer is soaked in the red R dying liquid, the wafer is dried out. This layer is referred to as an R layer. As shown in 52(g), the transparent resist is again applied in order to improve concavities formed on each pixel. As shown in 52(f), a dying resist is applied on this transparent resist (the second intermediate layer) and patterned. This layer is referred to as a W (white) layer which is not dyed. This layer is used for improving surface states of the R layer and the G layer to make the color reproduction better. Finally, as shown in 52(g), an overcoat layer for protecting the surface is formed to complete a color filter of a color CCD image sensor.

Figures 53, 54:
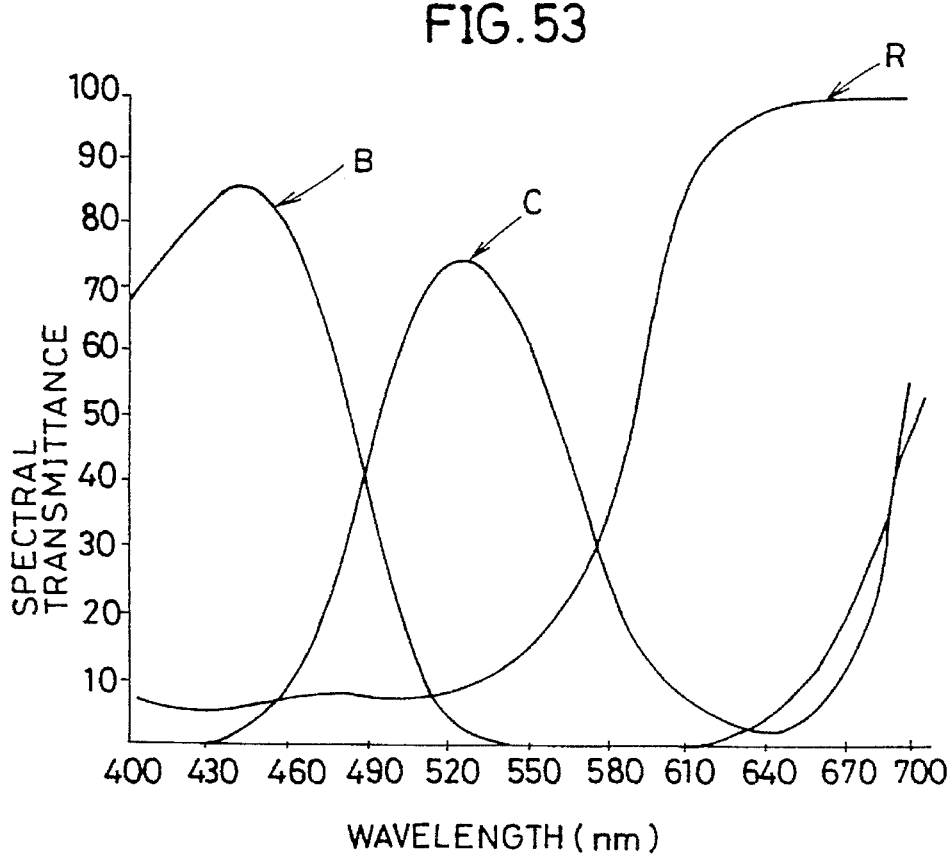
FIG. 53 shows spectral transmission characteristics of the photoelectric converting apparatus.
FIG. 54 shows the relationship between various outputs and skin color.

FIG. 53 shows a spectral transmittance characteristics of each of thus formed color filter of a color CCD image sensor.

Now the method of detecting an island including the main object will be described. Since generally a main object is a person, it is considered to be included in a region wherein skin color is detected. Accordingly, algorithm for sensing the skin color will be described in the following. Color information of each part is detected based on an output ratio of the color detecting elements R, G and B, a type of light source is determined based on the entire color output ratio and furthermore the image magnification information is obtained from the amount of defocus of each part, so that the part is watched which is considered to correspond to the person based on the three information. Position of the main object can be selected by automatically focusing the camera on the part recognized as the main object.

First, detection of the color information will be described. Light receiving elements arranged at 12 points on the AF sensor so as to face almost the same position are covered by red, green, blue and infrared (hereinafter referred to as R, G, B and IR) color filters. It is assumed that the output of the light receiving element R is Vr, the output of G is Vg, the output of B is Vb and the output of the infrared ray IR is Vir. The output ratios Vr/Vb, Vg/Vb and Vir/Vb of the above-described 12 light receiving elements are obtained. These are considered to be color information of each of 6 blocks.

Detection of a light source will be described. The skin color of the person differs in distribution of reflected waveform length depending on a light source. Therefore, it is not sufficient just to detect the color information of the object. Therefore, it is necessary to detect a state of the light source. The light source is estimated by the above-described color information, so that the correction based on the light sources is applied to the threshold of the skin color of the color information.

The method of estimating the light source will be described. The light source is estimated by a ratio of the output of the IR filter to the output of the B filter arranged similarly to the color information detecting elements. A sum of the output of each of the IR filter and the B filter is obtained among the outputs of the color information elements provided at 12 points, whereby the light source is estimated by a ratio of the sums.

$$R(ir/b) = \Sigma\ Viri/\Sigma Bbi\ (i=1\ to\ 6)$$

FIG. 54 shows a relation among the ratio obtained by the above described calculation, a level at which skin color can be detected and a determined light source, wherein Rg/b at the level at which it can be detected as skin color represents a ratio of Vg which is the output of G to Vb which is the output of B and Rr/b represents a ratio of Vr which is the output of R to Vb which is the output of B.

First the light source is estimated by the value of Rir/b based on FIG. 54 and the determination is made as to whether color detection information of each block is included in a skin color detection level of the estimated light source or not to extract blocks having skin color.

Figure 55:
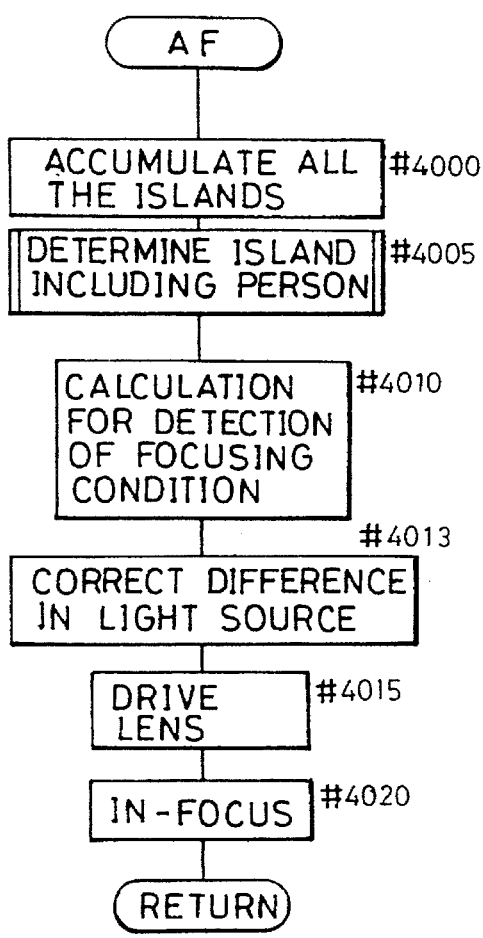
FIG. 55 is a flow chart showing an AF subroutine when the pixel with a color filter is used.

FIG. 55 is a flow chart showing an AF subroutine in which a pixel with a color filter is used. Referring to FIG. 55, accumulation of all the islands is carried out when a pixel with a color filter is used (step 4000), so that the determination is made as to which island includes the main object, that is, the person, based on the result thereof (step 4005). Then, calculation of the measurement of distance is carried out by the data of the island including the main object (step 4010), the amount of defocus caused by different light sources is corrected (step 4013), and the amount of defocus is obtained to drive the lens (step 4015) to move to an infocus position (step 4020).

Figure 56:
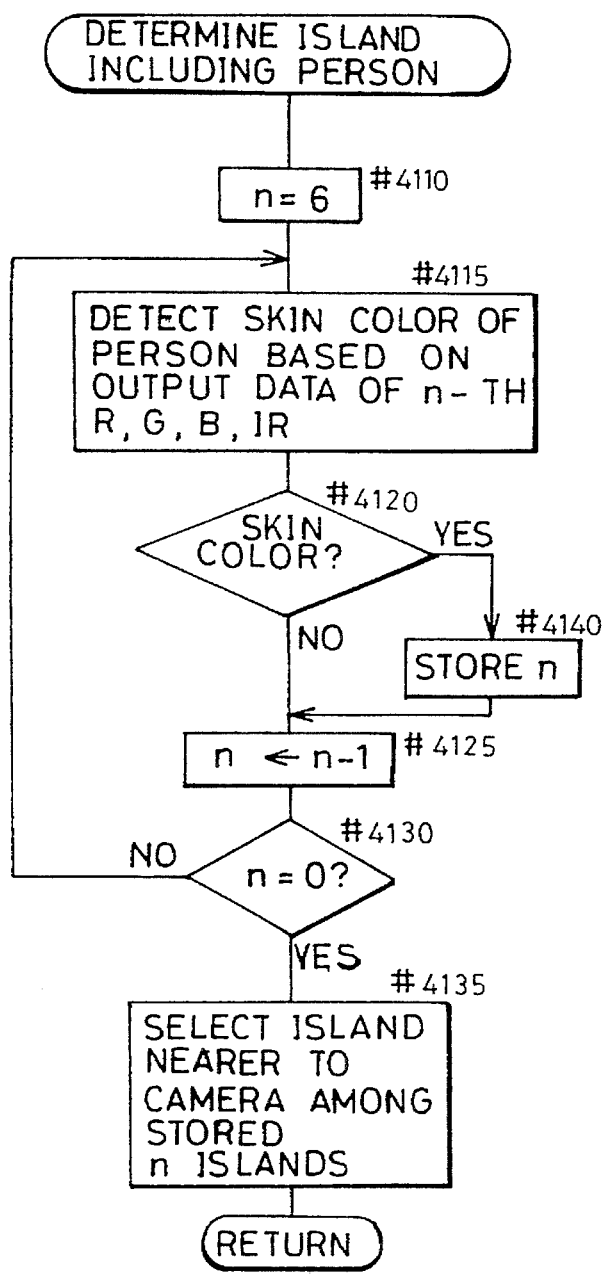
FIG. 56 is a flow chart showing a subroutine for determining an island including a person.

Referring to FIG. 56, description will be made of a determination subroutine of an island including the person, the main object. In the subroutine for determining the island including the person, first, 6 is set for n as the number of islands and the loop number (step 4110). Then, the detection of skin color of the person is carried out based on the output data of the n-th R, G, B and IR in the previously described manner. Then, the determination is made as to whether the output data of the n-th island represents the skin color or not (step 4120) and if it represents the skin color, the numeral n is stored in a predetermined memory (step 4140) and if not, 1 is subtracted from n and the above-described determination will be repeated until the n becomes 0 (steps 4125 and 4130). Thereafter, an island nearer to the camera is selected among the stored n representing the number of islands (step 4135). As the foregoing, the island including the main object, that is, the person, is determined, whereby the AF sensor carries out accumulation such that the output data of the island becomes a proper value, considering the island as a desired island.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A focus detecting device comprising:
   (a) a line sensor, disposed on a substrate, including a continuous row of storage type photoelectric converting elements which operate as a plurality of blocks, each of said blocks contains part of the photoelectric converting elements, (b) focus detecting means for performing focus detection with respect to said blocks based on the output of said photoelectric converting elements,
   (c) light receiving means having a plurality of light receiving sensors, each light receiving sensor being provided on the same substrate as the line sensor near the corresponding block, an output of each light receiving sensor is processed independently so as to detect the amount of incident light of the corresponding block, and
   (d) storage controlling means for controlling the storage amount of charge to said line sensor based on the output of said light receiving means.

2. The focus detecting device according to claim 1, wherein areas of said respective light receiving sensors are made equal.

3. The focus detecting device according to claim 1, wherein
   said focus detecting means carries out focus detection for said plurality of blocks,
   said focus detecting device further comprises selecting means for selecting a block to be used for subsequent focus detection based on said plurality of focus detection results, and
   said light receiving sensor corresponding to the block selected by said selecting means is used for controlling the storage of charge for the subsequent focus detection.

4. A focus detecting device comprising:
(a) a first sensor, disposed on a substrate, including a continuous row of storage type light receiving elements which operate as a plurality of blocks, each of said blocks contains part of the light receiving elements,
(b) light receiving means having a plurality of light receiving sensors, each light receiving sensor being provided on the same substrate as the first sensor near said light receiving elements corresponding to the respective blocks, an output of each light receiving sensor is processed independently so as to detect the amount of incident light of the corresponding block,
(c) storage controlling means for controlling the storage amount of charge to said first sensor based on the output of said light receiving means,
(d) focus detecting means for performing focus detection of said blocks based on the output of said first sensor,
(e) selecting means for selecting a block based on said focus detection of said respective blocks, and
(f) controlling means for controlling the subsequent storage based on the output of the light receiving sensor of said selected block.

5. The focus detecting device according to claim 4, wherein said selecting means operates when focus detection cannot be made in at least one block.

6. A focus detecting device comprising:
(a) a first sensor, disposed on a substrate, including a continuous row of storage type light receiving elements which operate as a plurality of blocks, each of said blocks contains part of the light receiving elements,
(b) light receiving means having a plurality of light receiving sensors and each light receiving sensor being provided on the same substrate as the first sensor near said light receiving elements corresponding to said respective blocks, an output of each light receiving sensor is processed independently so as to detect the amount of incident light of the corresponding block,
(c) storage controlling means for controlling the storage amount of charge to said first sensor based on the output of said light receiving means,
(d) focus detecting means for performing focus detection of a plurality of blocks based on the output of said first sensor,
(e) selecting means for selecting a block based on the output of said light receiving elements of said respective blocks, and
(f) controlling means for controlling the subsequent storage based on the output of the light receiving sensor of said selected block.

7. The focus detecting device according to claim 6, wherein said selecting means selects said region when the output of the light receiving elements is at a low level.

8. An image sensing device comprising:
(a) a line sensor, disposed on a substrate, including a continuous row of storage type photoelectric converting elements,
(b) light receiving means having a plurality of light receiving sensors, each light receiving sensor being provided on the same substrate as the line sensor near said line sensor, at least two light receiving sensors having different lengths and each light receiving sensor having the same area, and
(c) storage controlling means for controlling the storage amount of charge to said line sensor based on the output of said light receiving means.

9. The image sensing device according to claim 8, wherein said light receiving means includes a first light receiving sensor having approximately the same length as that of the line sensor and a second light receiving sensor having a shorter length than that of the line sensor.

10. The image sensing device according to claim 8, further comprising selecting means for selecting one of said plurality of light receiving sensors to control storage based on the result of the selected light receiving sensor.

11. The image sensing device according to claim 9, wherein said storage controlling means performs storage control a plurality of times, the first of which control being performed based on said first light receiving sensor.

12. A focus detecting device comprising:
(a) a line sensor, disposed on a substrate, including a continuous row of storage type photoelectric converting elements which operate as a plurality of blocks, each of said blocks contains part of the photoelectric converting elements,
(b) focus detecting means for performing focus detection with respect to said blocks based on the output of said photoelectric converting elements,
(c) light receiving means having a plurality of light receiving sensors and each light receiving sensor provided on the same substrate as the line sensor near the corresponding blocks, each of said plurality of light receiving sensors having the same area, an output of each light receiving sensor is processed independently so as to detect the amount of incident light of the corresponding block,
(d) selecting means for selecting one of said plurality of light receiving sensors, and
(e) storage controlling means for controlling the storage amount of charge to said line sensor based on the output of said light receiving means.

13. (Four Times Amended) A focus detecting device comprising:
(a) a first sensor, disposed on a substrate, including a continuous row of storage type light receiving elements which operate as a plurality of blocks, each of said blocks contains part of the light receiving elements,
(b) focus detecting means for performing focus detection of said blocks based on the output of said first sensor,
(c) determining means for determining whether the output of said first sensor is effective or not for focus detection with respect to each of said blocks,
(d) memory means for storing the result of the focus detection corresponding to the block wherein the output of said sensor is effective for said focus detection as a result of the determination of said determining means,
(e) output adjusting means for adjusting the output level of said first sensor,
(f) controlling means, when there is a block where the output of said sensor is not effective for focus detection as a result of the determination by said determining means, for operating said output adjusting means to carry out another focus detection, and
(g) determining means for determining a final focus detection result based on the focus detection result stored in said memory means and the focus detection result detected by said another focus detection.

14. The focus detecting device according to claim 13, wherein
said light receiving elements are of the storage type and include, light receiving means having a plurality of light receiving sensors, each light receiving sensor being provided near said light receiving elements corresponding to the respective blocks, and storage controlling means for controlling the storage amount of charge to said first sensor based on the output of said light receiving means, and said output adjusting means includes selecting means for selecting one of said light receiving sensors.

15. The focus detecting device according to claim 13, wherein said selecting means selects a light receiving sensor corresponding to a region determined to be ineffective for focus detection.

16. A focus detecting device comprising:

an image sensor, disposed on a substrate, including a continuous row of storage type photoelectric receiving elements which operate as a plurality of receiving ranges, each of said receiving ranges contains a part of the photoelectric receiving elements, a first light receiving sensor provided on the same substrate as the image sensor and corresponding to a first light receiving range within a light receiving range of said image sensor and receiving a light having substantially the same intensity as that received in the first light receiving range, a second light receiving sensor provided on the same substrate as the image sensor and corresponding to a second light receiving range within said image sensor light receiving range and receiving a light having substantially the same intensity as that of the light received in the second light receiving range, selecting means for selecting one of said first and second light receiving sensors, integration controlling means for performing integration control of said image sensor based on the output of said selected light receiving means repeatedly, selection controlling means for controlling said selecting means so as to select the first light receiving sensor at a first storage control, and focus detecting means for performing focus detection based on the output of said image sensor.

17. The focus detecting device according to claim 16 wherein said first light receiving range corresponds to the entire image sensor light receiving range.

18. The focus detecting device according to claim 16, further comprising dividing means for dividing said sensor light receiving range into a plurality of blocks with respect to the longitudinal direction of said image sensor, wherein said focus detecting means performs focus detection for each block.

19. The focus detecting device according to claim 16, further comprising determining means for determining whether focus detection is possible or not in each block, wherein said selecting means selects the second light receiving sensor at a determination that focus detection is impossible in at least one block.

20. The focus detecting device according to claim 16, wherein said first light receiving range and said second light receiving range overlap at least partly with each other.

21. An image sensing device comprising:

an image sensor, disposed on a substrate, including a continuous row of storage type photoelectric receiving elements which operate as a plurality of receiving ranges, each of said receiving ranges contains a part of the photoelectric receiving elements, a first light receiving sensor provided on the same substrate as the image sensor and corresponding to a first light receiving range within a light receiving range of said image sensor and receiving a light having substantially the same intensity as that received in the first light receiving range, a second light receiving sensor provided on the same substrate as the image sensor and corresponding to a second light receiving range narrower than the first light receiving range within said image sensor light receiving range and receiving a light having substantially the same intensity as that of the light received in the second light receiving range, selecting means for selecting one of said first and second light receiving sensors, storage controlling means for performing storage control of said image sensor based on the output of said selected light receiving means, and selection controlling means for controlling said selecting means so as to select the first light receiving sensor at a first storage control.

22. An image sensing device comprising:

an image sensor, disposed on a substrate, having a continuous row of storage type light receiving elements, a first light receiving sensor provided on the same substrate as the image sensor and corresponding to a first light receiving range in a light receiving range of said image sensor and receiving a light having substantially the same intensity as that received in the first light receiving range, a second light receiving sensor provided on the same substrate as the image sensor and corresponding to a second light receiving range different from the first light receiving range within a light receiving range of said sensor and receiving a light having substantially the same intensity as that received in the second light receiving range, selecting means for selecting one of said first and second light receiving sensors, storage controlling means for controlling storage of said sensor based on the output of said selected light receiving means, and said first light receiving range and said second light receiving range overlapping at least partly with each other.

23. A focus detecting device comprising:

a line sensor, disposed on a substrate, including a continuous row of storage type photoelectric converting elements which operate as a plurality of blocks, each of said blocks contains part of the photoelectric converting elements, focus detecting means for performing focus detection with respect to at least one of said blocks based on the output of said photoelectric converting elements, light receiving means having a plurality of light receiving sensors provided on the same substrate as the line sensor near the line sensor, an output of each light receiving sensor is processed independently so as to detect the amount of incident light of the corresponding block, and storage controlling means for controlling the storage amount of charge to said line sensor based on the output of said light receiving means.

24. The focus detecting device according to claim 23, wherein each light receiving sensor is provided near the corresponding block.

25. A focus detecting device comprising:
(a) a line sensor, disposed on a substrate, including a row of storage type photoelectric converting elements,
(b) dividing means for dividing said line sensor into a plurality of blocks with respect to the longitudinal direction of said line sensor,
(c) focus detecting means for performing focus detection with respect to said blocks based on the output of said photoelectric converting elements,
(d) light receiving means having a plurality of light receiving sensors, each light receiving sensor being provided on the same substrate as the line sensor near the corresponding block, output of each light receiving sensors is processed independently so as to detect the amount of incident light of the corresponding block,
(e) storage controlling means for controlling the storage amount of charge to said line sensor based on the output of said light receiving means.

26. The focus detecting device according to claim 25, wherein areas of said respective light receiving sensors are made equal.

27. The focus detecting device according to claim 25, wherein said focus detecting means carries out focus detection for said plurality of blocks, said focus detecting device further comprises selecting means for selecting a block to be used for subsequent focus detection based on said plurality of focus detection results, and said light receiving sensor corresponding to the block selected by said selecting means is used for controlling the storage of charge for the subsequent focus detection.

28. A focus detecting device comprising:

a line sensor, disposed on a substrate, including a continuous row of storage type arrays of photoelectric converting means, dividing means for dividing said light sensor into a plurality of blocks with respect to the longitudinal direction of said line sensor, each of said blocks including said plurality of photoelectric connecting elements, focus detecting means for performing focus detection with respect to at least one of said blocks based on the output of said photoelectric converting elements, light receiving means having a plurality of light receiving sensors provided on the same substrate as the line sensor near the line sensor, output of each light receiving sensors is processed independently so as to detect the amount of incident light of the corresponding block, and storage controlling means for controlling the storage amount of charge to said line sensor based on the output of said light receiving means.

29. The focus detecting device according to claim 28, wherein each light receiving sensor is provided near the corresponding block.

* * * * *